(12) United States Patent
Smith et al.

(10) Patent No.: US 11,180,319 B2
(45) Date of Patent: Nov. 23, 2021

(54) SKID SYSTEM FOR LOAD TRANSPORT APPARATUS

(71) Applicant: Entro Industries, Inc., Hillsboro, OR (US)

(72) Inventors: Harlan B. Smith, Hillsboro, OR (US); Shawn R. Smith, Hillsboro, OR (US); Jason Ross, Hillsboro, OR (US); Raymond Rafe Rouse, Hillsboro, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 491 days.

(21) Appl. No.: 16/167,370

(22) Filed: Oct. 22, 2018

(65) Prior Publication Data

US 2019/0152704 A1 May 23, 2019

Related U.S. Application Data

(60) Provisional application No. 62/589,911, filed on Nov. 22, 2017.

(51) Int. Cl.
*B65G 7/02* (2006.01)
*B62D 57/032* (2006.01)

(52) U.S. Cl.
CPC ............. *B65G 7/02* (2013.01); *B62D 57/032* (2013.01); *B65G 2201/0223* (2013.01)

(58) Field of Classification Search
CPC ......... B62D 57/02; B62D 57/032; B65G 7/02
See application file for complete search history.

(56) References Cited

U.S. PATENT DOCUMENTS

| 1,001,299 A | 8/1911 | Page |
| 1,242,635 A | 10/1917 | Anderson |

(Continued)

FOREIGN PATENT DOCUMENTS

| CA | 2871406 | 11/2014 |
| CA | 2798743 | 8/2015 |

(Continued)

OTHER PUBLICATIONS

Airstream Inc., "Airstream's New Dura-Torque Axle" Pamphlet. 1962.

(Continued)

*Primary Examiner* — Tony H Winner
(74) *Attorney, Agent, or Firm* — Schwabe Williamson & Wyatt

(57) ABSTRACT

A walking apparatus uses a unique single substantially planar interface between the top of support foot and the bottom of load plate to move a load both laterally, longitudinally, and in any curved, angular, diagonal, or non-linear direction. The single substantially planar interface used for moving the load plate in different directions provides the walking apparatus with a low vertical profile that can be installed in load bearing frames with lower ground clearances. In one example, a load bearing device provides a single steering plane movable over a support foot in different directions. A travel mechanism is coupled between the support foot and the load bearing device and is configured to change a horizontal path of the load while the weight of the load is transferred onto the support foot and the travel mechanism is moving the load relative to the support foot.

31 Claims, 35 Drawing Sheets

(56) References Cited

U.S. PATENT DOCUMENTS

| | | | |
|---|---|---|---|
| 1,289,207 A | 12/1918 | Leach |
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,644,691 A | 7/1953 | Pohle |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,901,240 A | 8/1959 | Fikse |
| 2,935,309 A | 5/1960 | McCarthy |
| 2,942,676 A | 6/1960 | Wilhelm |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A * | 4/1971 | Chambers | B65G 7/02 |
| | | | 180/8.5 |
| 3,595,322 A | 7/1971 | Reimann |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A | 2/1975 | Dowd |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A * | 7/1999 | Reed | E21B 15/003 |
| | | | 180/8.1 |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |
| 7,681,674 B1 * | 3/2010 | Barnes | B60P 1/00 |
| | | | 180/8.1 |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,544,853 B2 | 10/2013 | Kanaoka |
| 8,556,003 B2 | 10/2013 | Souchek |
| 8,561,733 B2 | 10/2013 | Smith et al. |
| 8,573,334 B2 | 11/2013 | Smith |
| 8,646,549 B2 | 2/2014 | Ledbetter |
| 8,646,976 B2 | 2/2014 | Stoik |
| 8,839,892 B2 | 9/2014 | Smith et al. |
| 8,887,800 B2 | 11/2014 | Havinga |
| 9,004,203 B2 | 4/2015 | Smith |
| 9,045,178 B2 | 6/2015 | Smith |
| 9,096,282 B2 | 8/2015 | Smith et al. |
| 9,415,819 B2 | 8/2016 | Vogt |
| 9,463,833 B2 | 10/2016 | Smith et al. |
| 9,533,723 B2 | 1/2017 | Smith et al. |
| 9,751,578 B2 | 9/2017 | Smith |
| 9,862,437 B2 | 1/2018 | Smith et al. |
| RE46,723 E | 2/2018 | Smith et al. |
| 9,938,737 B1 | 4/2018 | Garceau |
| 2002/0175319 A1 | 11/2002 | Green |
| 2002/0185319 A1 | 12/2002 | Smith |
| 2004/0211598 A1 | 10/2004 | Palidis |
| 2004/0240973 A1 | 12/2004 | Andrews |
| 2006/0027373 A1 | 2/2006 | Carriere |
| 2006/0213653 A1 | 9/2006 | Cunningham |
| 2009/0000218 A1 | 1/2009 | Lee |

(56) References Cited

U.S. PATENT DOCUMENTS

| | | | |
|---|---|---|---|
| 2009/0188677 A1 | 7/2009 | Ditta | |
| 2009/0200856 A1 | 8/2009 | Chehade | |
| 2009/0283324 A1 | 11/2009 | Konduc | |
| 2010/0224841 A1 | 9/2010 | Liljedahl | |
| 2010/0252395 A1 | 10/2010 | Lehtonen | |
| 2011/0072737 A1 | 3/2011 | Wasterval | |
| 2011/0114386 A1 | 5/2011 | Souchek | |
| 2012/0219242 A1 | 8/2012 | Stoik | |
| 2013/0153309 A1* | 6/2013 | Smith | B62D 57/02 180/8.1 |
| 2013/0156538 A1 | 6/2013 | Smith et al. | |
| 2013/0156539 A1 | 6/2013 | Smith et al. | |
| 2013/0240300 A1 | 9/2013 | Fagan | |
| 2013/0277124 A1 | 10/2013 | Smith et al. | |
| 2014/0014417 A1 | 1/2014 | Smith et al. | |
| 2014/0054097 A1 | 2/2014 | Bryant | |
| 2014/0158342 A1 | 6/2014 | Smith | |
| 2014/0161581 A1 | 6/2014 | Smith et al. | |
| 2014/0262562 A1 | 9/2014 | Eldib | |
| 2014/0299564 A1 | 10/2014 | Lin | |
| 2015/0053426 A1 | 2/2015 | Smith et al. | |
| 2015/0125252 A1 | 5/2015 | Berzen | |
| 2015/0166134 A1 | 6/2015 | Trevithick | |
| 2015/0166313 A1 | 6/2015 | Knapp | |
| 2015/0239580 A1 | 8/2015 | Valenzuela | |
| 2016/0023647 A1 | 1/2016 | Saunders | |
| 2016/0052573 A1* | 2/2016 | Higginbotham, III | B62D 57/022 180/8.1 |
| 2016/0176255 A1 | 6/2016 | Guiboche | |
| 2016/0221620 A1 | 8/2016 | Smith | |
| 2016/0297488 A1 | 10/2016 | Smith | |
| 2017/0021880 A1 | 1/2017 | Smith | |
| 2017/0022765 A1 | 1/2017 | Csergei | |
| 2017/0101144 A1 | 4/2017 | Higginbotham, II | |
| 2017/0327166 A1 | 11/2017 | Smith | |
| 2018/0072543 A1 | 3/2018 | Rucker | |
| 2018/0183362 A1 | 6/2018 | Jenner | |
| 2018/0346041 A1 | 12/2018 | Smith | |
| 2019/0016575 A1 | 1/2019 | Unger | |
| 2019/0048558 A1 | 2/2019 | Unger | |
| 2019/0367111 A1* | 12/2019 | Smith | B62D 57/02 |
| 2020/0207431 A1* | 7/2020 | Higginbotham, III | E21B 15/003 |

FOREIGN PATENT DOCUMENTS

| | | |
|---|---|---|
| CA | 2798774 | 9/2015 |
| CA | 2798790 | 10/2015 |
| CH | 359422 | 1/1962 |
| CN | 1515477 | 7/2003 |
| CN | 101139069 | 3/2008 |
| CN | 102566573 | 12/2013 |
| CN | 105060161 | 11/2015 |
| CN | 105446271 | 3/2016 |
| CN | 106672113 | 5/2017 |
| CN | 107314000 | 11/2017 |
| DE | 2418411 | 10/1975 |
| DE | 4107314 | 9/1992 |
| EP | 469182 | 10/1990 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Schwabe Williamson & Wyatt, PC "Listing of Related Cases", Feb. 22, 2019.
ENTRO Industries, Inc. brochure "The Future of Rig Walkers", Jun. 2012; 4 pages.
Columbia Industries, LLC brochure "Kodiak Cub Rig Walking System", 2009; 4 pages.
Colby, Col. Joseph M., "Torsion-Bar Suspension", SAE Quarterly Transactions, vol. 2, No. 2, pp. 195-200, Apr. 1948.
Airstream Inc., "Airstream's New Dura-Torque Axle" Pamphlet.
U.S. Appl. No. 13/711,193, filed Dec. 11, 2012, Rotation Device for Load Transporting Apparatus, U.S. Pat. No. 8,573,334.
U.S. Appl. No. 13/711,269, filed Dec. 11, 2012, Alignment Restoration Device for Load Transporting Apparatus, U.S. Pat. No. 8,561,733.
U.S. Appl. No. 13/711,315, filed Dec. 11, 2012, Centering Device for Load Transporting Apparatus, U.S. Pat. No. 8,490,724.
U.S. Appl. No. 13/909,969, filed Jun. 4, 2013, Rig With Drawworks and Hoisting Device, U.S. Pat. No. 9,096,282.
U.S. Appl. No. 13/917,531, filed Jun. 13, 2013, Centering Device for Load Transporting Apparatus, U.S. Pat. No. 8,839,892.
U.S. Appl. No. 14/028,111, filed Sep. 16, 2013, Rotation Device for Load Transporting Apparatus, U.S. Pat. No. 9,045,178.
U.S. Appl. No. 14/028,150, filed Sep. 16, 2013, Alignment Restoration Device for Load Transporting Apparatus, U.S. Pat. No. 9,004,203.
U.S. Appl. No. 14/529,566, filed Oct. 31, 2014, Mounting Structure With Storable Transport System, U.S. Pat. No. 9,533,723.
U.S. Appl. No. 15/094,664, filed Apr. 8, 2016, Alignment Restoration Device for Load Transporting Apparatus, U.S. Pat. No. 9,463,833.
U.S. Appl. No. 15/141,587, filed Apr. 28, 2016, Alignment Restoration Device for Load Transporting Apparatus, U.S. Pat. No. RE46723.
U.S. Appl. No. 15/285,366, filed Oct. 4, 2016, Mounting Structure With Storable Transport System, U.S. Pat. No. 9,862,437.
U.S. Appl. No. 15/666,149, filed Aug. 1, 2017, Low Profile Roller Assembly, U.S. Pat. No. 2017/0327166.
U.S. Appl. No. 15/828,073, filed Nov. 30, 2017, Mounting Structure With Storable Transport System, U.S. Pat. No. 9,888,112.
U.S. Appl. No. 15/867,382, filed Jan. 10, 2018, Alignment Restoration Device for Load Transporting Apparatus.
U.S. Appl. No. 15/908,699, filed Feb. 28, 2018, Controlling Load Transporting Devices, U.S. Pat. No. 2019-0041879.
U.S. Appl. No. 15/807,176, filed Nov. 8, 2017, Lifting Loads With Lifting Devices, U.S. Pat. No. 2019-0016575.
U.S. Appl. No. 15/896,846, filed Feb. 14, 2018, Automatic Walking for a Load Transporting Apparatus, U.S. Pat. No. 2019-0048558.
U.S. Appl. No. 15/886,646, filed Feb. 1, 2018, Yaw Alignment System, U.S. Pat. No. 2018-0346041.
U.S. Appl. No. 15/971,927, filed May 4, 2018, Mounting Structure With Storable Transport System, U.S. Pat. No. 2018-0290700.

* cited by examiner

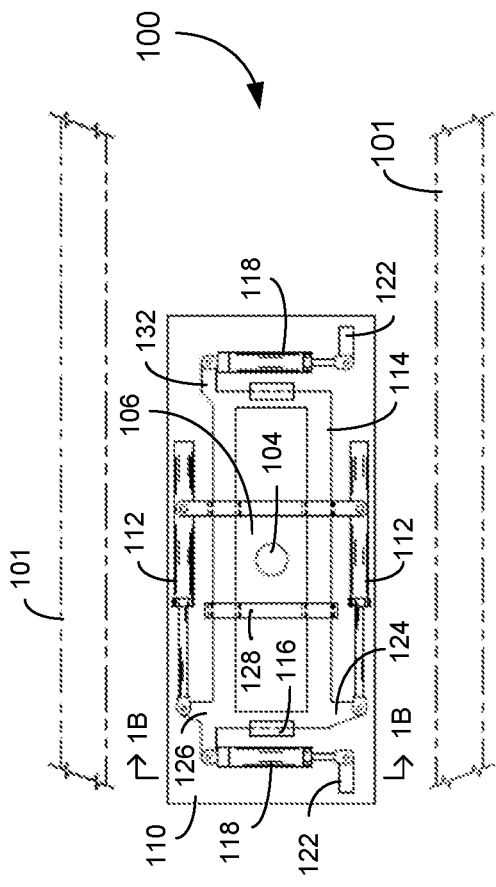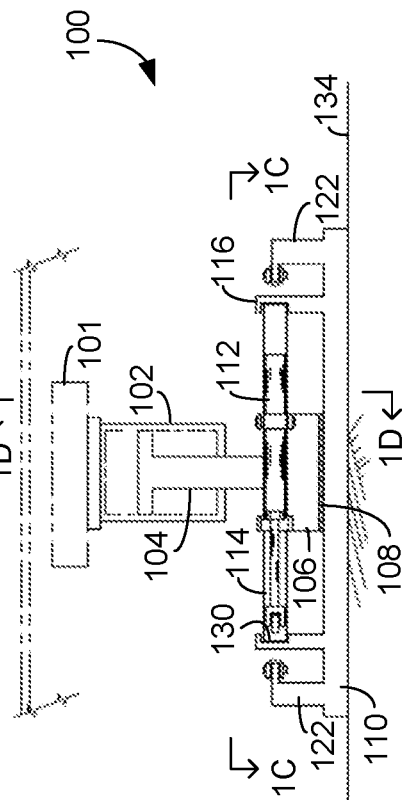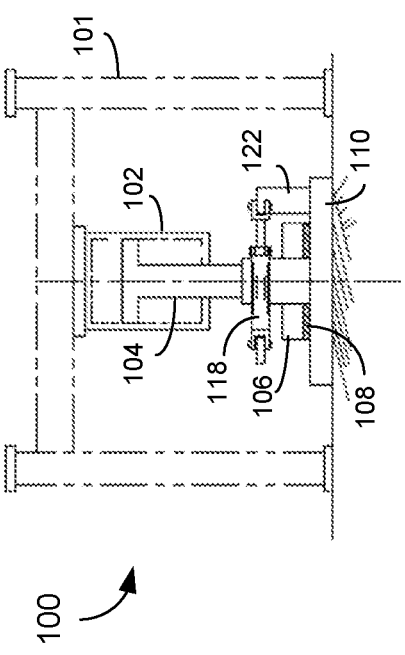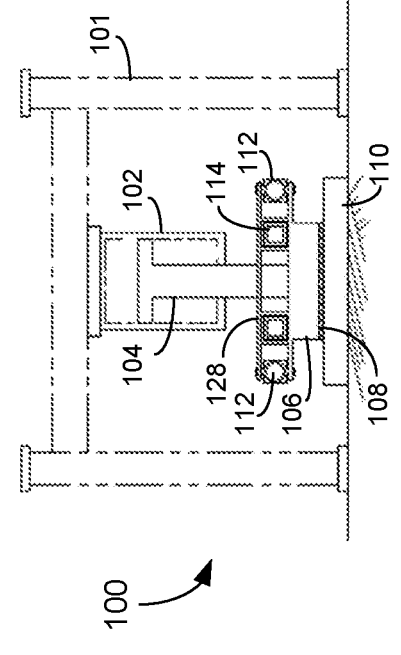

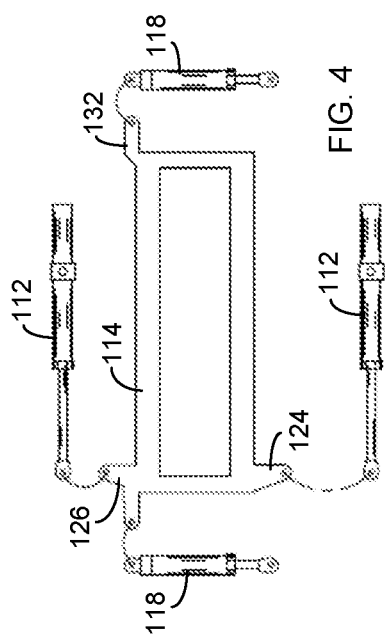
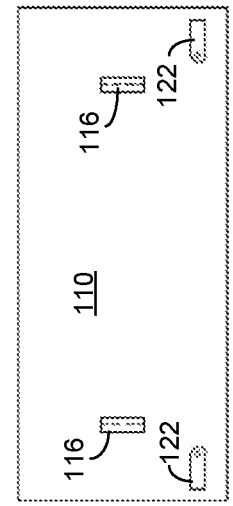
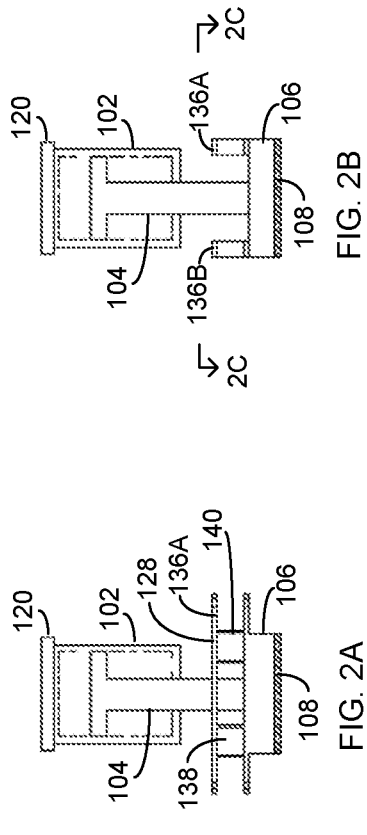
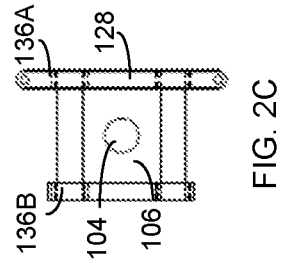
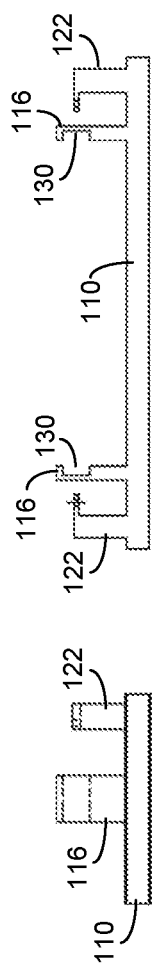

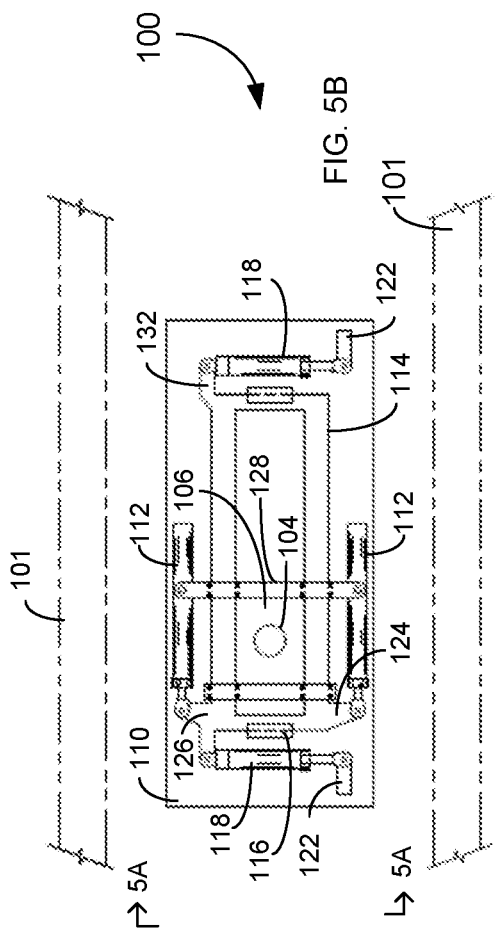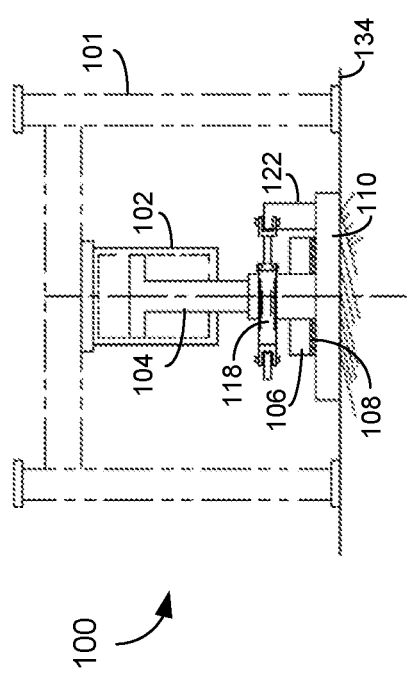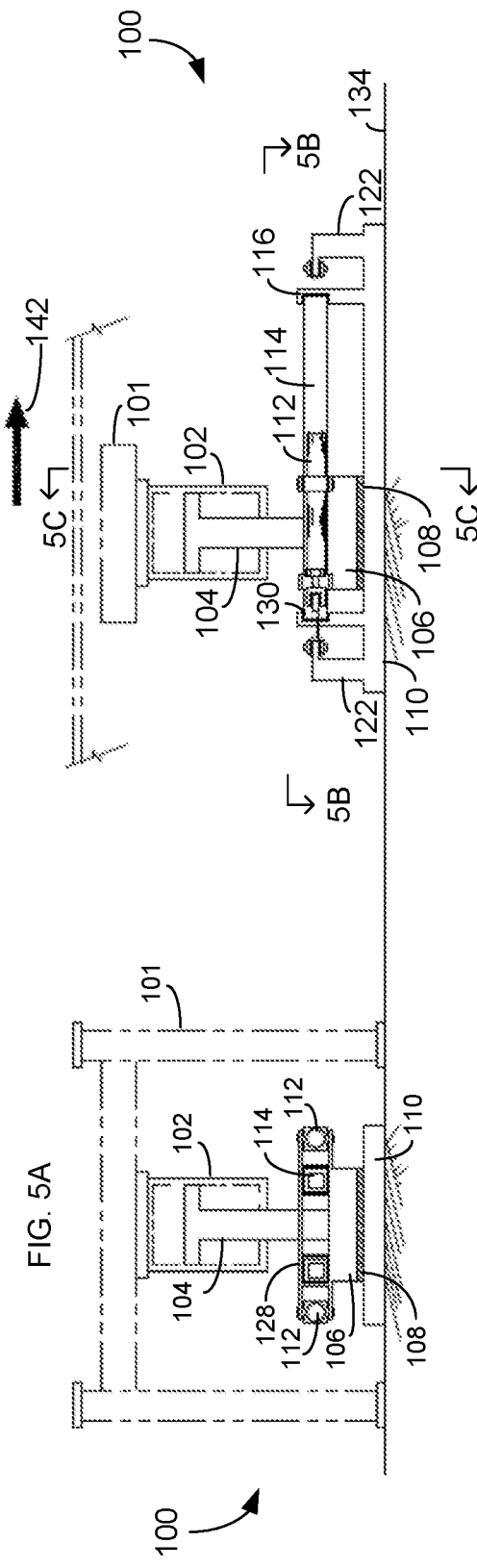

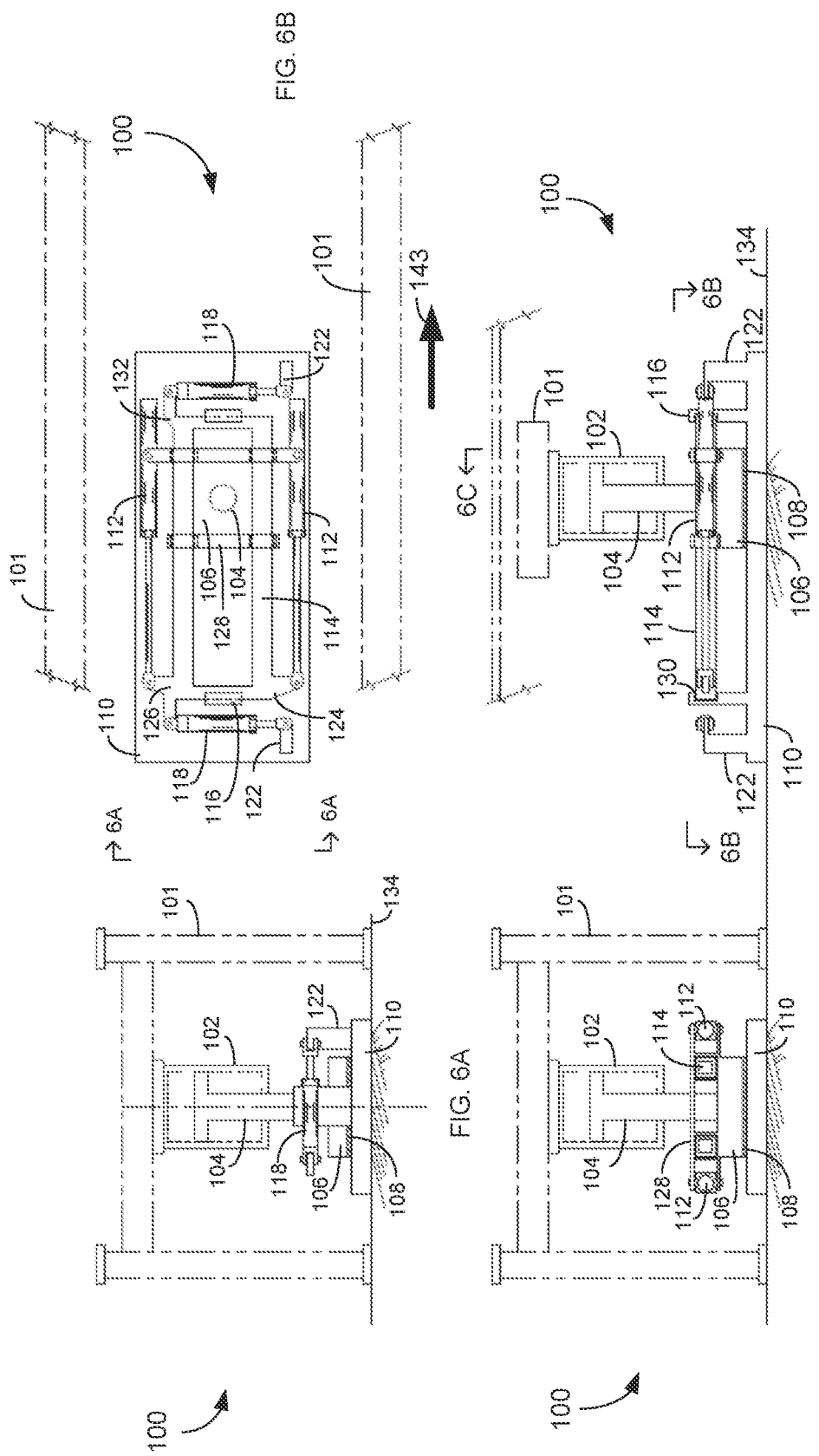

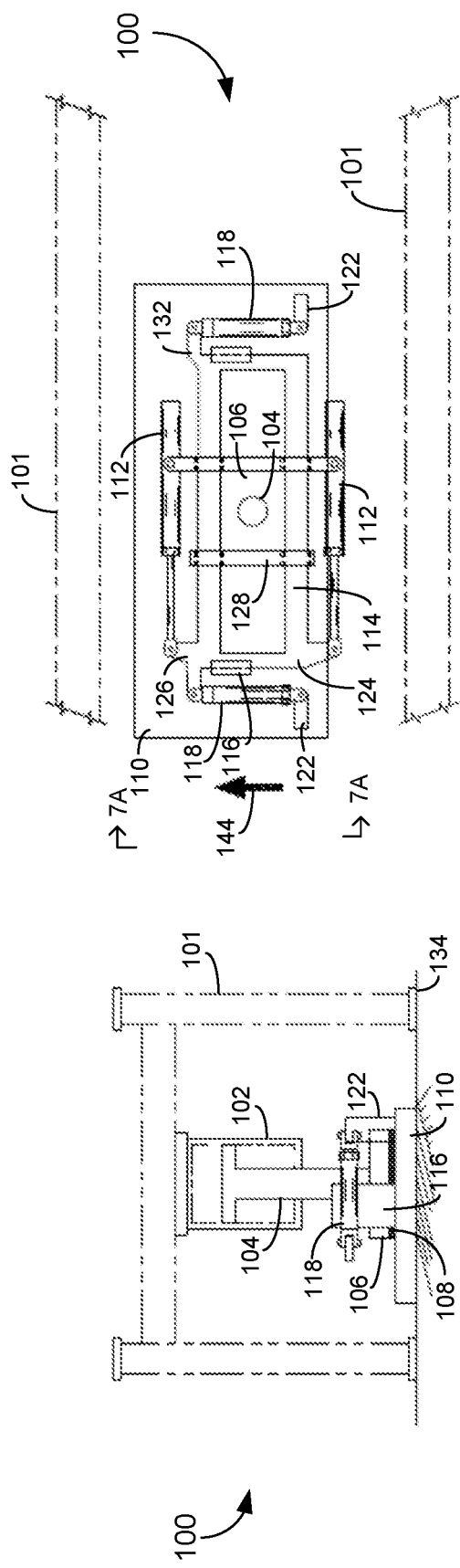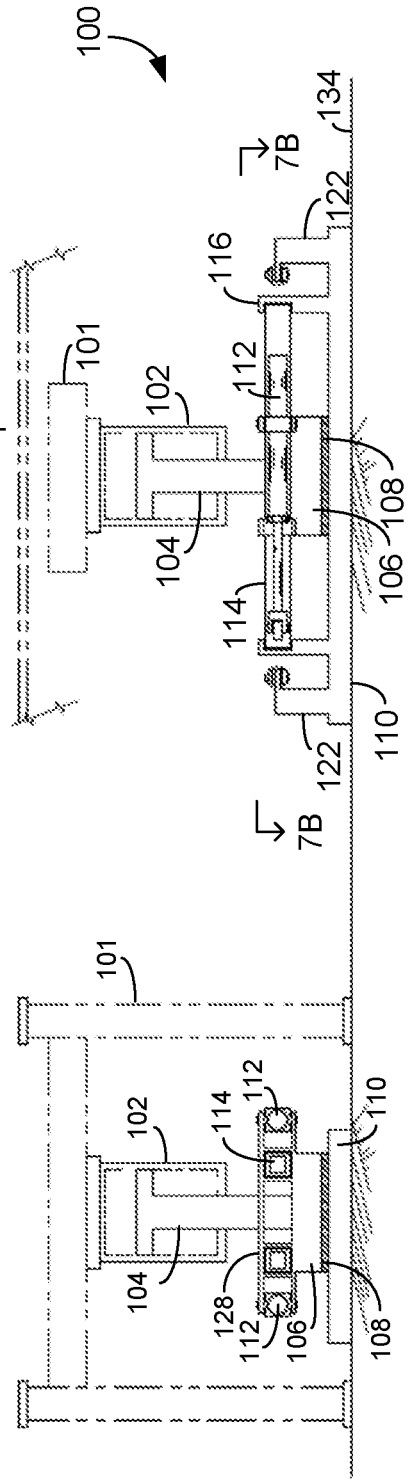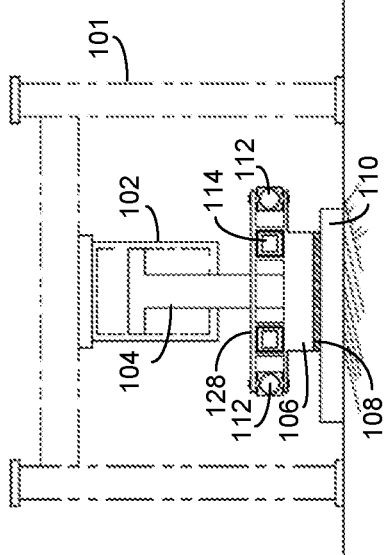

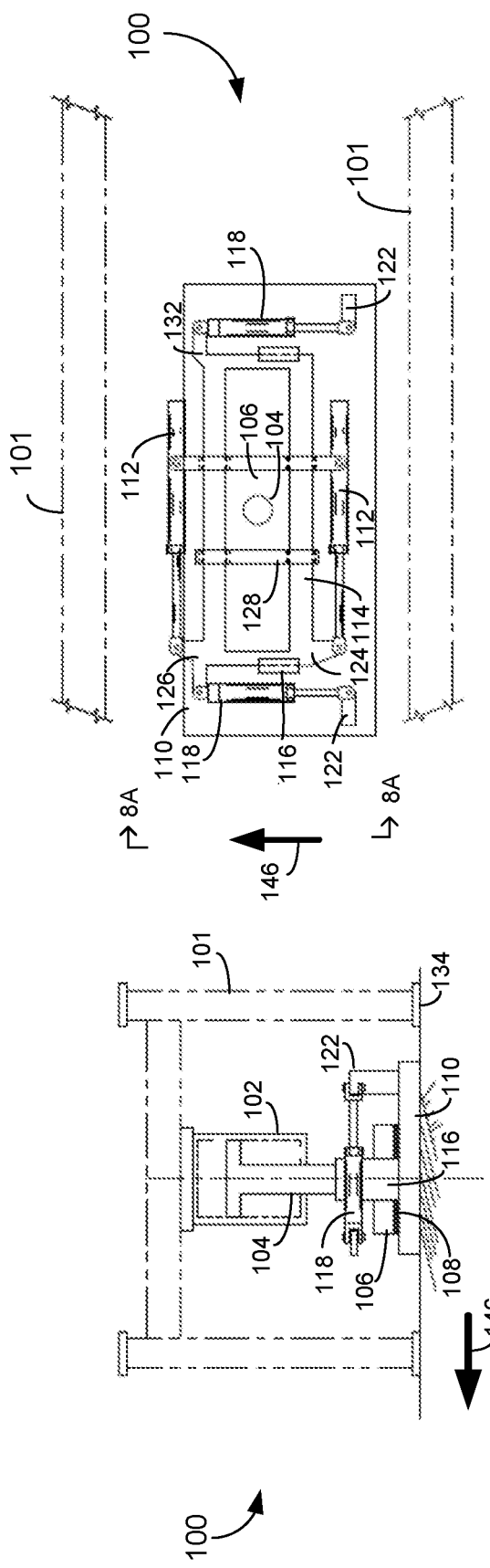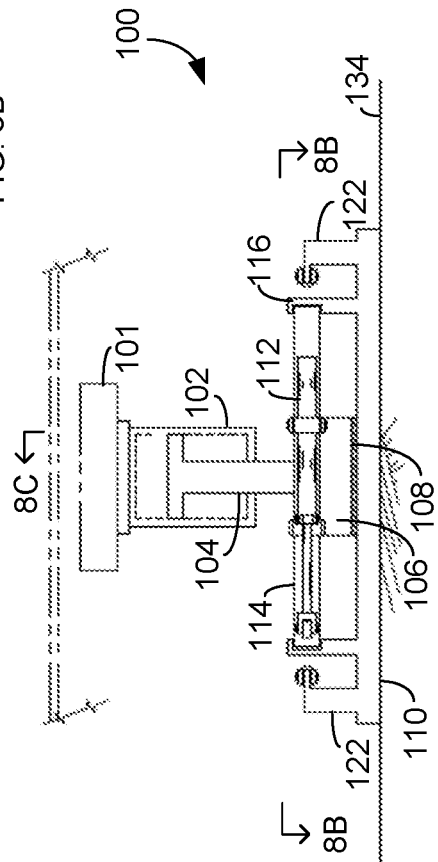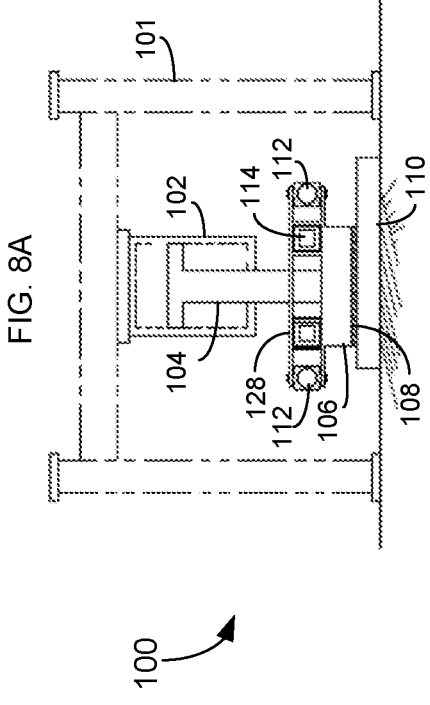

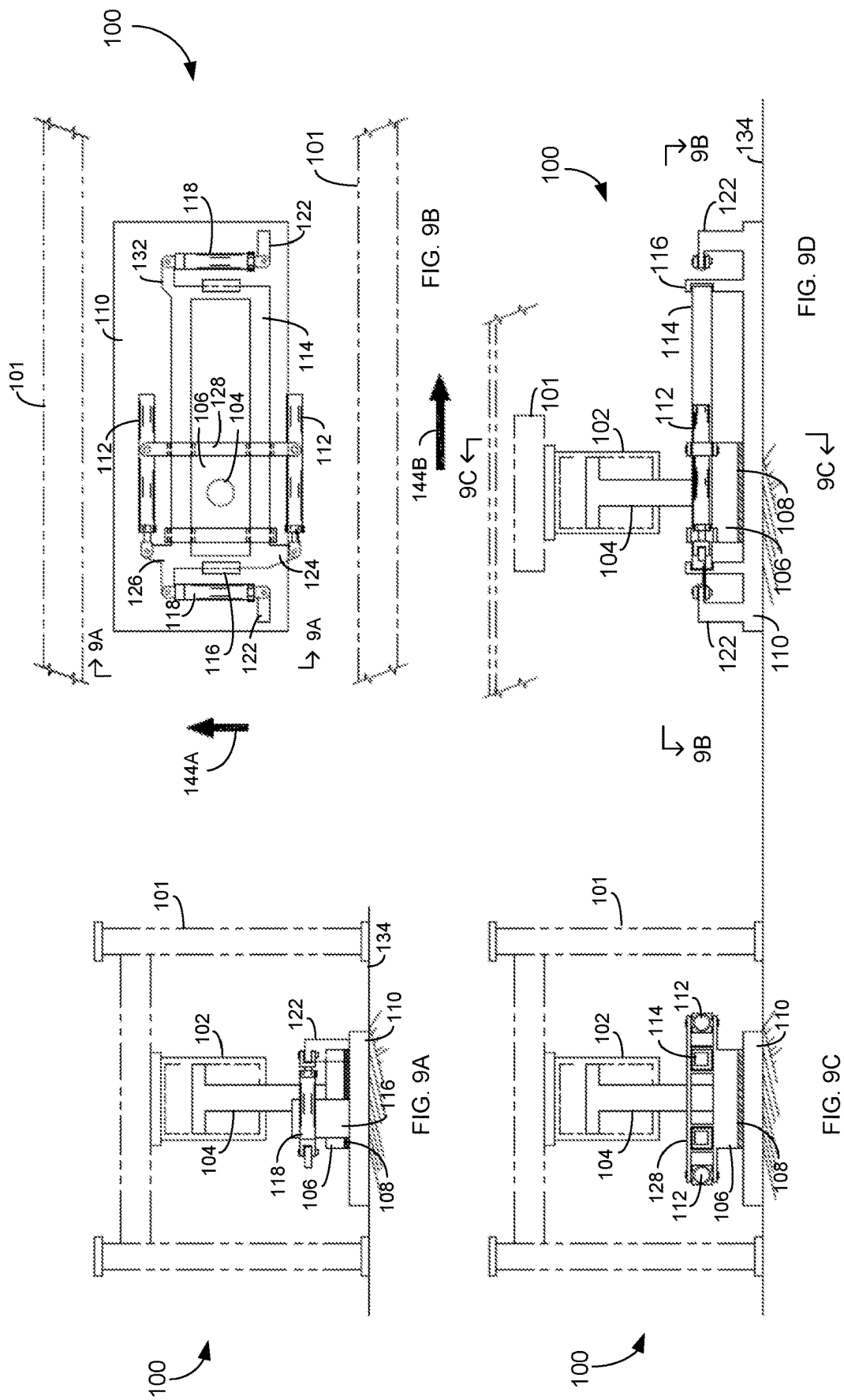

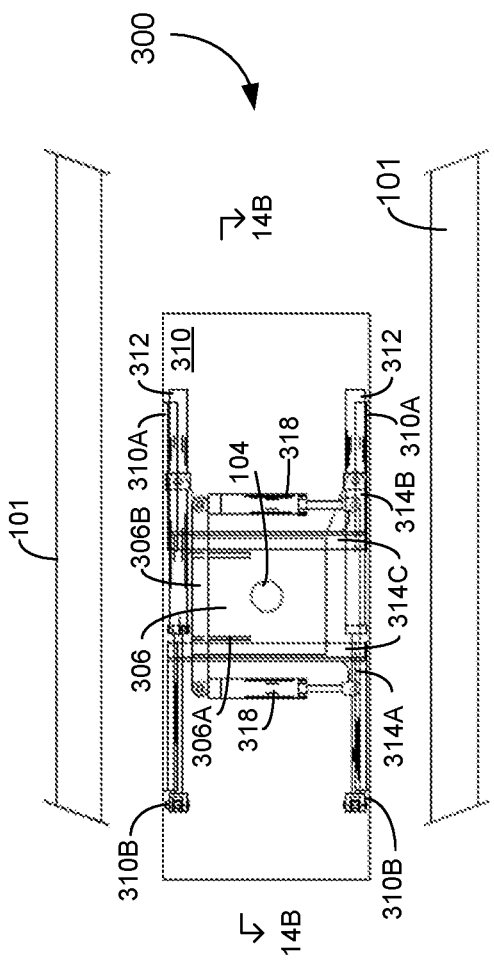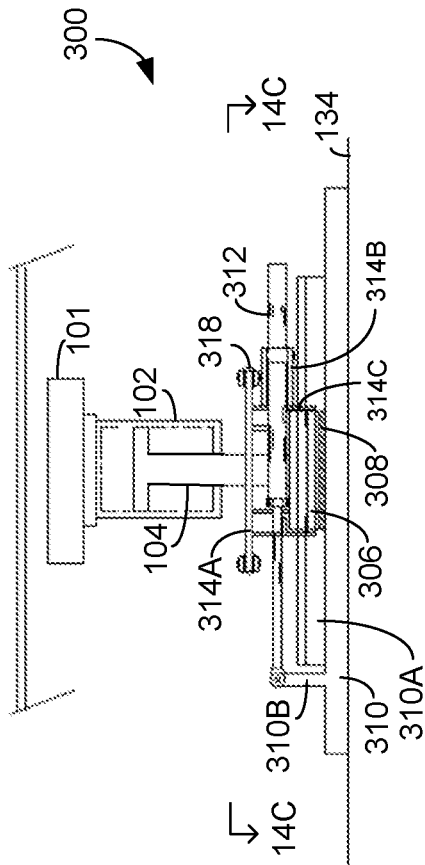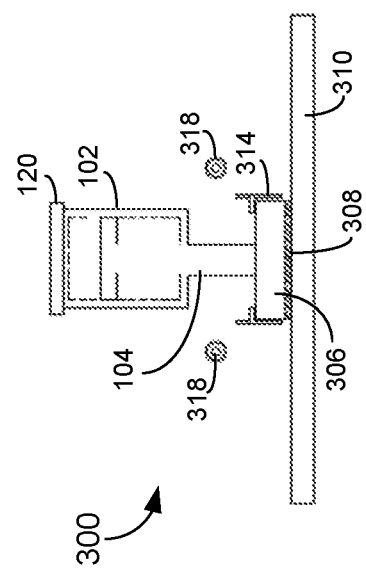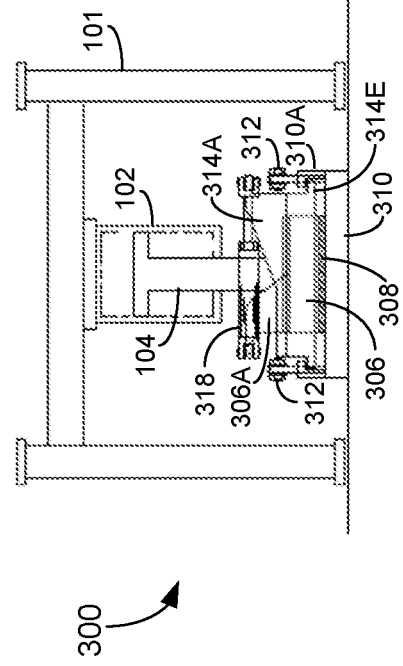

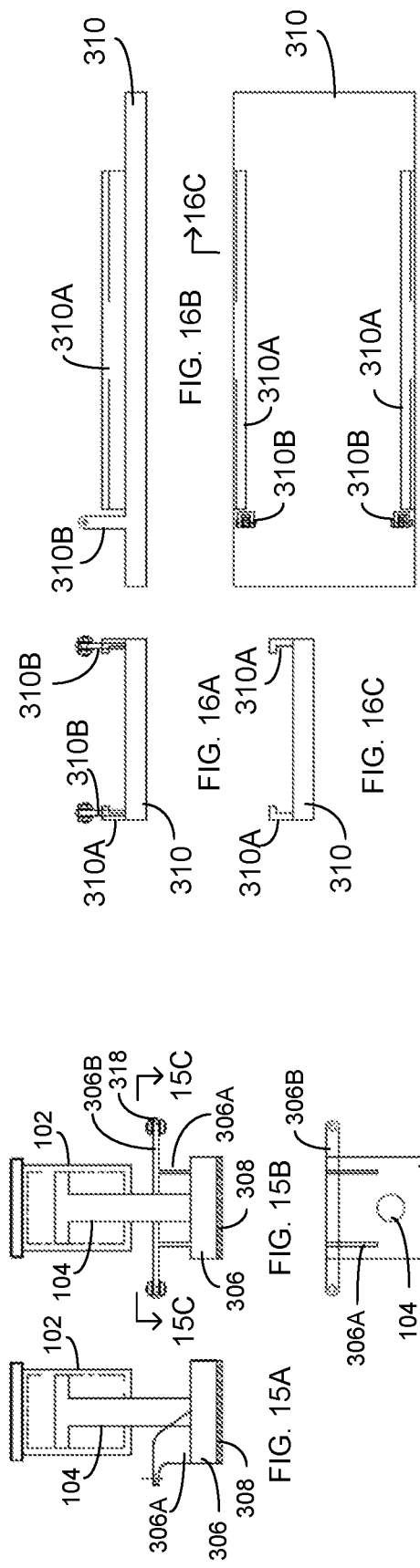
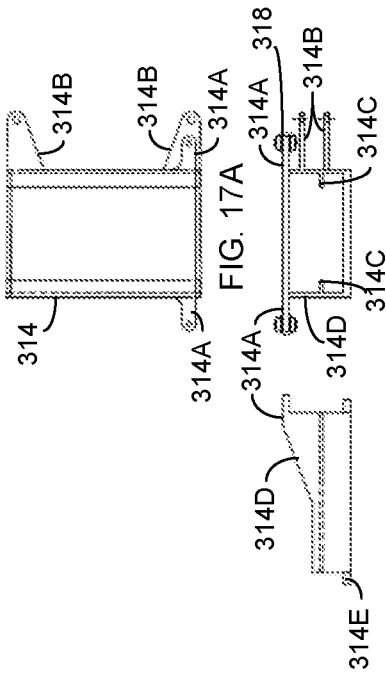

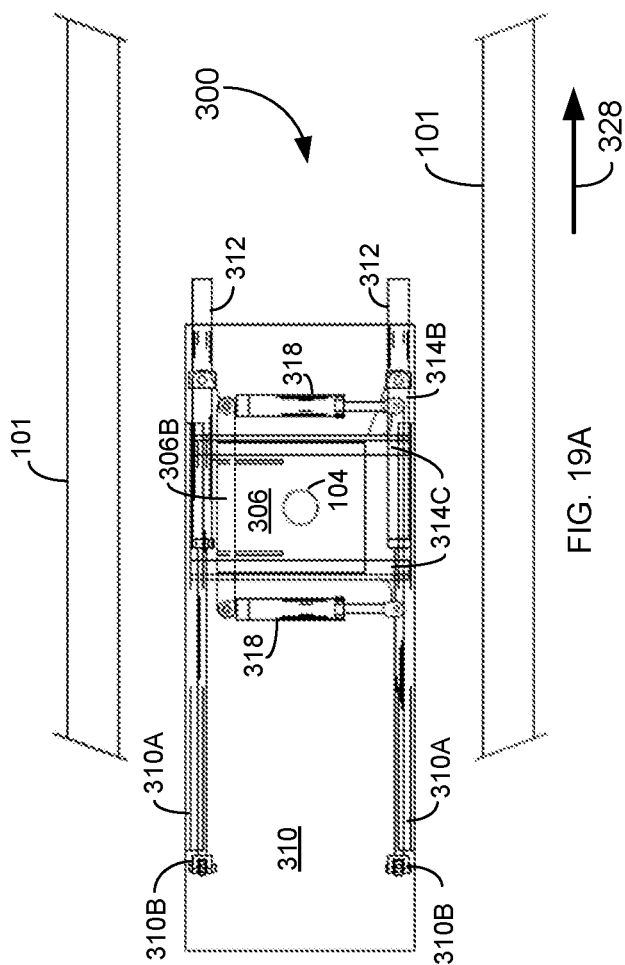
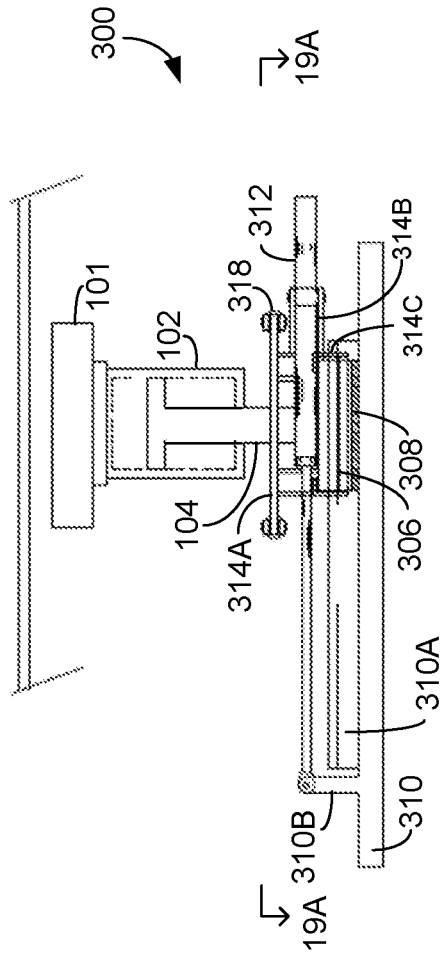

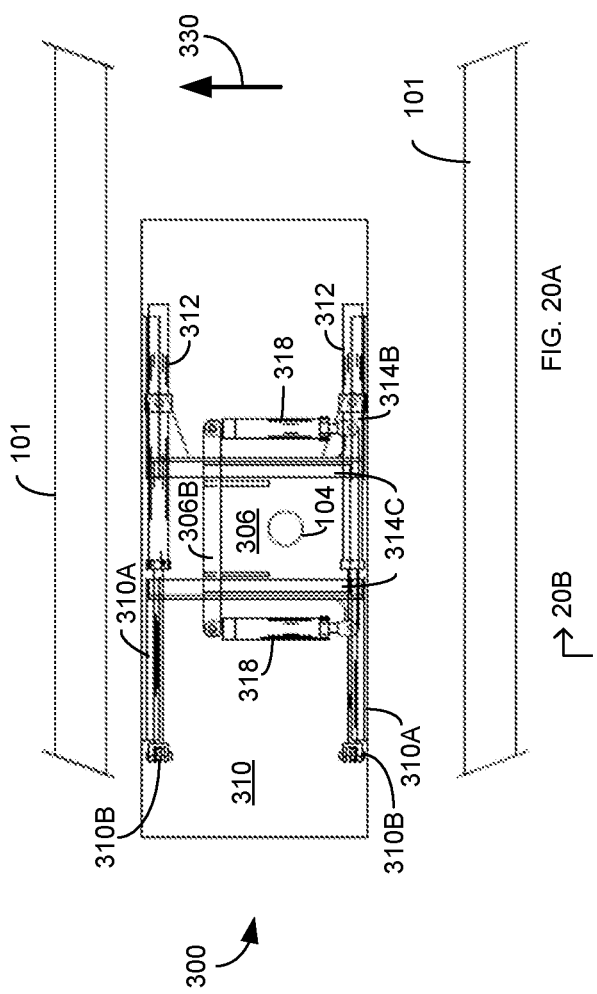
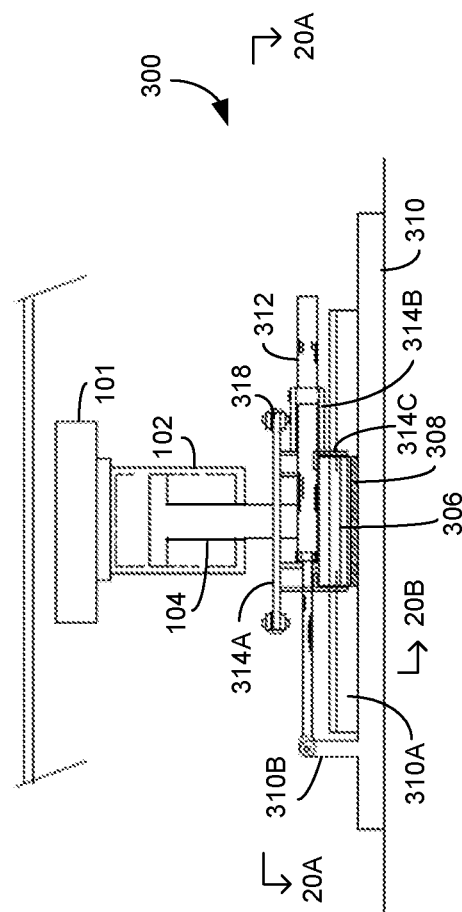
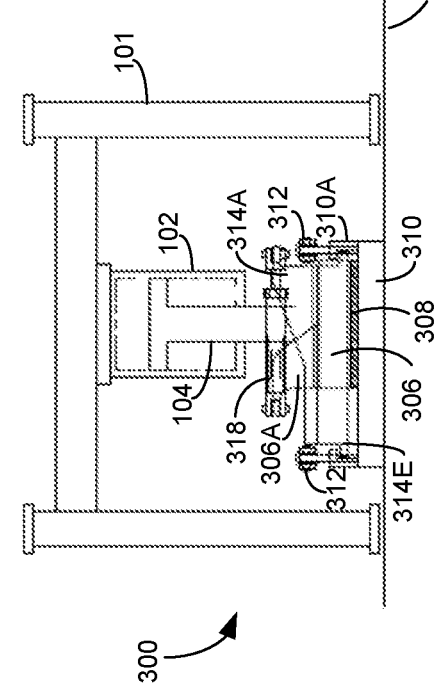
FIG. 20A
FIG. 20B
FIG. 20C

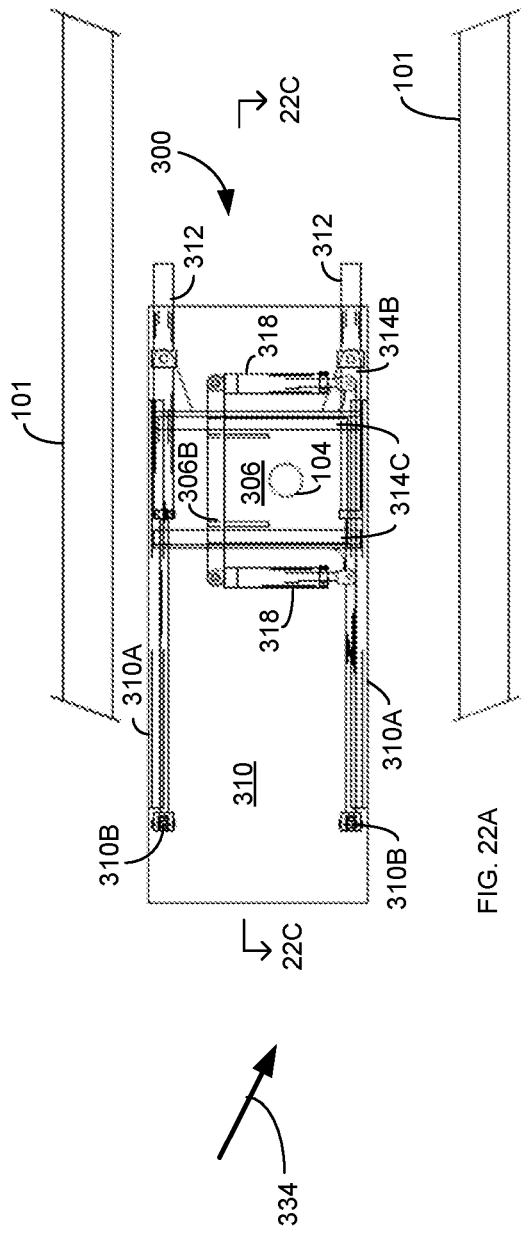
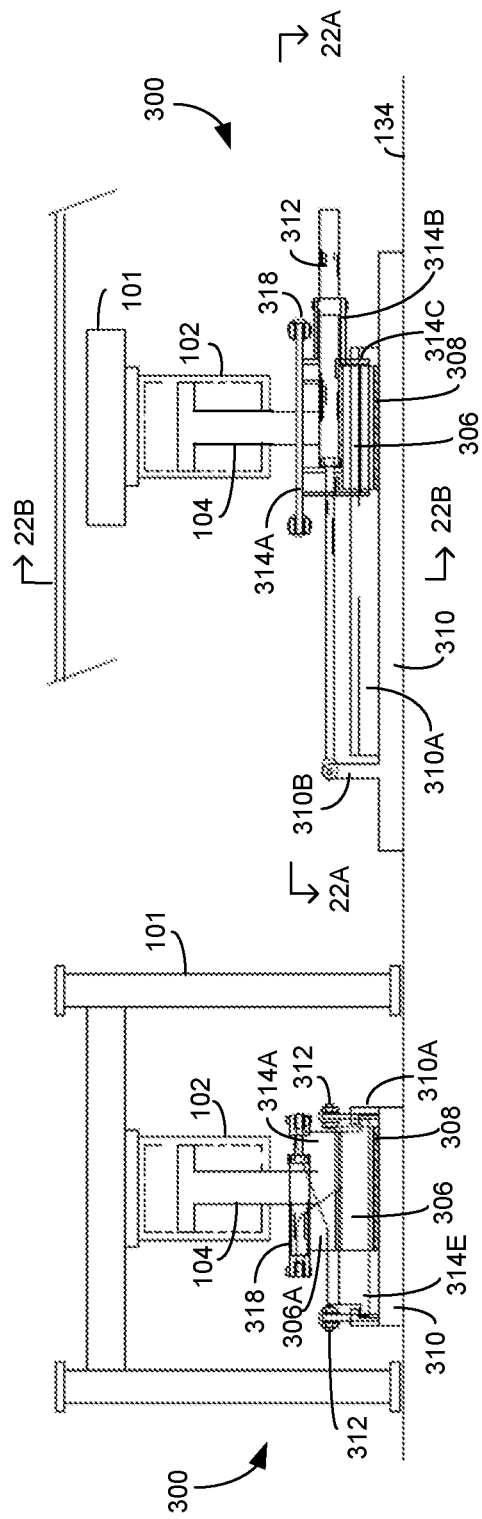

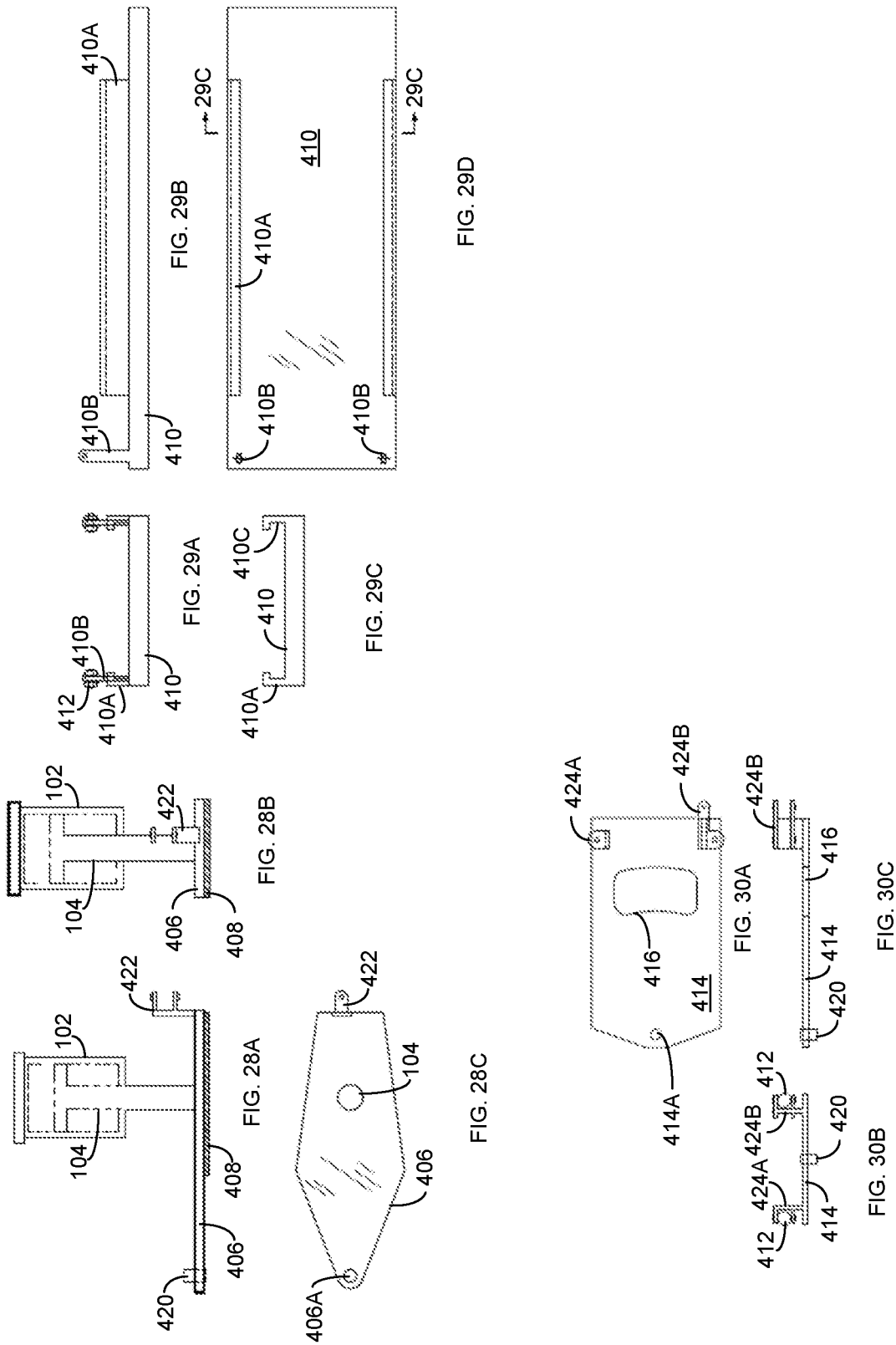

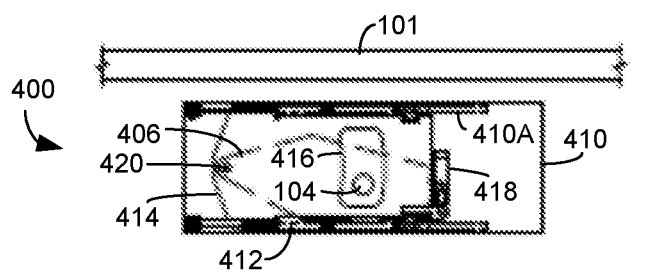
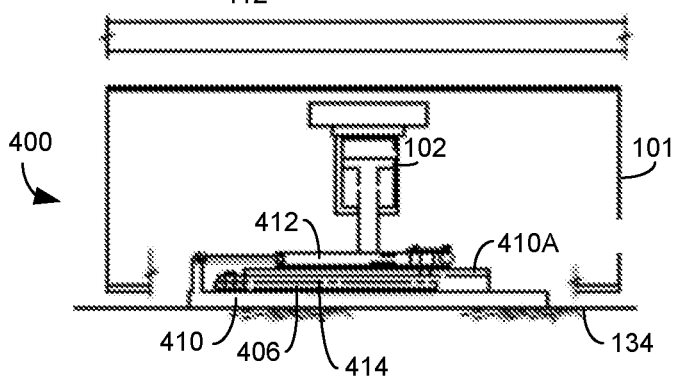
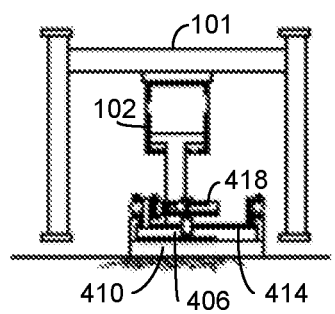
FIG. 32A
FIG. 32B
FIG. 32C
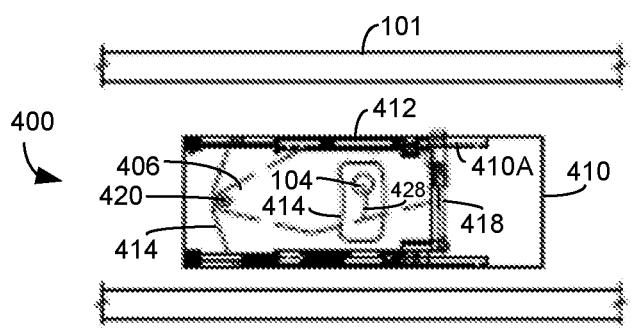
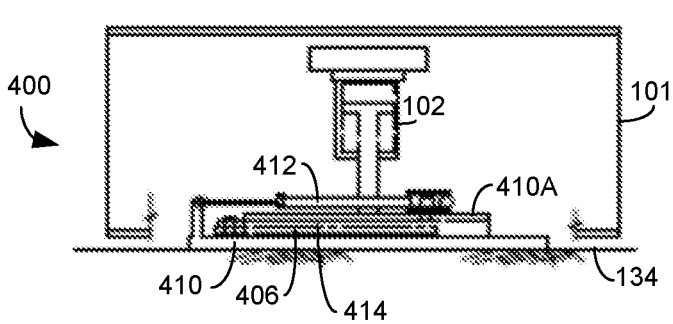
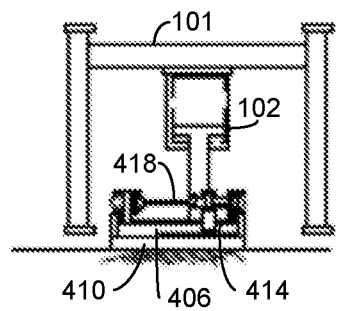
FIG. 33A
FIG. 33B
FIG. 33C

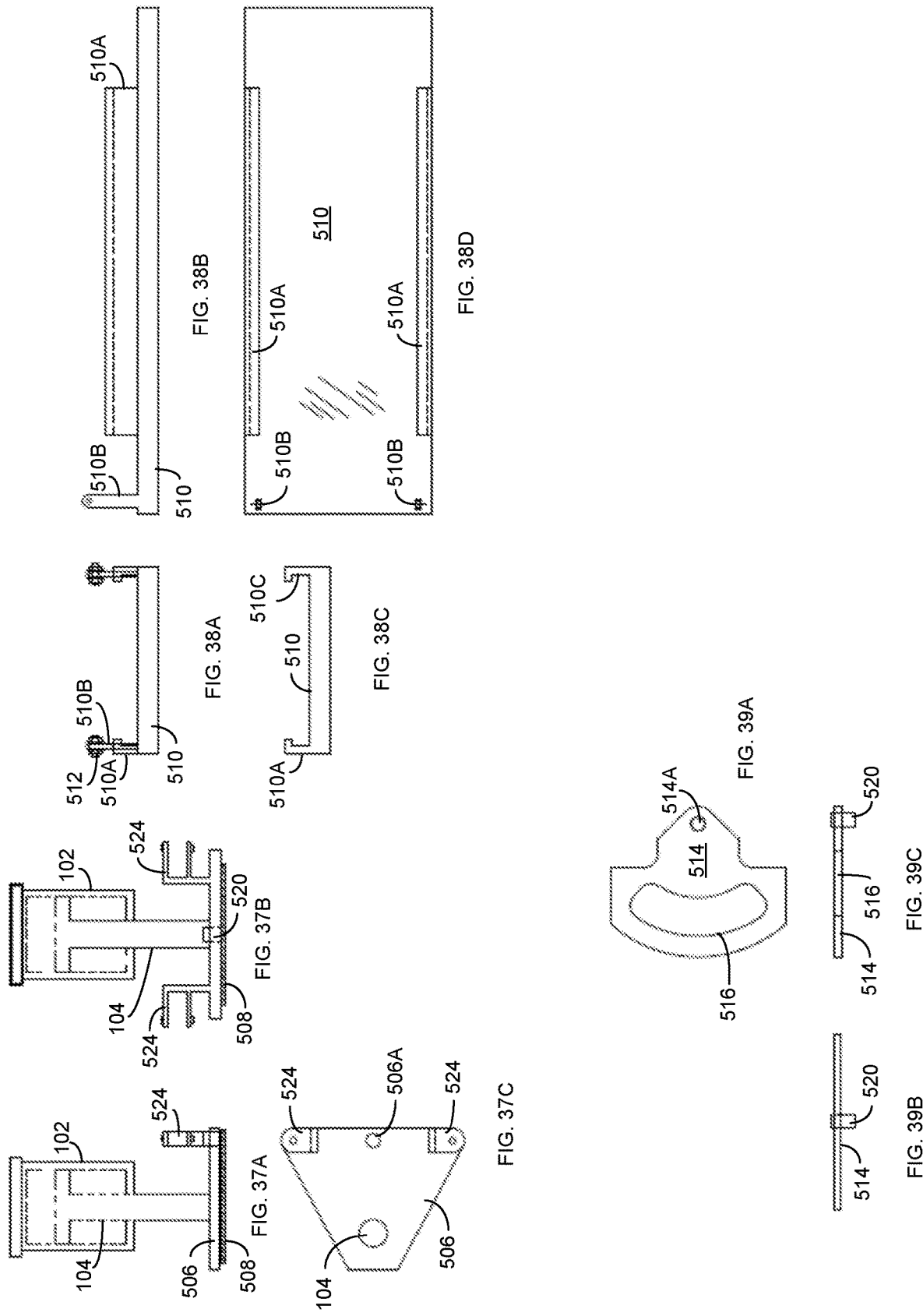

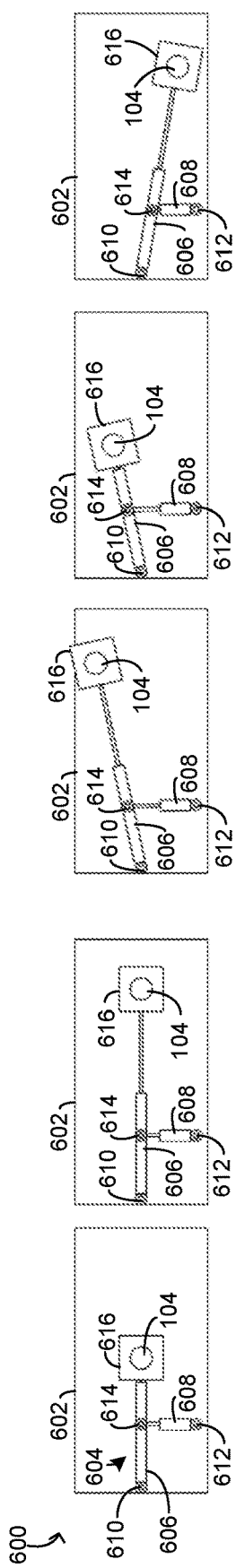
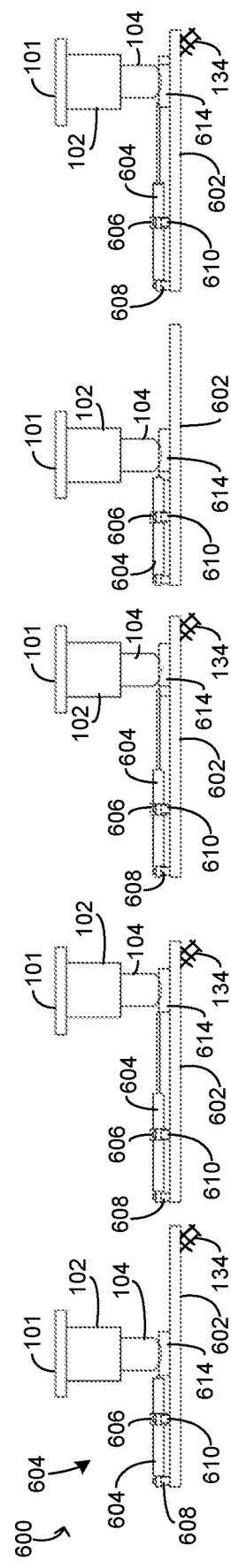

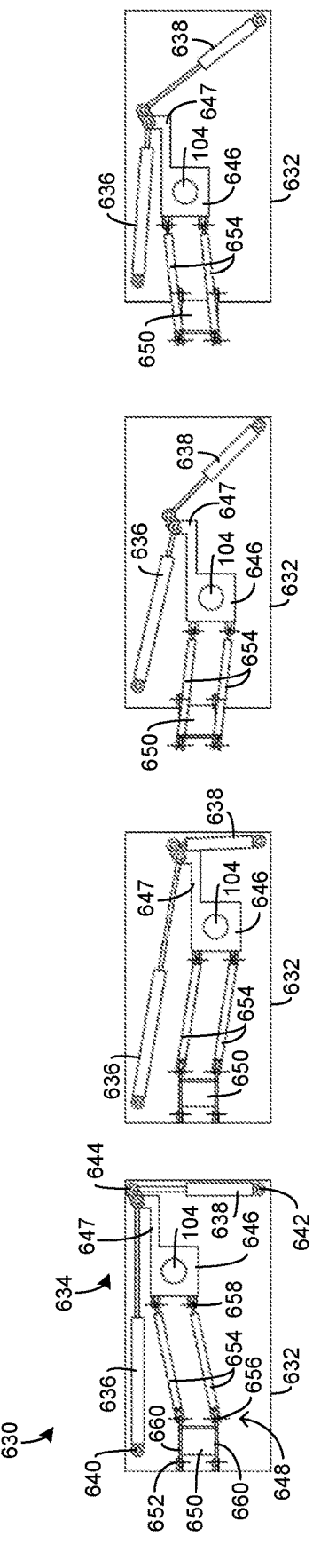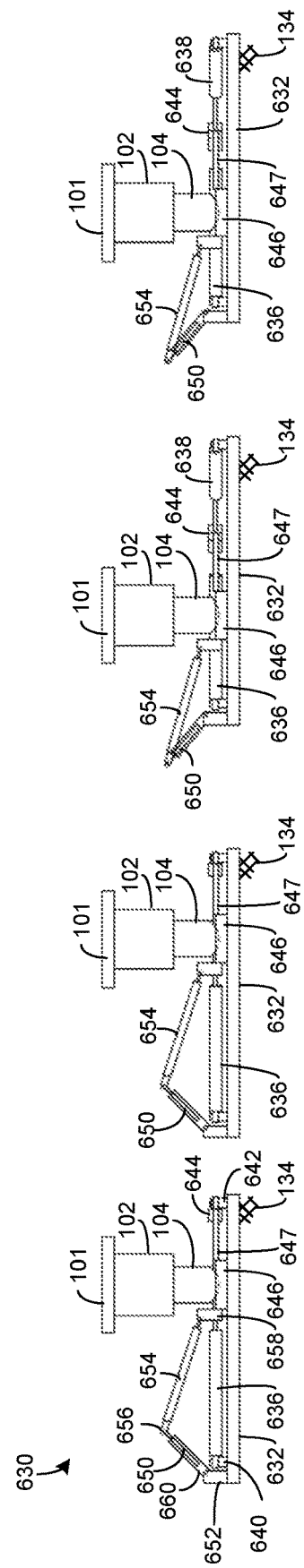

SKID SYSTEM FOR LOAD TRANSPORT APPARATUS

This application claims priority to U.S. Provisional Application 62/589,911 filed Nov. 22, 2017, the contents of which are herein incorporated by reference in their entirety.

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

This disclosure relates generally to apparatuses for transporting a load, and more particularly to load transporting apparatuses used to move heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Parker and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area.

BRIEF DESCRIPTION OF THE DRAWINGS

FIG. 1B shows an end view of the walking apparatus of FIG. 1A.

FIG. 1C shows a sectional plan view of the walking apparatus of FIG. 1A.

FIG. 1D shows an end sectional view of the walking apparatus of FIG. 1A.

FIG. 1E shows a side view of the walking apparatus of FIG. 1A.

FIG. 2A shows an end view of a load plate and lift cylinder assembly used with the walking apparatus of FIG. 1A.

FIG. 2B shows a side view of the load plate and lift cylinder assembly shown in FIG. 2A.

FIG. 2C shows a plan view of the load plate and lift cylinder assembly shown in FIG. 2A.

FIG. 3A shows an end view of a support foot used with the walking apparatus of FIG. 1A.

FIG. 3B shows a side view of the support foot shown in FIG. 3A.

FIG. 3C shows a plan view of the support foot shown in FIG. 3A.

FIG. 4 shows a plan view of a frame used with the walking apparatus of FIG. 1A.

FIGS. 5A-5D and 6A-6D show a longitudinal stepping operation for the walking apparatus of FIG. 1A.

FIGS. 7A-7D and 8A-8D show a lateral stepping operation for the walking apparatus of FIG. 1A.

FIGS. 9A-9D show a combination longitudinal-lateral stepping operation for the walking apparatus of FIG. 1A.

FIG. 14B shows an isolated end view of the walking apparatus of FIG. 14A.

FIG. 14C shows a sectional plan view of the walking apparatus of FIG. 14A.

FIG. 14D shows a sectional end view of the walking apparatus of FIG. 14A.

FIG. 14E shows a side view of the walking apparatus of FIG. 14A.

FIG. 15A shows a side view of a load plate and lift cylinder assembly used with the walking apparatus of FIGS. 14A-14E.

FIG. 15B shows an end view of the load plate and lift cylinder assembly shown in FIG. 15A.

FIG. 15C shows a plan view of the load plate and lift cylinder assembly shown in FIG. 15A.

FIG. 16A shows an end view of a support foot used with the walking apparatus of FIGS. 14A-14E.

FIG. 16B shows a side view of the support foot shown in FIG. 16A.

FIG. 16C shows another end view of the support foot in FIG. 16A.

FIG. 16D shows a plan view of the support foot shown in FIG. 16A.

FIG. 17A shows a plan view of an intermediate frame used in the walking apparatus of FIGS. 14A-14E.

FIG. 17B shows a side view of the intermediate frame in FIG. 17A.

FIG. 17C shows an end view of the intermediate frame in FIG. 17A.

FIGS. 18A-18C and 19A-19B show a longitudinal stepping operation for the walking apparatus of FIGS. 14A-14E.

FIGS. 20A-20C and 21A-21C show a lateral stepping operation for the walking apparatus of FIGS. 14A-14E.

FIGS. 22A-22C show a combination longitudinal-lateral stepping operation for the walking apparatus of FIGS. 14A-14E.

FIG. 28A is an isolated side view of load plate and lift cylinder assembly used in the walking apparatus in FIGS. 27A-27D.

FIG. 28B is an isolated end view of the load plate and lift cylinder assembly in FIG. 28A.

FIG. 28C is an isolated plan view of the load plate and lift cylinder assembly in FIG. 28A FIG. 29A is an end view of a support foot used in the walking apparatus in FIGS. 27A-27D.

FIG. 29B shows a side view of the support foot in FIG. 29A.

FIG. 29C shows a sectional end view of the support foot in FIG. 29A.

FIG. 29D shows a top plan view of the support foot in FIG. 29A.

FIG. 30A is a plan view of a frame used in the walking apparatus in FIGS. 27A-27D.

FIG. 30B is an end view of the frame in FIG. 30A.

FIG. 30C is a side view of the frame in FIG. 30A.

FIGS. 32A-32C, 33A-33C, 34A-34C, and 35A-35C show a lateral walking cycle for the walking apparatus in FIGS. 27A-27D.

FIG. 37A is an isolated side view of load plate and lift cylinder assembly used in the walking apparatus in FIGS. 36A-36D.

FIG. 37B is an isolated end view of the load plate and lift cylinder assembly in FIG. 37A.

FIG. 37C is an isolated plan view of the load plate and lift cylinder assembly in FIG. 37A FIG. 38A is an end view of a support foot used in the walking apparatus in FIGS. 36A-36D.

FIG. 38B shows a side view of the support foot in FIG. 38A.

FIG. 38C shows a sectional end view of the support foot in FIG. 38A.

FIG. 38D shows a plan view of the support foot in FIG. 38A.

FIG. 39A is a plan view of a frame used in the walking apparatus in FIGS. 36A-36D.

FIG. 39B is an end view of the frame in FIG. 39A.

FIG. 39C is a side view of the frame in FIG. 39A.

FIGS. 41A-41E are plan views showing different walking operations of a frameless walking apparatus.

FIGS. 42A-42E are side views of the frameless walking apparatus in FIGS. 41A-41E.

FIGS. 43A-43D are plan views showing different walking operations of another frameless walking apparatus.

FIGS. 44A-44D are side views of the frameless walking apparatus in FIGS. 43A-43D.

DETAILED DESCRIPTION

As described above, walkers, or walking machines, are vehicles that transport heavy loads, such as entire oil well drilling rigs. Such loads weigh as much as several thousand tons and may be required to be sequentially positioned very precisely over spaced-apart well bores, for example. Embodiments of the present concept are directed to controlling walking apparatuses, such as walking machines, for moving heavy loads over small distances with the ability to fine tune the resultant position of the heavy load.

For ease of understanding, the terms, "walkers," "walking machines," "walking devices," and "walking apparatuses" are used interchangeably below. Walking apparatus or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
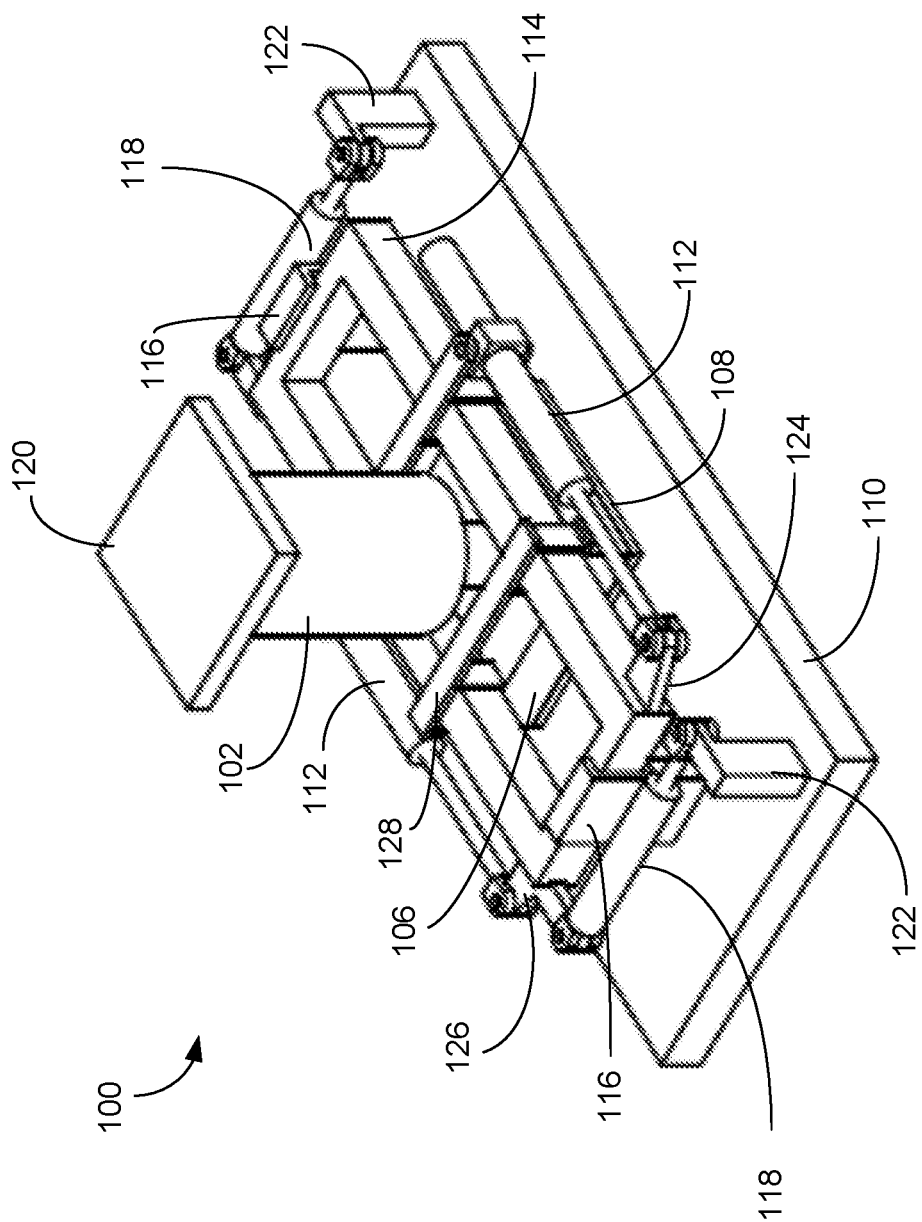
FIG. 1A shows an isometric view of a low-profile walking apparatus.

FIGS. 1A-1E show a low-profile walking apparatus 100 that includes a unique skid system. FIG. 1A is an isometric view of walking apparatus 100, FIG. 1B is an end view of walking apparatus 100, FIG. 1C is a sectional plan view of walking apparatus 100, FIG. 1D is another end sectional view of walking apparatus 100, and FIG. 1E is a side view of walking apparatus 100.

Referring to FIGS. 1A-1E, walking apparatus 100 includes a lift cylinder 102 that attaches at a top end via a mounting plate 120 to a load or a load bearing frame 101. A lift rod 104 extends down out of lift cylinder 102 and is attached at a bottom end to a load plate 106. Load plate 106 is alternatively referred to as load bearing device. An anti-friction pad 108 may attach to a bottom side of load plate 106 and sit on a top surface of a support foot 110. In another example, anti-friction pad 108 may be attached to a top surface of support foot 110. In this example, anti-friction pad 108 may extend across substantially the entire top surface of support foot 110. In one example, anti-friction pad 108 may be made out of a hard plastic, but can be any material that reduces the friction between support foot 110 and load plate 106. Anti-friction pad 108 may also be omitted from the mechanism and load plate 106 may bear directly on support foot 110.

Load plate 106 includes an assembly 128 that is linear-translationally coupled to an intermediate frame 114. Front and back rails 116 extend up from support foot 110 and hold frame 114 in a secured longitudinal position relative to support foot 110. Rails 116 include laterally extending channels 130 that hold frame 114 in a secured vertical position relative to support foot 110. Rails 116 and channels 130 allow lateral motion of frame 114 relative to support foot 110.

A first longitudinal travel cylinder 112 attaches at one end to a mounting arm 124 that extends laterally out from a front left side of frame 114 and attaches at a back end to the assembly 128 attached to load plate 106. A second longitudinal travel cylinder 112 attaches at a front end to a mounting arm 126 that extends laterally out from a front right side of frame 114 and attaches at a back end to load plate assembly 128.

A first lateral travel cylinder 118 attaches at a first end to a mounting post 122 that extends up from a first longitudinal end of support foot 110 and attaches at a second end to mounting arm 126. A second lateral travel cylinder 118 attaches at a first end to a second mounting post 122 that extends up from and opposite longitudinal end of support foot 110 and attaches at a second end to a mounting arm 132 that extends out from frame 114.

FIG. 2A is an isolated end view of load plate 106 attached to lift cylinder 102, FIG. 2B is an isolated side view of load plate 106, and FIG. 2C is an isolated plan view of load plate 106 sectioned through lift rod 104. Referring to FIGS. 2A-2C, assembly 128 includes vertical supports 140 that extend up and out from load plate 106 and includes a horizontal bar 136 extending over the top of vertical supports 140.

A first horizontal bar 136A extends out over opposite lateral sides of a first end of load plate 106 and retains frame 114 and longitudinal travel cylinders 112. A second horizontal bar 136B extends over a second end of load plate 106 and retains frame 114. Vertical supports 140 and horizontal bars 136A and 136B form holes 138 that slidingly receive frame 114. Lift rod 104 is mounted in substantially the center top surface of load plate 106.

FIG. 4 shows an isolated top plan view of frame 114. Frame 114 may include a rectangular shape with elongated side bars joined by shorter front and back end bars. As described above, mounting arm 126 extends out laterally for connecting to an associated longitudinal travel cylinder 112 and extends out longitudinally for connecting with an associated lateral travel cylinder 118. Mounting arm 124 extends laterally out from an opposite lateral side to connect with an associated longitudinal travel cylinder 112. Mounting arm 132 extends from an opposite longitudinal end of frame 114 to connect with associated lateral travel cylinder 118. While shown having a square cross-sectional shape, the members used for frame 114 may be round or any other cross-sectional shape.

FIG. 3A shows an end view of support foot 110, FIG. 3B shows a side view of support foot 110, and FIG. 3C shows a top plan view of support foot 110. Posts 122 extend up from opposite longitudinal ends of support foot 110 and attach to associated lateral travel cylinders 118. Rails 116 also extend up from opposite longitudinal ends of support foot 110 and include inwardly facing channels 130 for receiving opposite ends of frame 114.

Referring to FIGS. 1A-1E, 2A-2C, 3A-3C, and 4, walking apparatus 100 uses a unique single substantially planar interface between the top of support foot 110 and the bottom of load plate 106 to move a load both laterally, longitudinally, and in any curved, angular, diagonal, or non-linear direction. The single plane used for moving load plate 106 in different directions provides walking apparatus 100 with a low vertical profile that can be installed in load bearing frames with lower ground clearances.

As mentioned above, frame 114 is held in a same longitudinal position relative to support foot 110 by rails 116. However, frame 114 may move laterally relative to support foot 110 by sliding within channels 130 of rails 116. Longitudinal travel cylinders 112 are extended or retracted to move load bearing frame 101 longitudinally. Travel cylinders 112 move load plate assembly 128 longitudinally along frame 114 sliding attached load plate 106, lift cylinder 102, and supported load bearing frame 101 longitudinally over support foot 110.

Lateral travel cylinders 118 are extended or retracted to move load bearing frame 101 laterally relative to support foot 110. For example, extending travel cylinders 118 moves frame 114 laterally within rails 116. Frame 114 presses against vertical supports 140 of load plate assembly 128 moving attached load plate 106, lift cylinder 102, and supported load bearing frame 101 laterally relative to support foot 110.

FIGS. 5A-5D and 6A-6D show an example of how load bearing frame 101 is moved longitudinally relative to support foot 110. FIGS. 5A and 6A are end views of walking apparatus 100, FIGS. 5B and 6B are sectional plan views of walking apparatus 100, FIGS. 5C and 6C are end sectional views of walking apparatus 100, and FIGS. 5D and 6D are side views of walking apparatus 100.

Referring first to FIGS. 5A-5D, lateral travel cylinders 118 may be partially extended holding load plate 106 in a substantially middle position between opposite lateral sides of support foot 100. However, load plate 106 may be held by cylinders 118 in any selectable lateral position relative to support foot 110.

While not shown in FIGS. 5A-5D, lift cylinder 102 may retract lift rod 104, lowering load bearing frame 101 onto base surface 134 and in turn vertically raising load plate 106, which in turn lifts frame 114. The channels 130 in rails 116 then lift support foot 110. Support foot 110 is lifted above base surface 134 and longitudinal travel cylinders 112 are retracted as shown in FIGS. 5B and 5D. Travel cylinders 112 retract moving frame 114 and attached support foot 110 in a forward direction as shown by arrow 142.

The raising and lowering of support foot 110 and the load bearing frame 101 is described in the following patents which are herein incorporated by reference in their entireties. U.S. Pat. Nos. 9,862,437; 9,533,723; 9,096,282; 8,573,334; 8,561,733; and 8,490,724.

Lift rod 104, load plate 106, load plate assembly 128 and longitudinal travel cylinders 112 are all operably coupled to load bearing frame 101. When travel cylinders 112 are retracted, load bearing frame 101, lift rod 104, load plate 106, and load plate assembly 128 remain in a substantially the same longitudinal position relative to base surface 134. Retracting travel cylinders 112 cause frame 114 to slide forward through load plate assembly 128 also moving support foot 110 longitudinally forward as shown by arrow 142. Travel cylinders 112 are retracted until the longitudinal end of frame 114 reaches load plate assembly 128.

Referring to FIGS. 6A-6D, lift cylinder 102 may extend lift rod 104 lowering load plate 106 and attached support foot 110 back onto base surface 134. While not shown in FIGS. 6A and 6C, lift cylinder 102 may lift load bearing frame 101 off of base surface 134. In the lifted position, the weight of the load on load bearing frame 101 is directed through load plate 106 onto support foot 110.

It should be noted that at least in one example, the entire vertical load on load bearing frame 101 is directed onto load plate 106 and support foot 110. Other travel apparatus, such as frame 114 and load plate assembly 128 only have to apply horizontal pressure to move load plate 106.

The load on load bearing frame 101 secures support foot 110 to base surface 134 and frame 114 is longitudinally secured to support foot 110. Extending longitudinal travel cylinders 112 moves attached load plate assembly 128 toward the end of frame 114 and moves attached load plate 106, lift cylinder 102, and load bearing frame 101 longitudinally forward relative to support foot 110 as shown by arrow 143. Anti-friction pad 108 allows load plate 106 to slide longitudinally forward over the top surface of support foot 110 while support foot 110 remains in a same position on base surface 134.

FIGS. 7A-7D and 8A-8D show an example of how load bearing frame 101 is moved laterally relative to support foot 110. FIGS. 7A and 8A are end views of walking apparatus 100, FIGS. 7B and 8B are sectional plan views of walking apparatus 100, FIGS. 7C and 8C are end sectional views of walking apparatus 100, and FIGS. 7D and 8D are a side views of walking apparatus 100.

Referring first to FIGS. 7A-7D, longitudinal travel cylinders 112 may be placed in a partially extended position holding load plate 106 in a substantially middle position between opposite longitudinal ends of support foot 110. However, load plate 106 may be held by longitudinal travel cylinders 112 in any selectable longitudinal position relative to support foot 110.

While not shown in FIGS. 7A-7D, lift cylinder 102 may retract lift rod 104 in turn vertically raising load plate 106 and attached support foot 110, and lowering load bearing frame 101 onto base surface 134. Support foot 110 is lifted above base surface 134 and lateral travel cylinders 118 retracted. In the raised foot position, lift rod 104 is held in place by load bearing frame 101. Lift rod 104 holds load plate 106 in place and attached load plate assembly 128 holds frame 114 in place. Lateral travel cylinders 118 retract moving support foot 110 in a lateral direction shown by arrow 144. Retracting lateral cylinders 118 slide rails 116 toward the left lateral side of frame 114 and move support foot 110 transversely or laterally relative to load bearing frame 101.

Referring to FIGS. 8A-8D, lift cylinder 102 may extend lift rod 104 lowering load plate 106 and attached support foot 110 back onto base surface 134. While not shown in FIGS. 8A-8D, lift cylinder 102 may lift load bearing frame 101 off of base surface 134. In the lifted position, the weight of the load on load bearing frame 101 is directed through load plate 106 onto support foot 110.

Support foot 110 is now in a secured position on base surface 134. However, frame 114 is not laterally secured to support foot 110. Extending lateral travel cylinders 118 moves frame 114 and attached load plate assembly 128 toward the left lateral side of support foot 110. Load plate assembly 128 slides load plate 106 attached load bearing frame 101 laterally/transversely to the left relative to support foot 110 as shown by arrow 146. Anti-friction pad 108 allows load plate 106 to slide laterally over the top surface of support foot 110 while support foot 110 remains in a same position on base surface 134.

FIGS. 9A-9D show an example of how support foot 110 is moved both longitudinally and laterally at the same time. FIG. 9A is a front view of walking apparatus 100, FIG. 9B is a sectional plan view of walking apparatus 100, FIG. 9C is an end sectional view of walking apparatus 100, and FIG. 9D and is a side view of walking apparatus 100.

Referring to FIGS. 9A-9D, while support foot 110 is lifted off of base surface 134, both longitudinal travel cylinders 112 and lateral travel cylinders 118 are retracted. In the raised foot position, lift rod 104, load plate 106, load plate assembly 128 and frame 114 are operably held in place by load bearing frame 101. Lateral travel cylinders 118 retract moving support foot 110 in a left lateral direction shown by arrow 144A. Longitudinal travel cylinders 112 also retract moving frame 114 and attached support foot 110 longitudinally forward as shown by arrow 144B.

Lift rod 104 lowers support foot 110 raising load bearing frame 101 above base surface 134. The load on load bearing frame 101 secures support foot 110 onto base surface 134. Extending longitudinal travel cylinders 112 move load plate 106 and attached load bearing frame 101 longitudinally forward relative to support foot 110 as shown by arrow 144B. Extending lateral travel cylinders 118 at the same time also move load plate 106 and attached load bearing frame 101 laterally to the left as shown by arrow 144A. Thus, load bearing frame 101 may move in an angular, curved, diagonal, or non-linear direction relative to support foot 110 all on the same substantially planar interface between the top surface of support foot 110 and the bottom surface of load plate 106.

Figure 10:
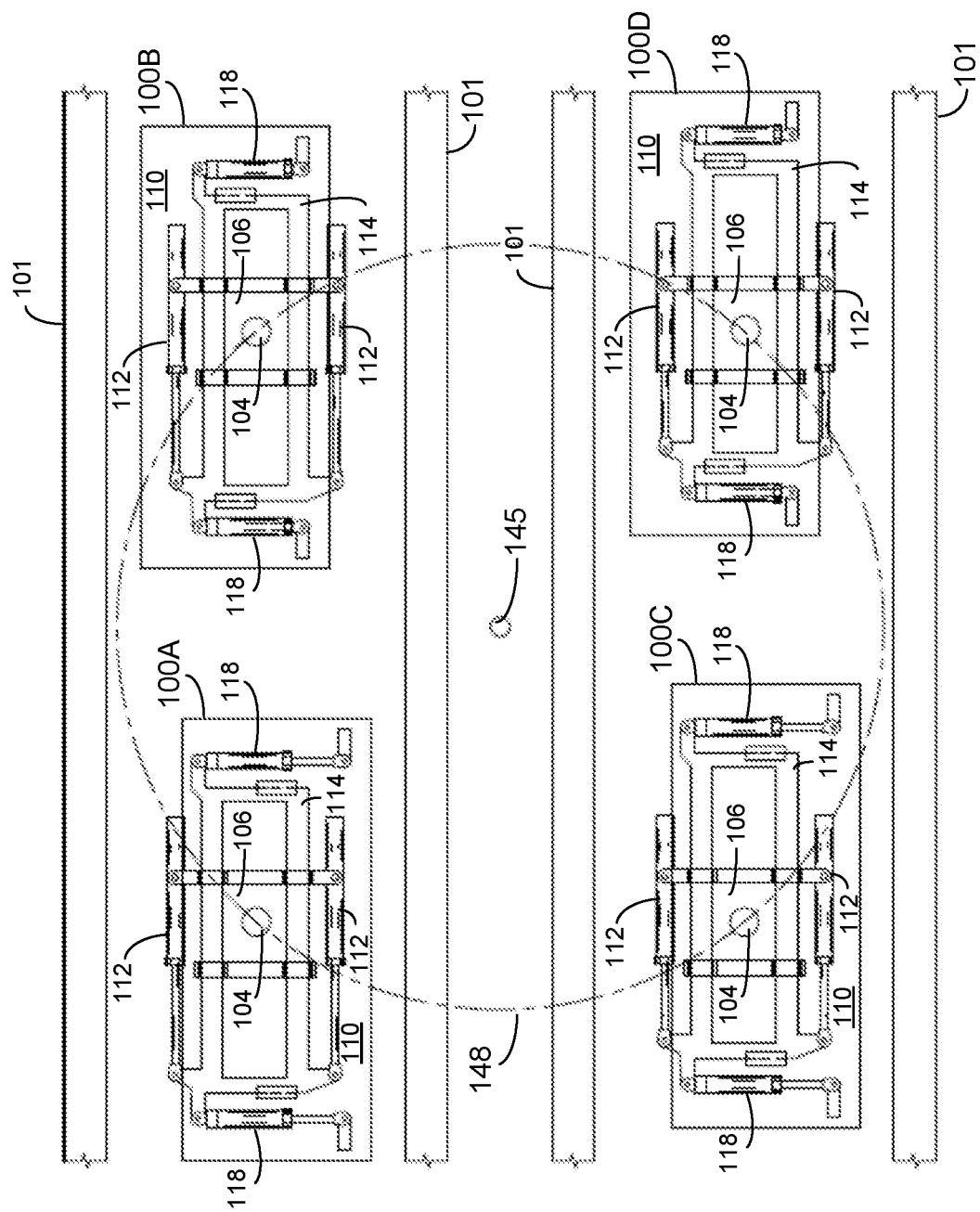
FIGS. 10 and 11 show how the walking apparatus rotates a load about a center point.
Figure 11:
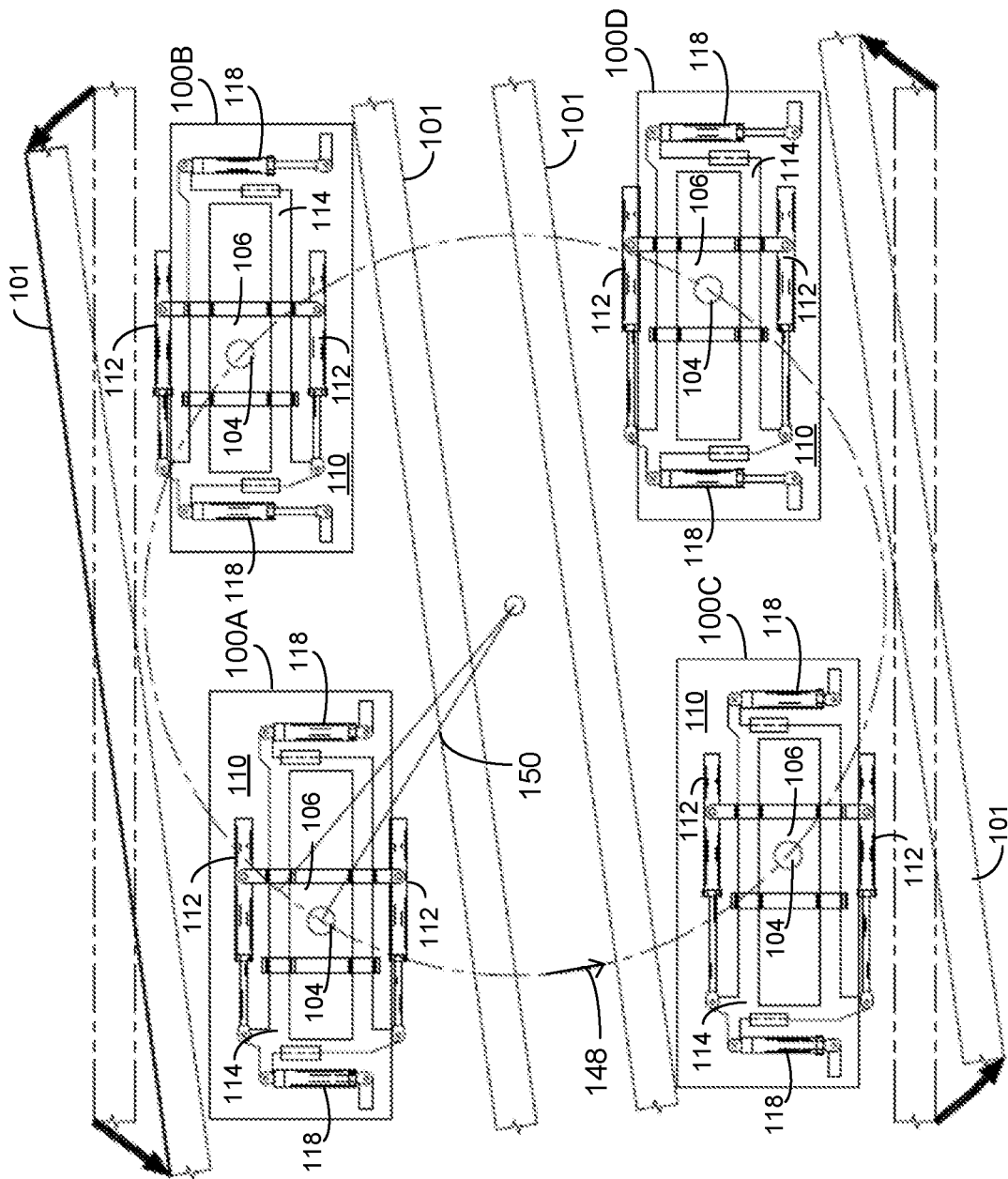

FIGS. 10 and 11 show one example of how walking apparatus 100 may rotate load bearing frame 101 about a center point 149. Travel cylinders 112 and 118 may be extended or retracted to place support feet 110 in an initial turning position. For example, walking apparatus 100A and 100C may extend associated lateral travel cylinders 118 so associated load plates 106 are positioned more to the lateral left sides of associated support feet 110. Walking apparatus 100B and 100D may retract associated lateral travel cylinders 118 so associated load plates 106 are located more to the lateral right sides of associated support feet 110. Walking apparatus 100A-100D may move longitudinal travel cylinders 112 into intermediate extension positions.

FIG. 11 shows a first rotation 150 of load bearing frame 101. Lateral travel cylinders 118 for walking apparatus 100A and 100C are retracted. At the same time, longitudinal travel cylinders 112 in walking apparatus 100A are partially retracted and longitudinal travel cylinders 112 in walking apparatus 100C are partially extended. In combination, travel cylinders 112 and 118 in walking apparatus 100A and 100C rotate the back end of load bearing frame 101 in a counter clockwise direction 148 about a center point 149.

Correspondingly, lateral travel cylinders 118 for walking apparatus 100B and 100D are extended. At the same time, longitudinal travel cylinders 112 in walking apparatus 100B are partially retracted while longitudinal travel cylinders 112 in walking apparatus 100D are partially extended. In combination, travel cylinders 112 and 118 rotate the front end of load bearing frame 101 in a same counter clockwise direction 148 about a same center point 149.

Of course, walking apparatus 100 may move load bearing frame 101 along any linear or curvilinear path within the operational constraints of the machinery. For example, walking apparatus 100B and 100D may move the front end of load bearing frame 101 in an angular direction while walking apparatus 100A and 100C move load bearing frame 101 is a linear longitudinal or lateral direction. A curve may refer to a collection of points whose coordinates are continuous functions of a single independent variable. As an example, arcs, ellipses, and straight lines are within the meaning of a curve. A continuous function may be a function for which sufficiently small changes in the input result in arbitrarily small changes in the output. Time is an example of a single independent variable.

A path may refer to the curve consisting of the set of points that coincide with a single point on an object as the object moves through space. A horizontal path may refer to the curve consisting of the set of points that lie on a single plane substantially parallel to the base surface which coincide with the horizontal position of a single point on an object as the object moves through space. In other words, a load may move along a single substantially horizontal path while being moved over the base surface by the walking apparatus but may move on different paths as the lift cylinder is extended or retracted.

Walking apparatus 100 can also make fine directional changes during the step operation. For example, an operator can change the extension or retraction of longitudinal travel cylinders 112 and/or lateral travel cylinders 118 to center the load over a particular location while load plate 106 is still supporting the load above base surface 134. In this manner, the operator may decide which horizontal path along which to move the load bearing frame without setting the load bearing frame down on base surface 134. This is different from some walking apparatus where the support foot and associated travel mechanism have to be raised above base surface and realigned to allow the horizontal path of the load to change.

Roller and Alignment Restoration Devices

Figure 12A:
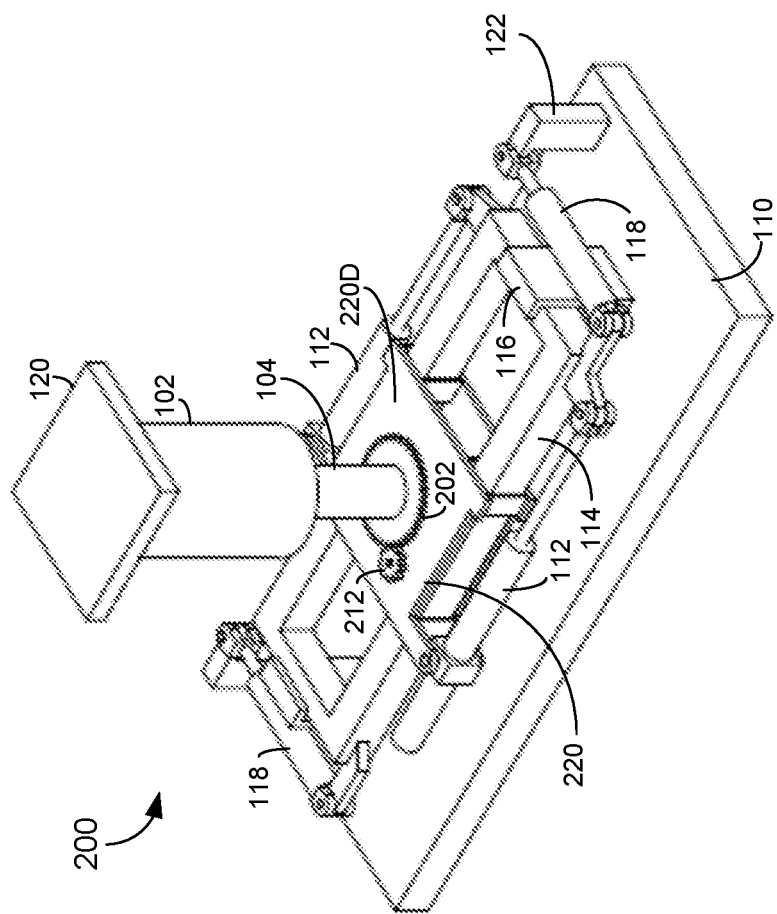
FIG. 12A is an isometric view of a walking apparatus that includes a rotatable roller assembly.
Figure 12C:
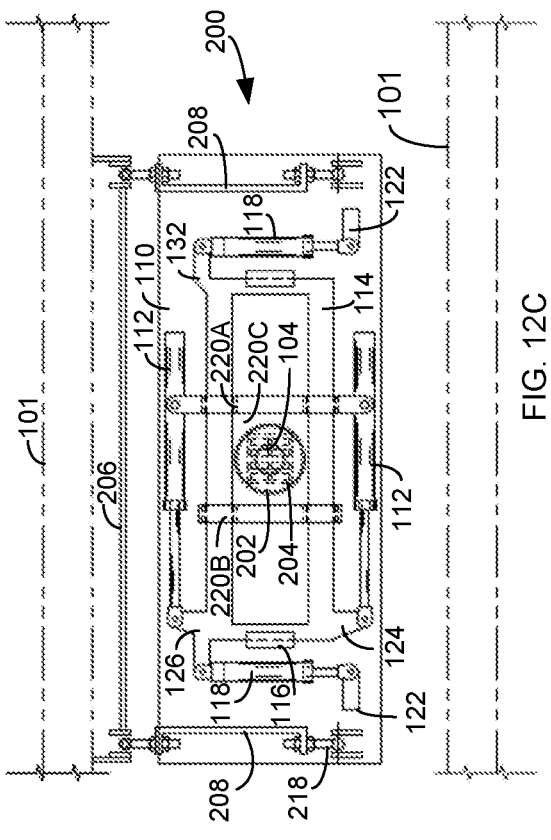
FIG. 12C is a sectional plan view of the walking apparatus of FIG. 12A.
Figure 12E:
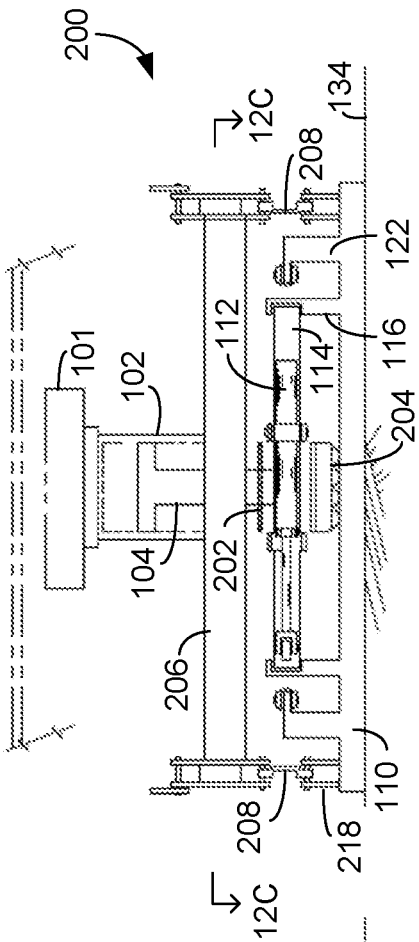
FIG. 12E is a side view of the walking apparatus of FIG. 12A.
Figure 12B:
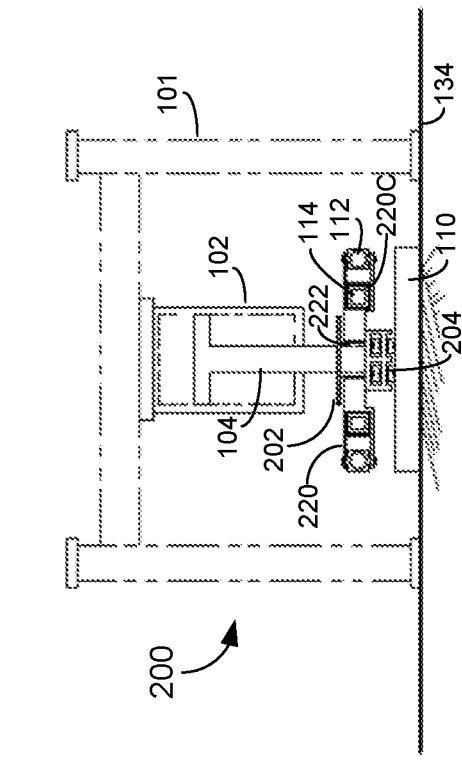
FIG. 12B is an end sectional view of the walking apparatus of FIG. 12A.
Figure 12D:
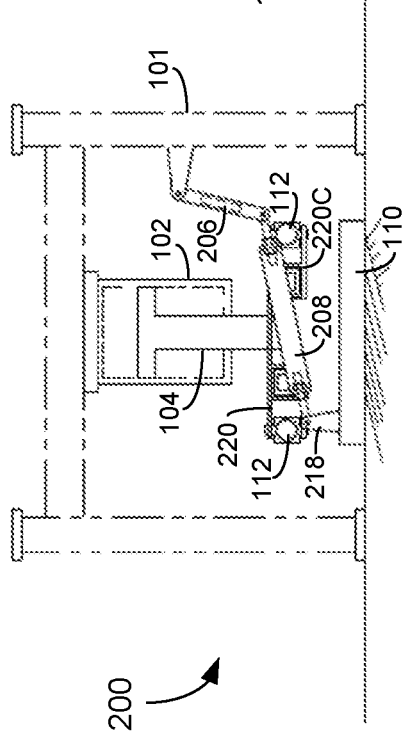
FIG. 12D is an end sectional view of the walking apparatus of FIG. 12A.

FIGS. 12A-12E show an example walking apparatus 200 that uses a roller and an alignment restoration device. FIG. 12A is an upper perspective view of walking apparatus 200, FIG. 12B is a side sectional view of walking apparatus 200, FIG. 12C is a sectional plan view of walking apparatus 200, FIG. 12D is an end view of walking apparatus 200, and FIG. 12E and is a side view of walking apparatus 200.

Referring to FIGS. 12A-12E, walking apparatus 200 includes substantially the same frame 114, longitudinal travel cylinders 112, lateral travel cylinders 118, and rails 116 as described above. However, instead of load plate 106 described above, walking apparatus 200 uses a roller 204 and rotation gear 202. Lift rod 104 is attached to the top of roller 204 and rotation gear 202 is coupled through a gear tube 222 to the top of roller 204. In different embodiments, lift rod 104 may attach to the top of gear tube 222 or may extend through the center of gear tube 222 and couple to the top of roller 204.

Frame assembly 220 has some similarity to load plate assembly 128 described above, but in this example, rests on roller 204 and bears against gear tube 222. Frame assembly 220 includes two brackets 220A and 220B forming holes 220C for slidingly receiving frame 114 as described above. Frame assembly 220 also includes an upper plate 220D connected between brackets 220A and 220B and includes a center hole for rotationally receiving lift rod 104 and gear tube 222.

An alignment restoration device couples support foot 110 to load bearing frame 101 and includes connecting links 208 coupled at first ends to posts 218 that extend up from a top surface of support foot 110. Second ends of connecting links 208 connect to different ends of a torsion bar 206.

The alignment restoration device is configured to maintain the substantially parallel alignment of support foot 110 relative to load bearing frame 101 independently of the travel direction for moving load bearing frame 101. The alignment restoration device may include elements other than connecting link 208 and torsion bar 206, such as leaf springs, coil springs, chains, hydraulic cylinders, and motors. In one example, the alignment restoration device is referred to as a biasing device and is described in more detail in U.S. Pat. No. 8,561,733 which is incorporated by reference in its entirety.

Figure 13A:
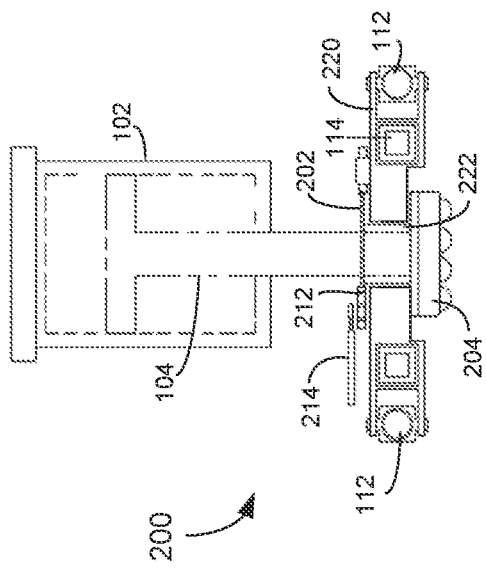
FIG. 13A is an isolated end view of a rotation assembly used in the walking apparatus of FIGS. 12A-12E that includes a motor.
Figure 13B:
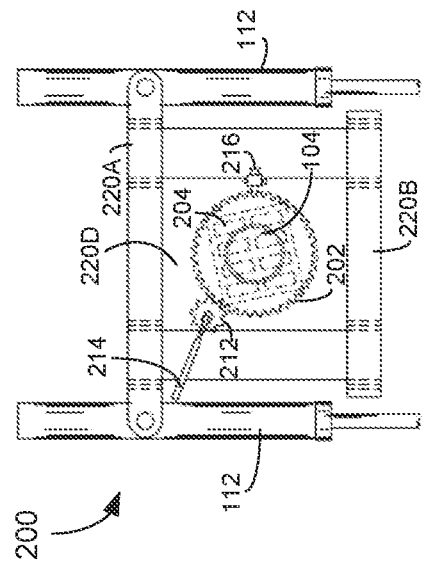
FIG. 13B is an isolated end view of the rotation assembly used in the walking apparatus of FIGS. 12A-12E that includes a steering lever.
Figure 13C:
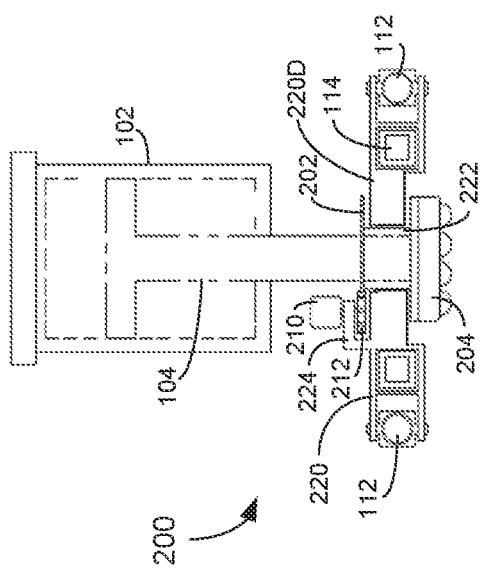
FIG. 13C is an isolated plan view of the rotation assembly shown in FIG. 13A.
Figure 13D:
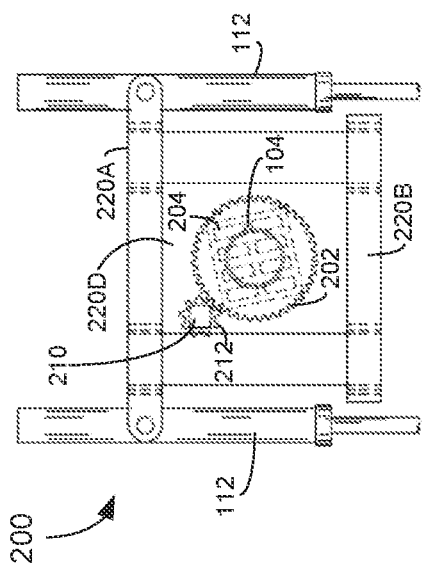
FIG. 13D is an isolated plan view of the rotation assembly shown in FIG. 13B.

FIGS. 13A-13D show features of walking apparatus 200 in more detail. FIG. 13A is a sectional end view of walking apparatus 200 without a support foot including a motor 210, FIG. 13B is a sectional end view of walking apparatus 200 without the support foot including a steering lever 214, FIG. 13C is a sectional plan view of walking apparatus 200 without the support foot that includes the motor, and FIG. 13D is a sectional plan view of walking apparatus 200 without the support foot that includes the steering lever. Motor 210 may be hydraulically or electrically controlled or may include any other type of device that can rotate a gear.

Referring to FIGS. 13A and 13C, in one example, walking apparatus 200 may include motor 210 that is attached to an arm 224 that extends up from the top of plate 220D. A pinion gear 212 may attach to motor 210 underneath arm 224 and rotationally engage with rotation gear 202. Motor 210 may rotate pinion gear 212 in turn rotating rotation gear 202 and attached roller 204 about an axis that extends vertically through the center of lift rod 104. FIGS. 13B and 13D show the same pinion gear 212 rotationally coupled to plate 220D. However, instead of motor 210, a steering lever 214 is attached to the top of pinion gear 212 to rotate rotation gear 202 and attached roller 204.

Referring to FIGS. 12A-12E and 13A-13D, walking apparatus 200 may move load bearing frame 101 in a longitudinal direction by extending and retracting longitudinal travel cylinders 112. For example, extending travel cylinders 112 slides frame assembly 220 longitudinally across frame 114 causing plate 220D to push roller 204, and attached lift rod 104 and load bearing frame 101, in a longitudinal direction over support foot 110.

To move load bearing frame 101 in a lateral, transverse, sideways direction, support foot 110 is first raised above ground surface 134 lowering load bearing frame 101 onto ground surface 134. Either motor 210 or steering lever 214 rotates pinion gear 212 and attached rotation gear 202 ninety degrees relative to the longitudinal axis of support foot 110. Rotation gear 202 and attached roller 204 are then locked into place by locking mechanism 216. Lift rod 104 is then lowered pressing support foot 110 down onto base surface 134 and raising load bearing frame 101 above base surface 134.

Lateral travel cylinders 118 are either extended or retracted, sliding frame 114 within rails 116 transversely relative to the longitudinal axis of support foot 110. Frame assembly 220 is attached to frame 114 and moves gear cylinder 220 and attached roller 204 and load bearing frame 101 in a ninety-degree direction relative to the longitudinal axis of support 110.

In order to move load bearing frame 101 in any other angular or circular direction, support foot 110 is again lifted off of base surface 134. Motor 210 or steering lever 214 turns pinion gear 212 and attached rotation gear 202 so attached roller 204 rotates into the desired angular direction. Rotation gear 202 and attached roller 204 are then locked into place by locking mechanism 216.

Support foot 110 is then lowered back down and load bearing frame 101 raised above base surface 134. Longitudinal travel cylinders 112 and lateral travel cylinders 118 are then extended or retracted in combination to move roller 204 and attached load bearing frame in the selected roller direction.

As explained above, after completion of the stepping operation load bearing frame 101 may be misaligned relative to support foot 110. For example, the longitudinal axis of load bearing frame 101 may no longer be substantially parallel with the longitudinal axis of support foot 110. Torsion bar 206 may deflect in response to the non-linear displacement of load bearing frame 101. When support foot 110 is lifted off of base surface 134, torsion bar 206 releases elastically stored energy moving support foot 110 back into a substantially parallel alignment relative to load bearing frame 101. Again, operation of alignment restoration devices is described in U.S. Pat. No. 8,561,733 which has been incorporated by reference in its entirety.

Inboard Travel Cylinders

Figure 14A:
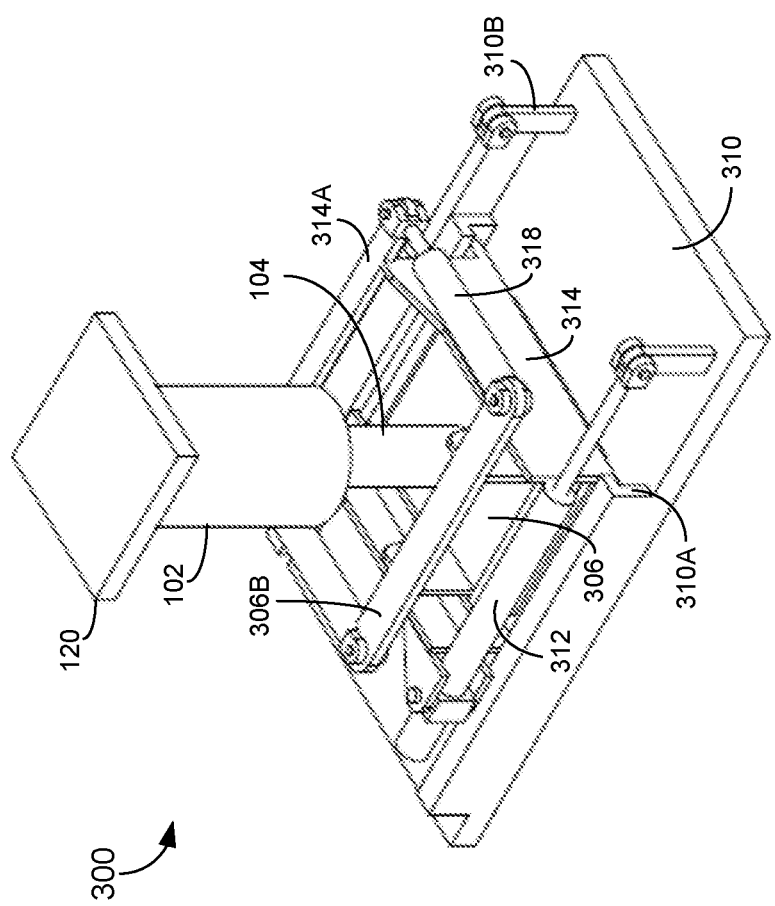
FIG. 14A shows an isometric view of another low-profile walking apparatus.

FIGS. 14A-14E show another example walking apparatus 300 that locates the lateral travel cylinders inboard to provide a shorter longitudinal profile and further balance horizontal travel forces. FIG. 14A is an upper isometric view of walking apparatus 300, FIG. 14B is an isolated side sectional view of walking apparatus 300, FIG. 14C is a sectional plan view of walking apparatus 300, FIG. 14D is an end sectional view of walking apparatus 300, and FIG. 14E is a side view of walking apparatus 300.

FIGS. 15A-15C show an isolated view of a load plate 306 used in walking apparatus 300 attached to a lift cylinder. Load plate 306 is alternatively referred to as a load bearing device. FIG. 15A is a side view of load plate 306, FIG. 15B is an end view of load plate 306, and FIG. 15C is a plan view of load plate 306.

FIGS. 16A-16D show an isolated view of a support foot 310 used in walking apparatus 300. FIG. 16A is an end view of support foot 310, FIG. 16B is a side view of support foot 310, FIG. 16C is a sectional end view of support foot 310, and FIG. 16D is a plan view of support foot 310.

FIGS. 17A-17D show an isolated view of an intermediate frame 314 used in walking apparatus 300. FIG. 17A is a plan view of frame 314, FIG. 17B is an end view of frame 314, and FIG. 17C is a side view of frame 314.

Referring first to FIGS. 16A-16D, two rails 310A that extend along opposite lateral sides of support foot 310. Two mounting posts 310B extend up from the opposite lateral sides at one longitudinal end of support foot 310.

Referring now to FIGS. 15A-15C, a lift cylinder 102 includes a lift rod 104 that connects at a bottom end to load plate 306. An anti-friction pad 308 is attached to the bottom of load plate 306 similar to the one discussed above. Two arms 306A extend up and out from one lateral side of load plate 306. A bar 306B attaches across the top of arms 306A and extends out over opposite ends of load plate 306. FIG. 15B shows two lateral travel cylinders 318 attached to the opposite ends of bar 306B.

Referring now to FIGS. 17A-17C, frame 314 includes two end walls 314D with two inwardly facing rails 314C. A bar extends across one lateral end of walls 314D and also extends over opposite ends of frame 314 forming arms 314A. FIG. 17C shows lateral travel cylinders 318 attached to arms 314A. Arms 314B extend out one end of frame of frame 314 and a bottom member 314E extends between bottom ends of walls 314D. Frame 314 extends over load plate 306 and seats into rails 310A of support foot 310.

Referring again to FIGS. 14A-14E, lift cylinder 102 attaches at a top end via a mounting plate 120 to a load or load bearing frame 101. Lift rod 104 extends down out of lift cylinder 102 and attaches at a bottom end to load plate 306. Anti-friction pad 308 may attach to a bottom side of load plate 306 and sit on a top surface of a support foot 310. In another example, anti-friction pad 308 may attach to a top surface of support foot 310. In this example, anti-friction pad 308 may extend across substantially the entire top surface of support foot 310.

Longitudinal travel cylinders 312 are connected between mounting posts 310B that extend up from a first end of support foot 310 and arms 314B that extend out from frame 314. Lateral travel cylinders 318 are connected between bar 306B attached to load plate 306 and arms 314A attached to frame 314. As shown in FIG. 14D, lower member 314E of frame 314 slidingly seats in-between rails 310A of support foot 310.

The following operation describes walking apparatus 300 when lift rod 104 is extended with support foot 310 pressed down onto base surface 134 and load bearing frame lifted off of base surface 134. The weight of the load on load bearing frame 101 anchors support foot 310 to base surface 134. Extending or retracting longitudinal travel cylinders 312 moves frame 314 longitudinally within rails 310A sliding attached load plate 306 longitudinally over support foot 310. Load bearing frame 101 is attached to load plate 306 via lift cylinder 102 and also moves longitudinally relative to support foot 310.

Load plate 306 moves laterally in-between end walls 314D and rails 314C of frame 314. As explained above, lateral travel cylinders 318 are coupled between frame 314 and bar 306B of load plate 306. Further, bottom members 314E of frame 314 are held in one position laterally by rails 310A of support foot 310. Thus, extending or retracting lateral travel cylinders 318 moves load plate 306 laterally within frame 314 between the two rails 310A of support foot 310. Load bearing frame 101 is operably coupled to load plate 306 and also moves laterally relative to support foot 310.

Different combinations of extension and retraction of travel cylinders 312 and 318 can then move load plate 306 and attached load bearing frame 101 in longitudinal, lateral, diagonal, or angular directions along linear or curvilinear paths relative to support foot 310.

Figure 18A:
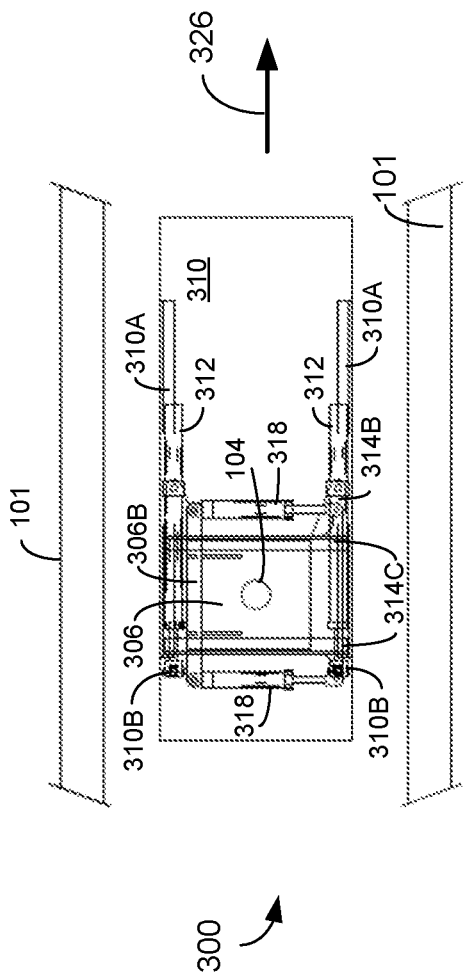
Figure 18C:
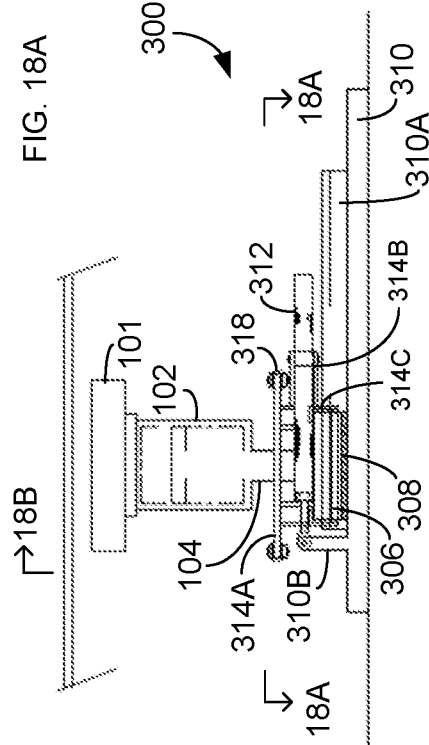
Figure 18B:
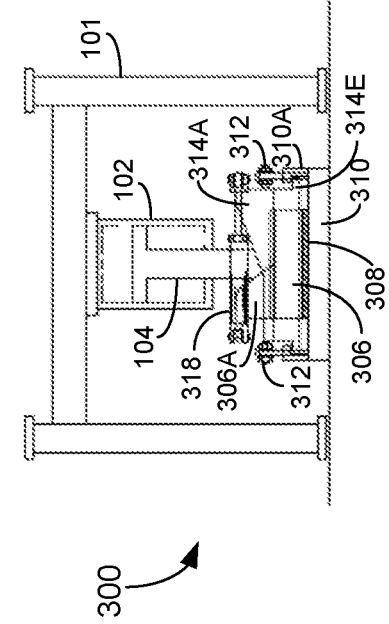

FIGS. 18A-18C and 19A-19B show an example of how walking apparatus 300 moves a load longitudinally. FIGS. 18A and 19A are sectional plan views of walking apparatus 300, FIG. 18B is an end view of walking apparatus 300, and FIGS. 18C and 19B are side views of walking apparatus 300.

Referring first to FIGS. 18A-18C, lateral travel cylinders 318 may be in a partially extended position holding load plate 306 in a substantially middle position between two lateral sides of support foot 310. However, load plate 306 may be held by travel cylinders 318 in any selectable lateral position relative to support foot 310.

While not shown in FIGS. 18A-18C, lift cylinder 102 may vertically retract lift rod 104 raising load plate 306 and attached support foot 310, and lowering load bearing frame 101 onto base surface 134. Lift rod 104 lifts up load plate 306. Load plate lifts up frame 314 which in turn lifts up on rails 310A lifting support foot 310 above base surface 134.

Longitudinal travel cylinders 312 are retracted as shown in FIGS. 18A and 18C. Load plate 306, frame 314, and lift rod 104 are all operably coupled to load bearing frame 101.

Load bearing frame 101 is currently seated on base surface 134 and support foot 310 is currently lifted off of base surface 134. Accordingly, retracting longitudinal travel cylinders 312 moves support foot 310 longitudinally forward relative to load bearing frame 101 as shown by arrow 142. Frame 314 slides through rails 310A while support foot 310 moves forward.

Referring to FIGS. 19A and 19B, lift cylinder 102 may extend lift rod 104 lowering load plate 306 and support foot 110 down onto base surface 134 and lifting load bearing frame 101 off of base surface 134. In the lifted position, the weight of the load on load bearing frame 101 is directed through load plate 306 onto support foot 310. Support foot 310 is now in a secured position on base surface 134.

Extending longitudinal travel cylinders 312 slides frame 314 and attached load plate 306 longitudinally in between rails 310A toward the end of support foot 310. Load bearing frame 101 is operably coupled to load plate 306 and similarly moves longitudinally forward relative to support foot 310 as shown by arrow 328. Anti-friction pad 308 allows load plate 306 to slide longitudinally over the top surface of support foot 310.

Figure 21A:
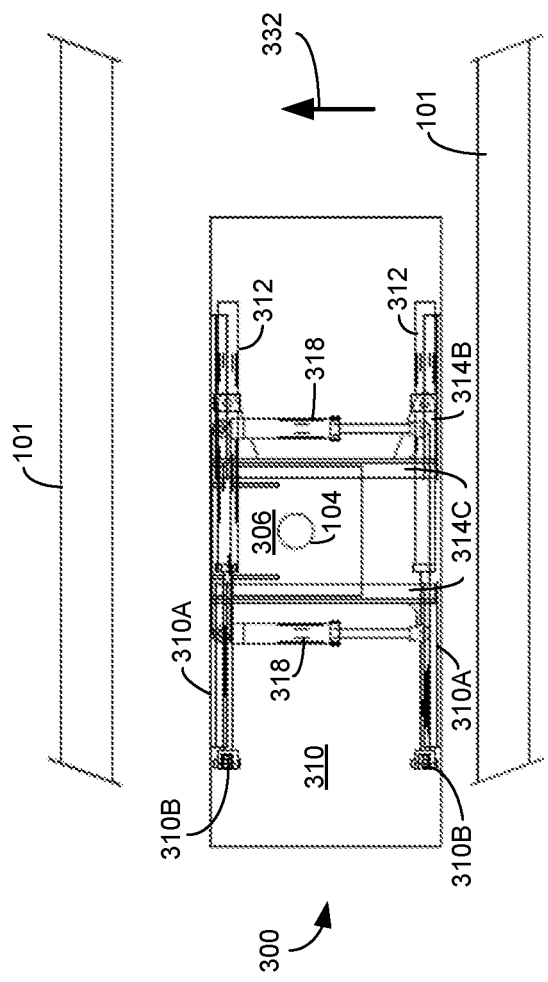
Figure 21C:
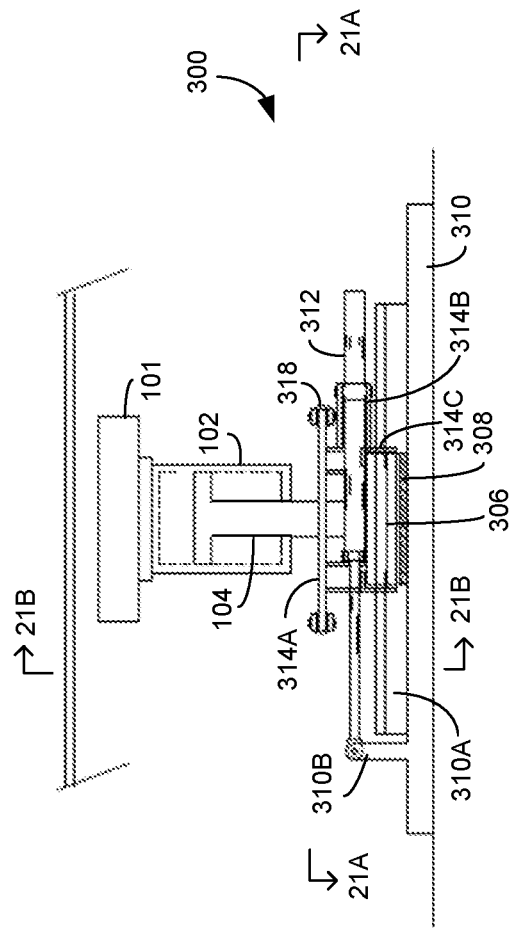
Figure 21B:
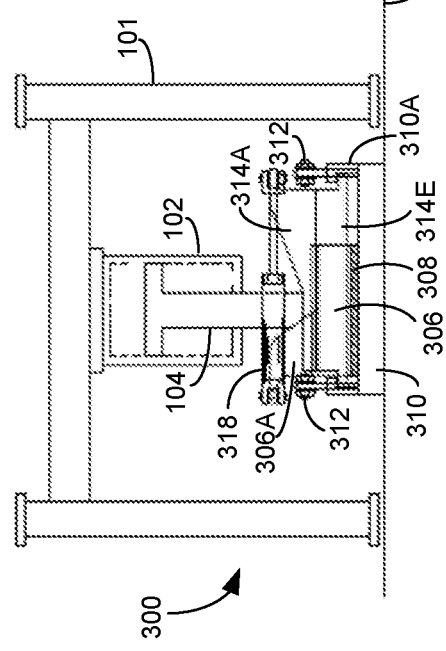

FIGS. 20A-20C and 21A-21D show an example of how walking apparatus 300 moves a load laterally. FIGS. 20A and 21A are sectional plan views of walking apparatus 300, FIGS. 20B and 21B are sectional end views of walking apparatus 300, and FIGS. 20C and 21C are side views of walking apparatus 300.

Referring first to FIGS. 20A-20D, longitudinal travel cylinders 312 may be placed in partially extended positions holding load plate 306 in a substantially middle position between two longitudinal ends of support foot 310. However, load plate 306 may be held by travel cylinders 312 in any selectable longitudinal position relative to support foot 310.

While not shown in FIGS. 20A-20C, lift cylinder 102 may retract lift rod 104 vertically raising load plate 306 and attached frame 314 and support foot 310, while lowering load bearing frame 101 onto base surface 134. Support foot 310 is lifted above base surface 134 and lateral travel cylinders 318 retracted. In the raised foot position, lift rod 104 and load plate 306 are operably held in place by load bearing frame 101. Lateral travel cylinders 318 retract moving support foot 310 and frame 314 located within rails 310A in a left lateral direction relative to load bearing frame 101 as shown by arrow 330. Load plate 306 slides laterally in-between frame rails 314C towards the right lateral side of support foot 310.

Referring now to FIGS. 21A-21C, lift cylinder 102 may vertically extend lift rod 104 lowering load plate 306 and attached support foot 310 back onto base surface 134 and lifting load bearing frame 101 off of base surface 134. In the lifted position, the weight of the load on load bearing frame 101 is directed through load plate 306 onto support foot 310. Support foot 310 is now secured on base surface 134 and frame 314 is laterally secured to support foot 310 by rails 310A.

Extending lateral travel cylinders 318 slides load plate 306 laterally over support foot 310 in-between frame rails 314C. This moves load bearing frame 101 laterally or transversely to the left relative to support foot 310 as shown by arrow 332. Anti-friction pad 308 allows load plate 306 to slide laterally over the top surface of support foot 310 while support foot 310 remains in a same position on base surface 134.

FIGS. 22A-22C show an example of how load bearing frame 101 is moved both longitudinally and laterally at the same time. FIG. 22A is a sectional plan view of walking apparatus 300, FIG. 22B is a sectional end view of walking apparatus 300, and FIG. 22C and is a sectional side view of walking apparatus 300.

Referring to FIGS. 22A-22C, while support foot 310 is lifted off of base surface 134, longitudinal travel cylinders 312 are retracted and lateral travel cylinders 318 are extended. This of course is just one example, and based on the desired direction any combination of travel cylinders 312 and 318 may be extended or retracted by different amounts. Lift rod 104 is then lowered lowering support foot 310 back onto base surface 134 and raising load bearing frame 101. Support foot 310 is now in a secured position on base surface 134.

Extending longitudinal travel cylinders 312 moves load plate 306 and attached load bearing frame 101 longitudinally forward relative to support foot 310. Retracting lateral travel cylinders 318 at the same time also moves load plate 306 from the left lateral side of support foot 310 to the right lateral side of support foot 310 also moving attached load bearing frame 101 laterally to the right as shown by arrows 334.

The overall length of walking apparatus 300 is reduced by moving lateral travel cylinders 318 inboard of longitudinal travel cylinders 312. As a result, the length of longitudinal travel cylinders 312 and the associated per step longitudinal travel distance of load bearing frame 101 can be increased for a given length of support foot 310.

Similar to walking apparatus 100 above, walking apparatus 300 also moves load bearing frame 101 in multiple different directions within a single substantially planar interface that extends between the bottom of load plate 306 and the top of support foot 310. In other words, walking apparatus 300 can move load plate 306 in any longitudinal, lateral, or angular direction along any linear or curvilinear path relative to support foot 310. This single interface movement reduces the overall height of walking apparatus.

Also, similar to walking apparatus 100 above, the load on load bearing frame 101 is directed through lift cylinder 102 directly onto load plate. Intermediate frame 314 and all other members of walking apparatus 300 only have to carry the horizontal forces exerted by travel cylinder 312 and 318. Thus, smaller forces are exerted on the different members of walking apparatus 300.

Figure 23:
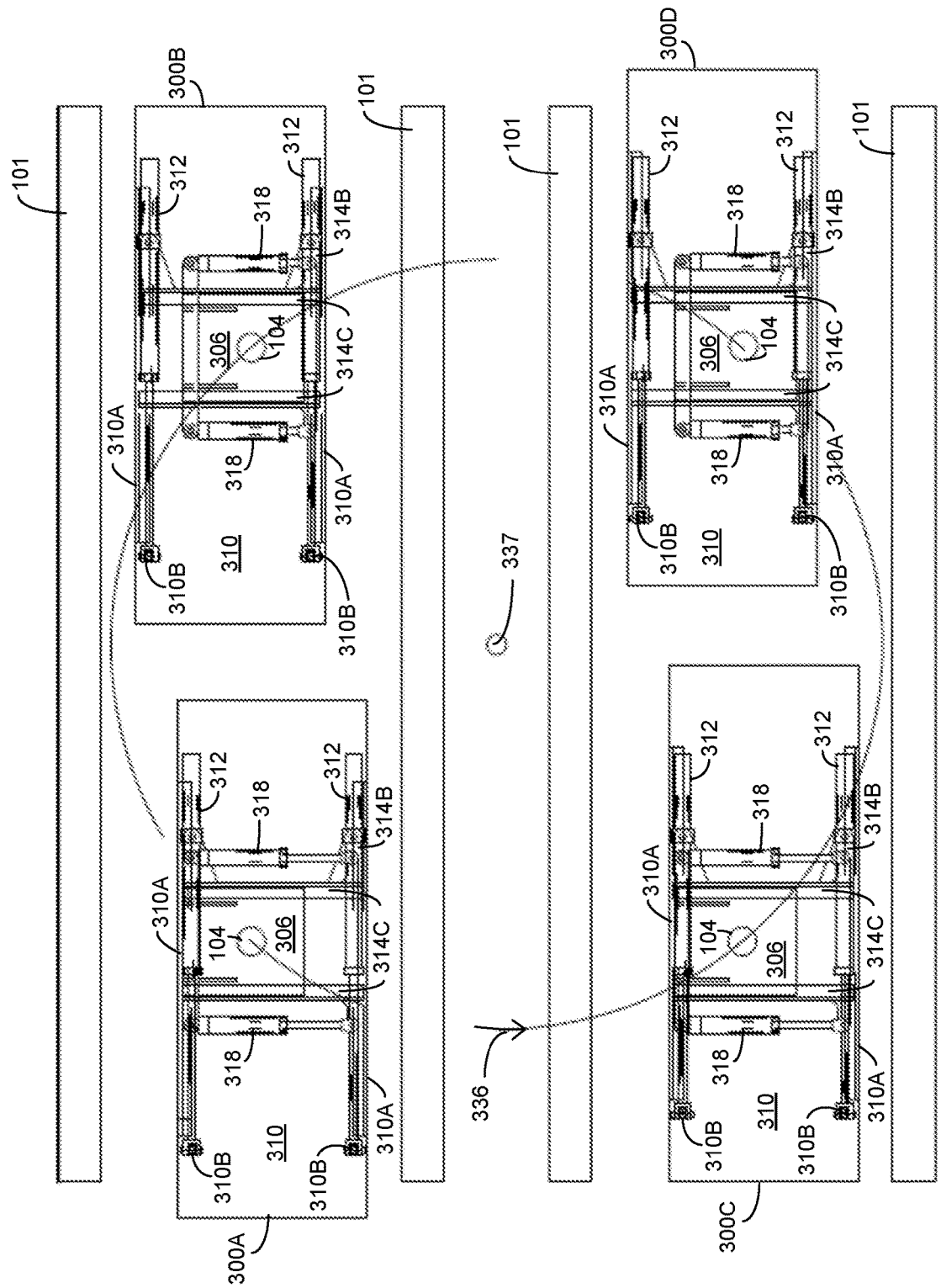
FIGS. 23 and 24 show how the walking apparatus of FIGS. 14A-14E rotates a load about a center point.
Figure 24:
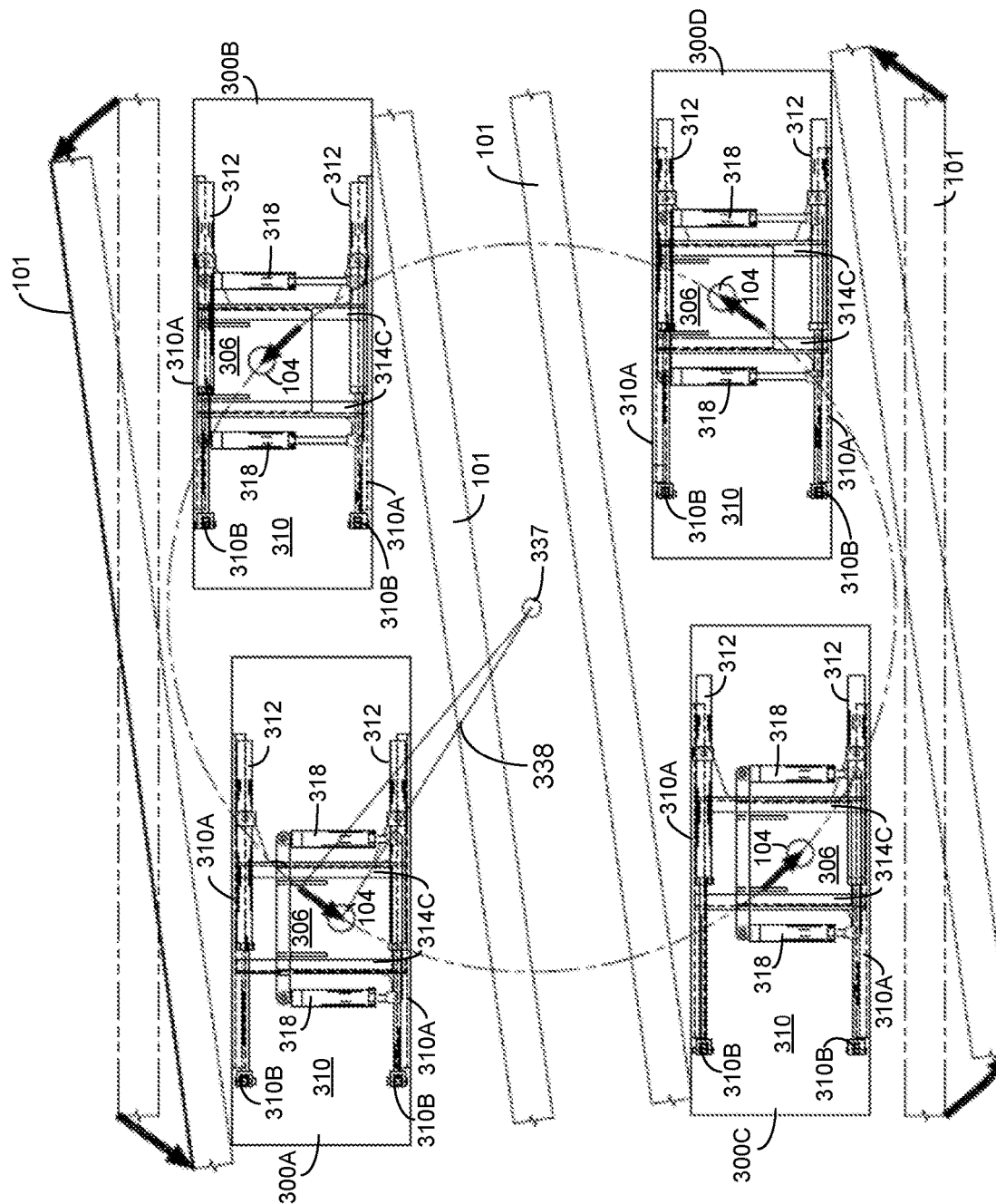

FIGS. 23 and 24 show one example of how walking apparatus 300 may rotate load bearing frame 101 about a center point 337. Travel cylinders 312 and 318 may be extended or retracted to place support feet 310 in an initial turning position as shown in FIG. 23. For example, walking apparatus 300A and 300C may extend associated lateral travel cylinders 318 to move the left lateral sides of support feet 310 toward associated load plates 306. Walking apparatus 300B and 300D may retract associated lateral travel cylinders 318 to move right lateral sides of associated support feet 310 toward associated load plates 106. Walking apparatus 300A-300D may locate longitudinal travel cylinders 312 in various intermediate extension positions.

FIG. 24 shows a first circular movement 338 of load bearing frame 101. Lateral travel cylinders 318 for walking apparatus 300A and 300C are retracted, and at the same time, longitudinal travel cylinders 312 in walking apparatus 300A are partially retracted while longitudinal travel cylinders 312 in walking apparatus 300C are partially extended. In combination, travel cylinders 312 and 318 rotate the back end of load bearing frame 101 in a circular counter-clockwise direction 338 about a center point 337.

In the same step operation, lateral travel cylinders 318 in walking apparatus 300B and 300D are extended, longitudinal travel cylinders 312 in walking apparatus 300B are partially retracted, and longitudinal travel cylinders 312 in walking apparatus 300D are partially extended. In combination, travel cylinders 312 and 318 rotate the front end of load bearing frame 101 in a same circular counter clockwise direction 338 about the same center point 337 as the back end of load bearing frame 101.

Of course, travel cylinders 312 and 318 in walking apparatus 300 may be extended or retracted in any combination to move load bearing frame 101 in any direction along any linear or curvilinear path. For example, walking apparatus 300B and 300D may turn the front end of load bearing frame 101 in an angular or diagonal direction while walking apparatus 300A and 300C move the back end of load bearing frame 101 is a linear longitudinal or lateral direction.

Walking Cycle

FIGS. 25A-25D show a longitudinal walking cycle for walking apparatus 300. The left side drawings are end views of walking apparatus 300 and the right-side drawings are side views of walking apparatus 300. While support foot 310 is raised above base surface 134, longitudinal travel cylinders 312 are retracted moving support foot 310 longitudinally forward (to the right) relative to load bearing frame 101.

Figure 25A:
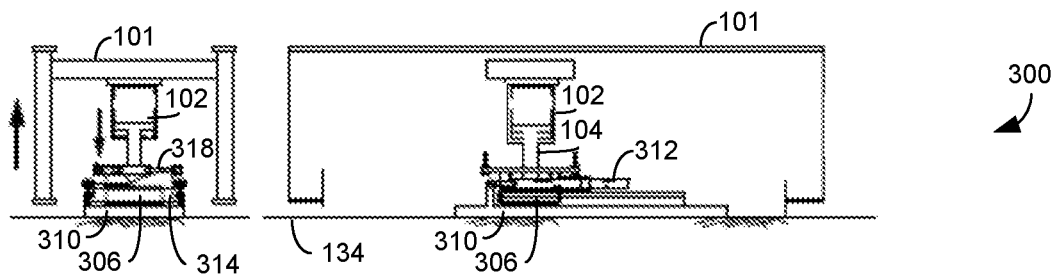
FIGS. 25A-25D show an example longitudinal stepping operation for the walking apparatus of FIGS. 14A-14E.

FIG. 25A shows a first phase of the step operation where lift cylinder 102 is vertically extended to lift load bearing frame 101 off of base surface 134. The load on load bearing frame 101 is now supported by support foot 310.

Figure 25B:
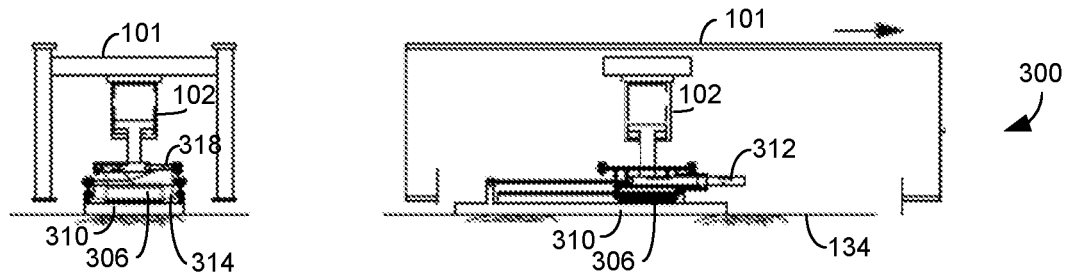

FIG. 25B shows a second phase of the step operation where longitudinal travel cylinder 312 is extended moving load plate 306, attached lift cylinder 102, and attached load bearing frame 101 longitudinally forward relative to support foot 310.

Figure 25C:
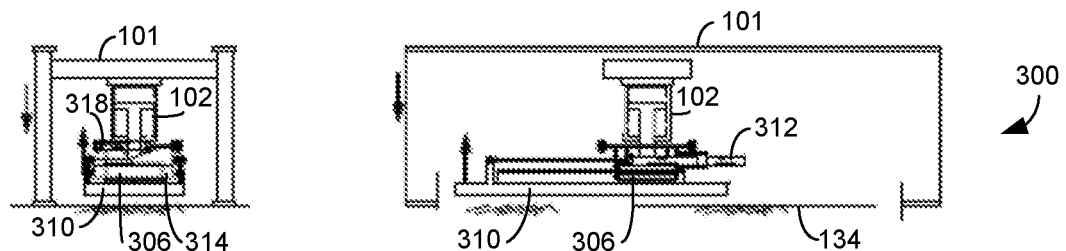

FIG. 25C shows a third phase of the step operation where lift cylinder 102 is vertically retracted lowering load bearing frame 101 back onto base surface 134. Lift cylinder 102 continues to retract until load plate 306 and attached support foot 310 are lifted off of base surface 134. Longitudinal travel cylinders 312 are still extended with load plate 306 and frame 314 located at the front longitudinal end of support foot 310.

Figure 25D:
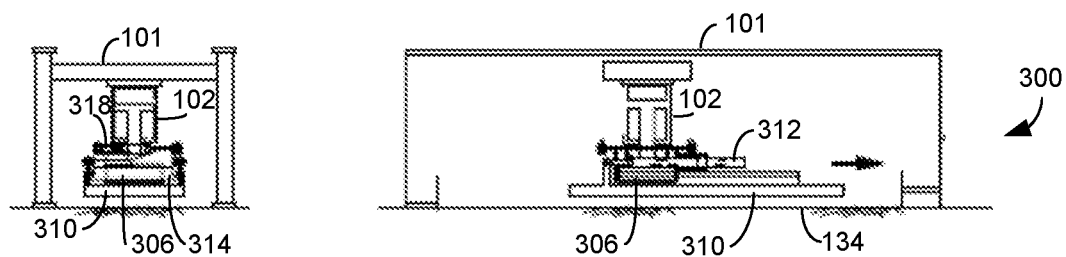

FIG. 25D shows a fourth phase of the step operation where longitudinal travel cylinders 312 are vertically retracted moving support foot 310 longitudinally forward relative to load plate 306 and attached load bearing frame 101. At this phase load plate 306 and frame 316 are relocated to the back-longitudinal end of support foot 310. The step phases in FIGS. 25A-25D are repeated until load bearing frame 101 is moved to the desired location.

FIGS. 26A-26D show a lateral walking cycle for walking apparatus 300. The left side drawings are end views of walking apparatus 300 and the right-side drawings are side views of walking apparatus 300. While support foot 310 is raised above base surface 134, lateral travel cylinders 318 are retracted moving support foot 310 and frame 314 laterally to the left relative to load bearing frame 101.

Figure 26A:
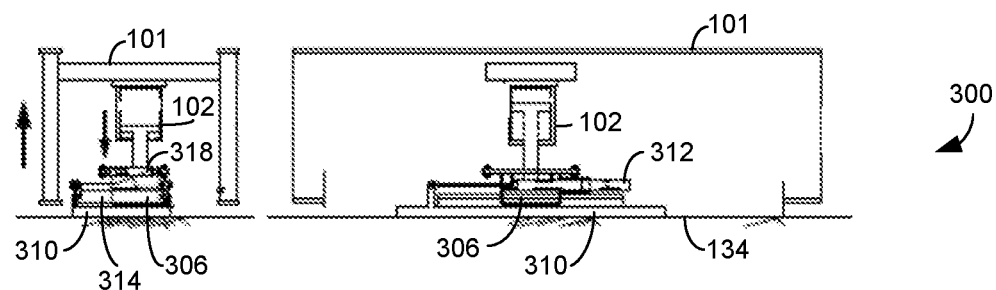
FIGS. 26A-26D show an example lateral stepping operation for the walking apparatus of FIGS. 14A-14E.

FIG. 26A shows a first phase of the step operation where lift cylinder 102 is vertically extended lifting load bearing frame 101 off of base surface 134. The load on load bearing frame 101 is now supported by support foot 310.

Figure 26B:
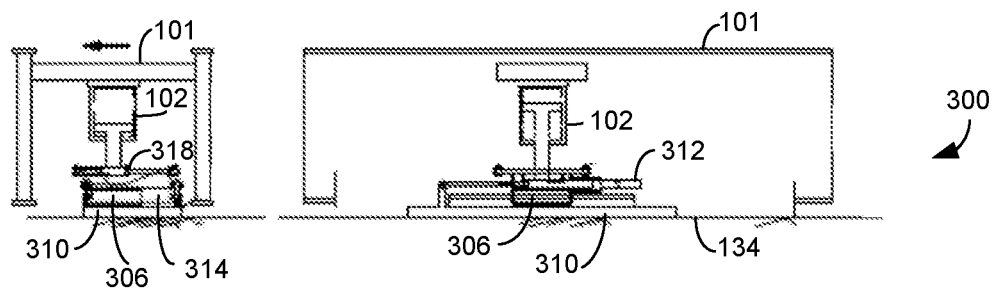

FIG. 26B shows a second phase of the step operation where lateral travel cylinder 318 is extended sliding load plate 306 laterally to the left over support foot 310 between the rails of frame 314. Lift cylinder 102 and load bearing frame 101 are attached to load plate 306 and accordingly move laterally to the left relative to support foot 310.

Figure 26C:
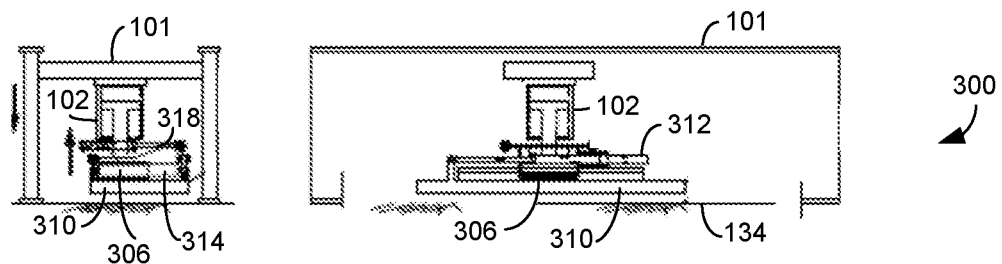

FIG. 26C shows a third phase of the step operation where lift cylinder 102 is vertically retracted lowering load bearing frame 101 back onto base surface 134. Lift cylinder 102 continues to retract until load plate 306 and attached support foot 310 are lifted off of base surface 134. Lateral travel cylinders 318 are still extended with load plate 306 still located on the left lateral side of support foot 310.

Figure 26D:
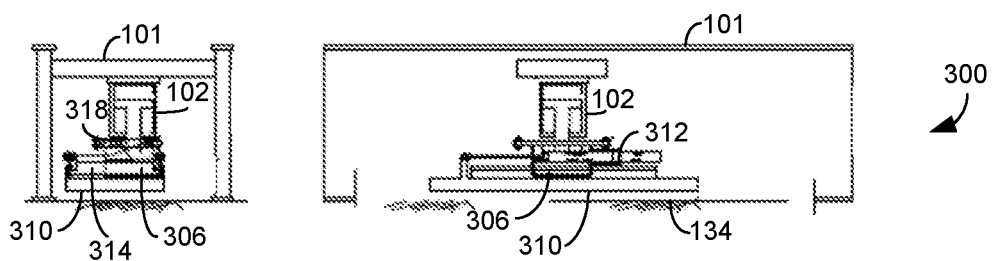

FIG. 26D shows a fourth phase of the step operation where lateral travel cylinder 318 is retracted moving support foot 310 and frame 314 laterally back to the left. While lateral travel cylinders 318 are retracted, load plate 306 moves between the rails of frame 314 toward the right lateral side of support foot 310. The step phases in FIGS. 26A-26D are repeated until load bearing frame 101 is moved to the desired lateral position.

Low Profile Walking Apparatus with Three Travel Cylinders

Figure 27A:
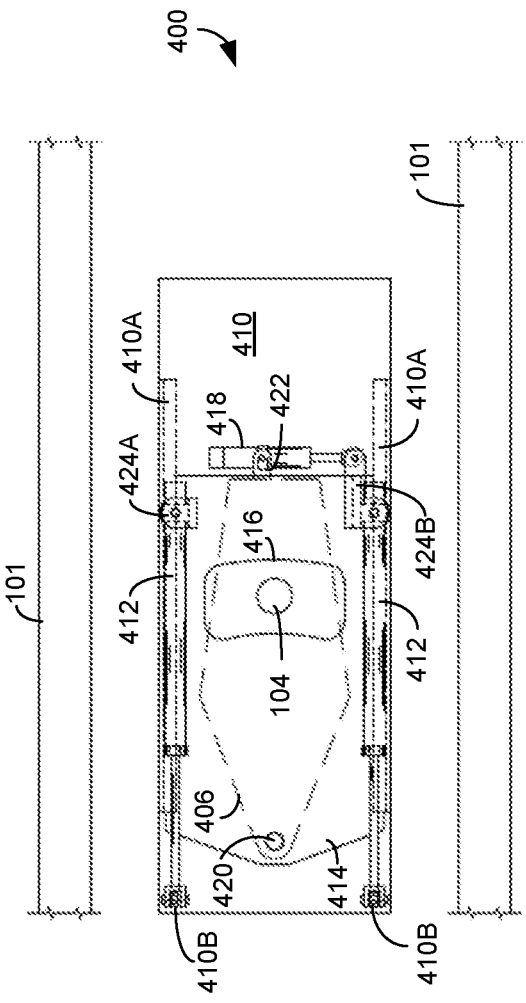
FIG. 27A is an isometric view of a three cylinder walking apparatus.
Figure 27B:
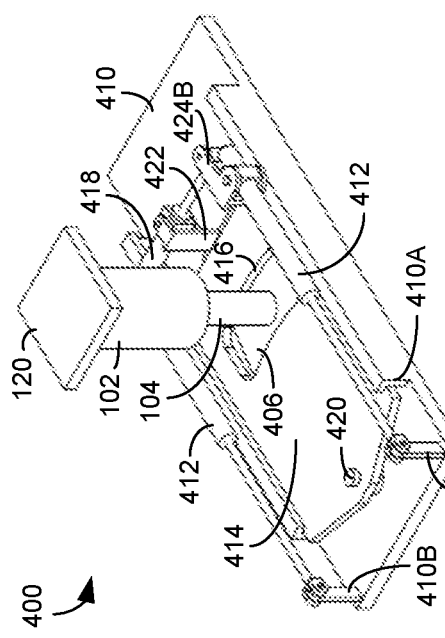
FIG. 27B is a sectional plan view of the walking apparatus in FIG. 27A.
Figure 27C:
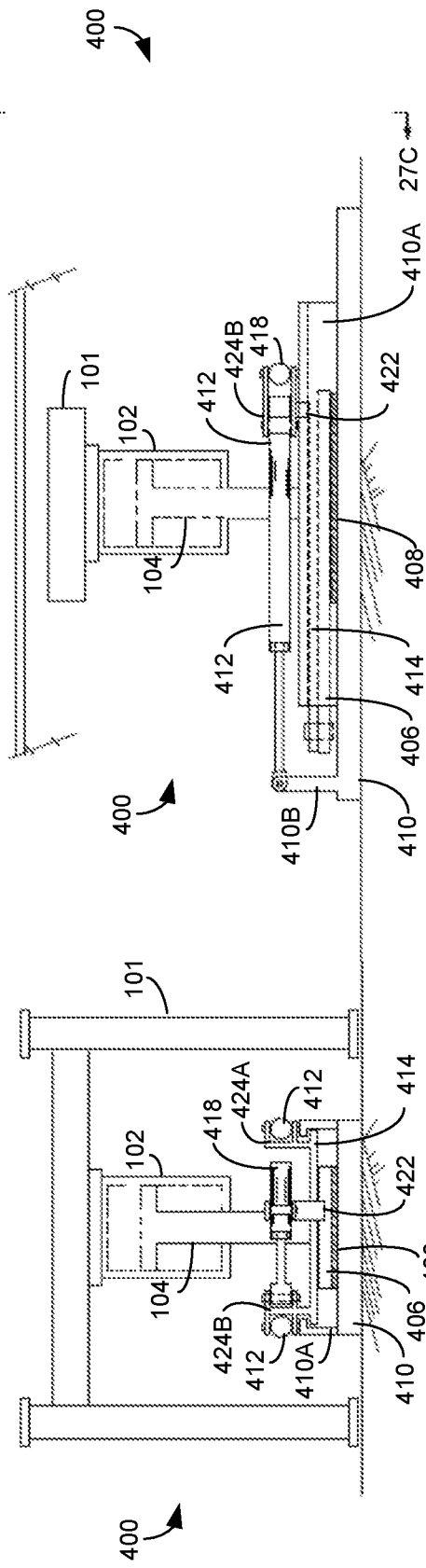
FIG. 27C is an end view of the walking apparatus in FIG. 27A.
Figure 27D:
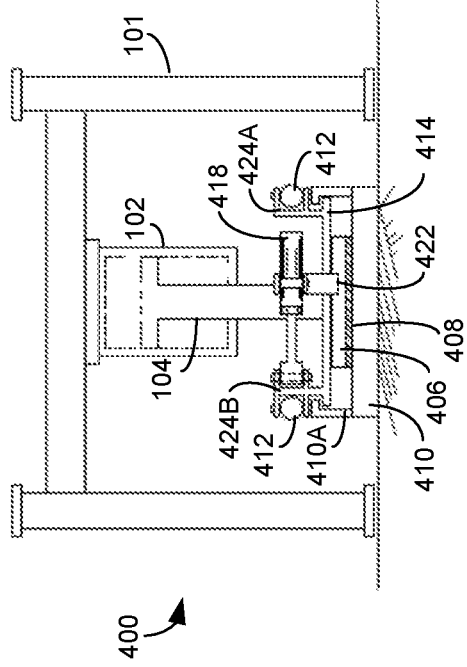
FIG. 27D is a side view of the walking apparatus in FIG. 27A.

FIGS. 27A-27D show a low-profile walking apparatus 400 that uses three travel cylinders. FIG. 27A is an isometric view of walking apparatus 400, FIG. 27B is a sectional plan view of walking apparatus 400, FIG. 27C is an end view of walking apparatus 400, and FIG. 27D is a side view of walking apparatus 400.

Referring to FIGS. 27A-27D, walking apparatus 400 includes a lift cylinder 102 that attaches at a top end via a mounting plate 120 to a load or a load bearing frame 101. A lift rod 104 extends down out of lift cylinder 102 and is attached at a bottom end to a load plate 406. Load plate 406 is alternatively referred to as a load bearing device. An anti-friction pad 408 may attach to a bottom side of load plate 406 and sit on a top surface of a support foot 410.

In another example, anti-friction pad 408 may be attached to a top surface of support foot 410. In this example, anti-friction pad 408 may extend across substantially the entire top surface of support foot 410. In one example, anti-friction pad 408 may be made out of a hard plastic, but can be any material that reduces the friction between support foot 410 and load plate 406.

Two rails 410A extend along opposite longitudinal sides of support foot 410. A frame 414 slides longitudinally within rails 410A. Load plate 406 includes a hole at a first longitudinal end that receives a pivot pin 420 for rotationally attaching to frame 414. An arm 422 extends up from an opposite longitudinal end of load plate 406 and attaches to a lateral travel cylinder 418.

A first longitudinal travel cylinder 412 attaches at a first end to a post 410B that extends up from one end of support foot 410 and attaches at a second end to frame 414 via an arm 424A. A second longitudinal travel cylinder 412 attaches at a first end to a second post 410B that extends up from the same end of support foot 410 and attaches at a second end to frame 414 via a second arm 424B. Lateral travel cylinder 418 attaches at a first end to load plate 406 via arm 422 and attaches at a second end to frame 414 via arm 424B.

FIG. 28A is an isolated side view of load plate 406 attached to lift cylinder 102, FIG. 28B is an isolated end view of load plate 406, and FIG. 28C is an isolated plan view of load plate 406 sectioned through lift rod 104. Referring to FIGS. 28A-28C, load plate 406 includes a hole 406A that extends through one longitudinal end for receiving pivot pin 420. Arm 422 extends up from an opposite longitudinal end of load plate 406 for attaching to lateral travel cylinder 418 as shown above.

Anti-friction pad 408 may extend underneath at least a portion of the bottom surface of load plate 406 below lift rod 104. Load plate 406 may have a pentagon shape with a first set of oppositely inclining ends that meet with a second set of oppositely inclining sides that extend to a flat longitudinal end that connects to arm 422.

FIG. 29A shows an end view of support foot 410, FIG. 29B shows a side view of support foot 410, FIG. 29C shows a sectional end view of support foot 410, and FIG. 29D shows a top plan view of support foot 410. Posts 410B extend up from opposite sides of a first longitudinal end of support foot 410 and attach to associated longitudinal travel cylinders 412. Rails 410A extend up from opposite lateral sides of support foot 410 and include inwardly facing channels 410C for slidingly receiving frame 414.

FIGS. 30A-30C show an isolated view of a middle frame 414 used in walking apparatus 400. FIG. 30A is a plan view of frame 414, FIG. 30B is an end view of frame 414, and FIG. 30C is a side view of frame 414. Frame 414 may have two oppositely inclining first ends that extend out to two parallel sides that extend to a substantially flat opposite end.

A hole 414A extends through frame 414 at the first end for rotationally receiving the pivot pin 420 that attaches to load plate 406. Arms 424A and 424B extend up on opposite sides of the second end of frame 414 and attach to associated longitudinal travel cylinders 412. Arm 424B also attaches to lateral travel cylinder 418. An arched opening 416 allows lift rod 104 to connect directly to load plate 406 and move laterally with respect to frame 414.

Referring to FIGS. 27A-27D, 28A-28C, 29A-29D, and 30A-30C, walking apparatus 400 provides the unique single interface load plate movement described above but only uses three travel cylinders. Frame 414 is held in a same lateral position relative to support foot 410 by rails 410A. However, frame 414 may move longitudinally relative to support foot 410 by sliding within rails 410A. Load plate 406 is held longitudinally to frame 414 via pivot pin 420. However, load plate 406 can rotate laterally with respect to frame 414 about pivot pin 420.

Longitudinal travel cylinders 412 are extended or retracted to move load bearing frame 101 longitudinally. Travel cylinders 412 slide frame 414 in-between rails 410A of support foot 410 also moving load plate 406 via pivot pin 420 longitudinally over the top surface of support foot 410.

Lateral travel cylinder 118 is extended or retracted to move load bearing frame 101 laterally relative to support foot 410. For example, extending or retracting travel cylinder 118 rotates load plate 406 about pivot pin 420 moving attached lift rod 104 and load bearing frame 101 laterally relative to support foot 410. Opening 416 allows lift rod 104 to move laterally relative to frame 414.

FIGS. 31A-31D show a longitudinal walking cycle for walking apparatus 400. The left side drawings are end views of walking apparatus 400 and the right-side drawings are side views of walking apparatus 400. While support foot 410 is raised above base surface 134, longitudinal travel cylinders 412 are retracted moving support foot 410 longitudinally forward (to the right) relative to load bearing frame 101.

Figure 31A:
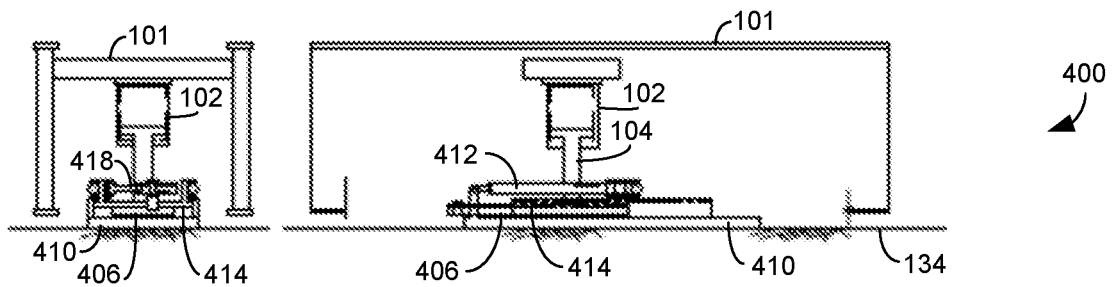
FIGS. 31A-31D show a longitudinal walking cycle for the walking apparatus in FIGS. 27A-27D.

FIG. 31A shows a first phase of the step operation where lift cylinder 102 is vertically extended lifting load bearing frame 101 off of base surface 134. The load on load bearing frame 101 is now supported by support foot 410.

Figure 31B:
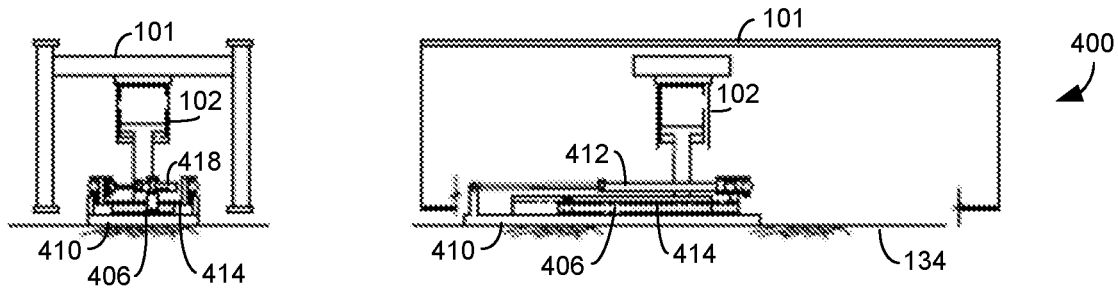

FIG. 31B shows a second phase of the step operation where longitudinal travel cylinders 412 are extended moving load plate 406, attached lift cylinder 102, and attached load bearing frame 101 longitudinally forward relative to support foot 410.

Support foot 410 is secured to base surface 134 by the load on load bearing frame 101. Extending longitudinal cylinders 412 applies a longitudinal force against frame 414. Frame 414 is attached to load plate 406 via pivot pin 420 and accordingly slides load plate 406 longitudinally over the top of support foot 410 in-between rails 410A. Lateral travel cylinder 418 may maintain an intermediate position during the longitudinal walking cycle to keep load plate 406 centered along the longitudinal axis of support foot 410.

Figure 31C:
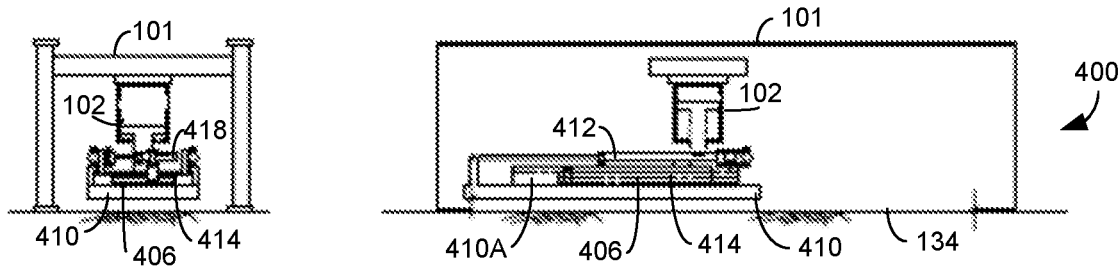

FIG. 31C shows a third phase of the step operation where lift cylinder 102 is retracted vertically lowering load bearing frame 101 back onto base surface 134. Lift cylinder 102 continues to retract until load plate 406 and attached support foot 410 are lifted off of base surface 134. Raising lift cylinder 102 causes load plate 406 to lift up underneath frame 414. The lateral sides of frame 414 lift up underneath rails 410A lifting support foot 410 up off of base surface 134. Longitudinal travel cylinders 412 are still extended with load plate 406 and frame 414 located at the front longitudinal end of support foot 410.

Figure 31D:
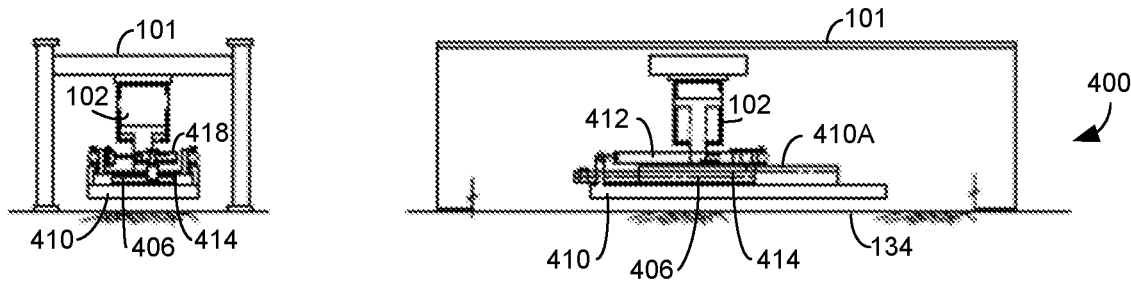

FIG. 31D shows a fourth phase of the step operation where longitudinal travel cylinders 412 are retracted moving support foot 410 longitudinally forward relative to load plate 406 and attached load bearing frame 101. Load plate 406 is secured to load bearing frame 101 via lift cylinder 102. Retracting longitudinal travel cylinders 412 causes support foot 410 to slide longitudinally forward while load plate 406 remains in a same longitudinal position with load bearing frame 101. Frame 414 is attached to load plate 406 via pivot pin 420 and therefore also remains in a same position while support foot 410 slides forward. At the end of this stage, load plate 406 and frame 414 extend out the back-longitudinal end of support foot 410. The phases in FIGS. 31A-31D are repeated until load bearing frame 101 is moved to the desired location.

FIGS. 32A-32C, 33A-33C, 34A-34C, and 35A-35C show plan, side, and end views, respectively, for a lateral walking cycle of walking apparatus 400. While support foot 410 is raised above base surface 134, lateral travel cylinder 418 is retracted moving support foot 410 and frame 414 laterally to the left relative to load bearing frame 101.

FIGS. 32A-32C show a first phase of the step operation where lift cylinder 102 is vertically extended lifting load bearing frame 101 off of base surface 134. The load on load bearing frame 101 is now supported by support foot 410. Longitudinal travel cylinders 412 may be in an intermediate position, but can be extended any amount to locate load plate 406 and frame 414 in any longitudinal position on support foot 410.

FIGS. 33A-33C show a second phase of the step operation where lateral travel cylinder 418 is extended sliding load plate 406 laterally to the left over support foot 410 between the rails 410A of support foot 410. Lift cylinder 102 and load bearing frame 101 are attached to load plate 406 and accordingly move laterally to the left relative to support foot 410. Frame 414 is held laterally in place by rails 410A of support foot 410 and holds pivot pin 420 in place. Accordingly, load plate 406 pivots around pivot pin 420 and rotates about lift rod 104 as lift rod moves along a circular path 428 within opening 416 of frame 414.

Figure 34A:
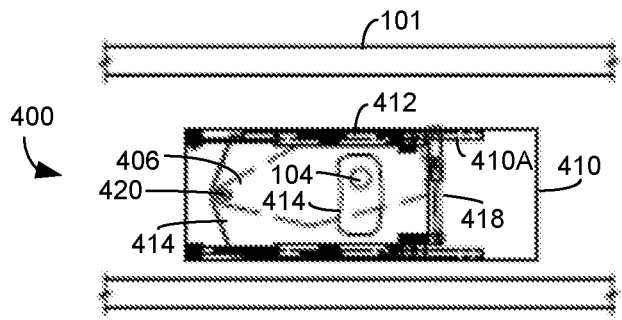
Figure 34B:
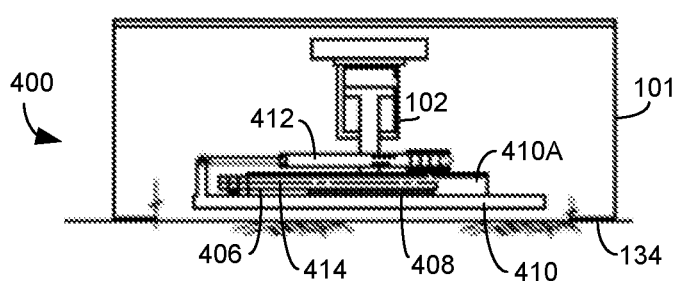
Figure 34C:
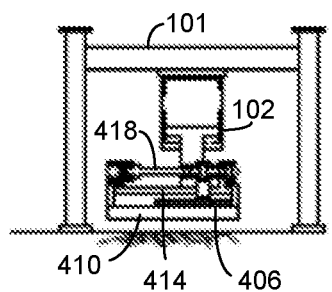

FIGS. 34A-34C show a third phase of the step operation where lift cylinder 102 is vertically retracted lowering load bearing frame 101 back onto base surface 134. Lift cylinder 102 continues to retract until load plate 406 and attached support foot 410 are lifted off of base surface 134. Load plate 406 lifts up against the bottom side of frame 414. Frame 414 in turn lifts up underneath rails 410A lifting support foot 410 up off of base surface 134. Lateral travel cylinder 418 is still extended with load plate 406 still located on the left lateral side of support foot 410.

Figure 35A:
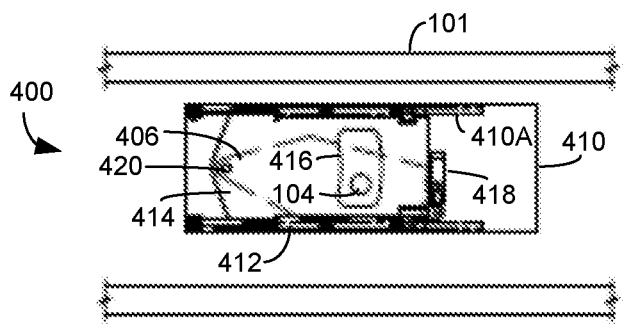
Figure 35B:
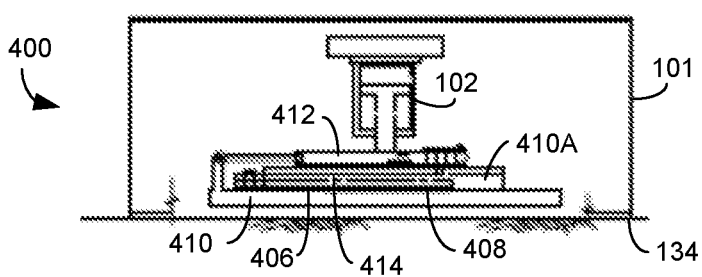
Figure 35C:
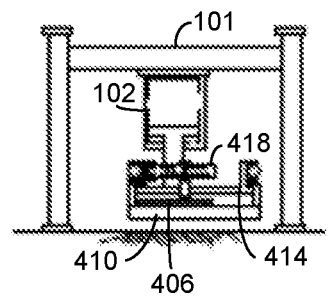

FIGS. 35A-35C show a fourth phase of the lateral step operation where lateral travel cylinder 418 is retracted moving support foot 410 and frame 414 laterally back to the left so that load plate 406 now sits on the lateral right side of support foot 410. Load plate 406 is rotationally secured to load bearing frame 101. Retracting travel cylinder 418 pulls frame 414 laterally to the left. The lateral side of frame 414 pushes against rails 410A moving support foot 410 laterally to the left and moving the right lateral side of opening 416 next to lift rod 104. Load plate 406 rotates about lift rod 104 and also pivots about pivot pin 420 to rotate against the right lateral side of support foot 410. The phases in FIGS. 32-35 are repeated until load bearing frame 101 is moved to the desired lateral position.

Of course, support foot 410 can also be moved both longitudinally and laterally at the same time. While support foot 410 is lifted off of base surface 134, both longitudinal travel cylinders 412 and lateral travel cylinder 418 can be retracted. Lateral travel cylinder 418 retracts moving support foot 410 in a left lateral direction as shown in FIGS. 32A-32C. Longitudinal travel cylinders 412 also retract moving support foot 410 longitudinally forward as shown in FIG. 31D.

Lift rod 104 lowers support foot 410 raising load bearing frame 101 above base surface 134. The load on load bearing frame 101 secures support foot 410 onto base surface 134. Extending longitudinal travel cylinders 412 move load plate 406, frame 414, and load bearing frame 101 longitudinally forward relative to support foot 410 as shown in FIG. 31B. Extending lateral travel cylinder 418 at the same time also moves load plate 406 and attached load bearing frame 101 laterally to the left as shown in FIGS. 33A-33C. Thus, load bearing frame 101 may move in any angular direction along any linear or curvilinear path relative to support foot 410 all on the same substantially planar interface between the top surface of support foot 410 and the bottom surface of load plate 406.

Low Profile Walking Apparatus with Two Travel Cylinders

Figure 36A:
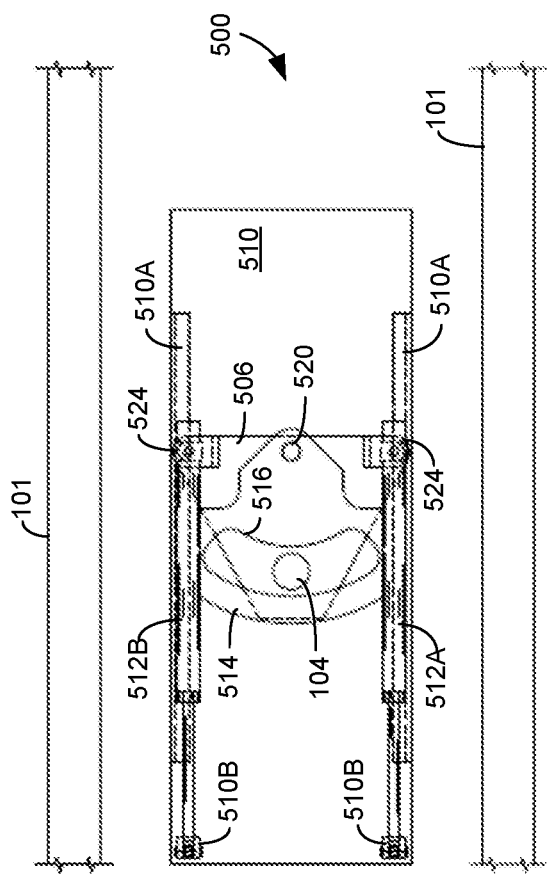
FIG. 36A is an isometric view of a two cylinder walking apparatus.
Figure 36B:
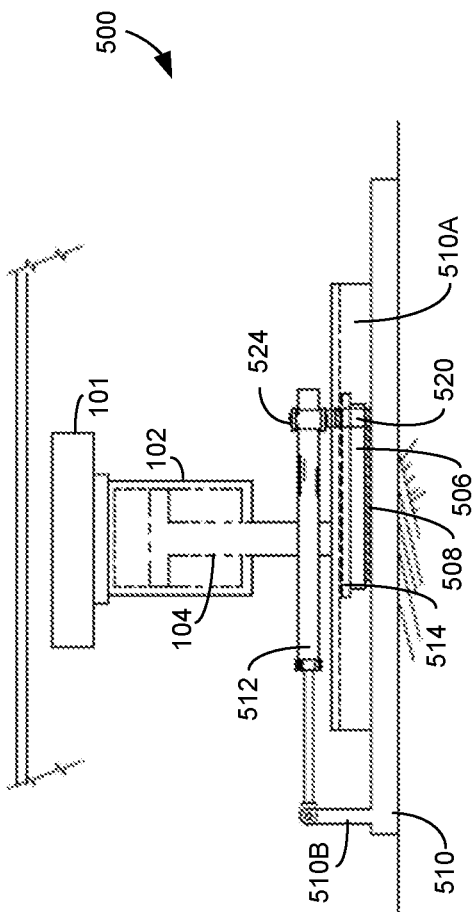
FIG. 36B is a sectional plan view of the walking apparatus in FIG. 36A.
Figure 36C:
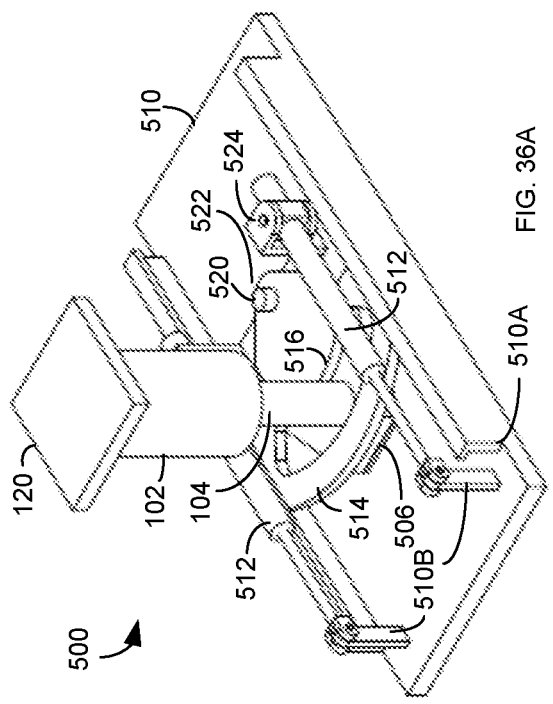
FIG. 36C is an end view of the walking apparatus in FIG. 36A.
Figure 36D:
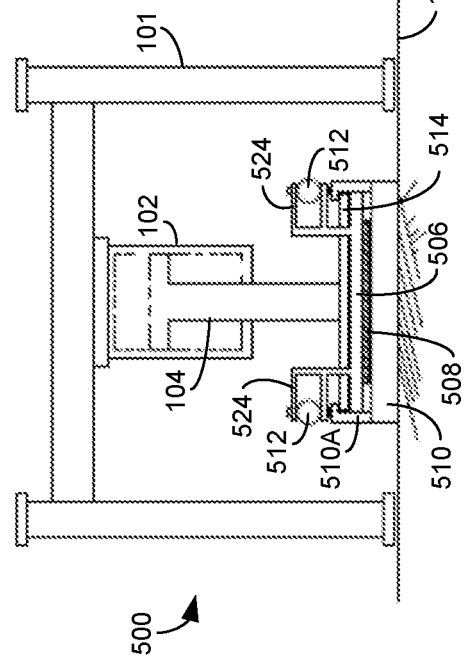
FIG. 36D is a side view of the walking apparatus in FIG. 36A.

FIGS. 36A-36D show a low-profile walking apparatus 500 that uses two travel cylinders. FIG. 36A is an isometric view of walking apparatus 500, FIG. 36B is a sectional plan view of walking apparatus 500, FIG. 36C is an end view of walking apparatus 500, and FIG. 36D is a side view of walking apparatus 500.

Referring to FIGS. 36A-36D, walking apparatus 500 includes a lift cylinder 102 that attaches at a top end via a mounting plate 120 to a load or a load bearing frame 101. A lift rod 104 extends down out of lift cylinder 102 and is attached at a bottom end to a load plate 506. Load plate 506 is alternatively referred to as a load bearing device. An anti-friction pad 508 may attach to a bottom side of load plate 506 and sit on a top surface of a support foot 510. In another example, anti-friction pad 508 may be attached to a top surface of support foot 510. In this example, anti-friction pad 508 may extend across substantially the entire top surface of support foot 510. In one example, anti-friction pad 508 may be made out of a hard plastic, but can be any material that reduces the friction between support foot 510 and load plate 506.

Two rails 510A extend along opposite longitudinal sides of support foot 510. A frame 514 slides longitudinally in-between rails 510A. Load plate 506 is pivotally attached underneath frame 514 via a pivot pin 520.

A first travel cylinder 512 attaches at a first end to a post 510B that extends up from one end of support foot 510 and attaches at a second end to load plate 506 via an arm 524. A second travel cylinder 512 attaches at a first end to a second post 510B that extends up from the same end of support foot 510 and attaches at a second end to frame 514 via a second arm 524.

FIG. 37A is an isolated side view of load plate 506 attached to lift cylinder 102, FIG. 37B is an isolated end view of load plate 506, and FIG. 37C is an isolated plan view of load plate 506 sectioned through lift rod 104. Referring to FIGS. 37A-37C, load plate 506 includes a hole 506A that extends through one longitudinal end for receiving pivot pin 520.

Anti-friction pad 508 may extend underneath at least a portion of the bottom surface of load plate 506 below lift rod 104. Load plate 506 may have a trapezoid shape with two oppositely inclining sides and two parallel ends. Arms 524 extend up from the corners of the wide end of load plate 506.

FIG. 38A shows an end view of support foot 510, FIG. 38B shows a side view of support foot 510, FIG. 38C shows a sectional end view of support foot 510, and FIG. 38D shows a plan view of support foot 510. Posts 510B extend up from opposite sides of a first longitudinal end of support foot 510 and attach to travel cylinders 512. Rails 510A extend up from opposite lateral sides of support foot 510 and include inwardly facing channels 510C for slidingly receiving frame 514.

FIGS. 39A-39C show an isolated view of middle frame 514 used in walking apparatus 500. FIG. 39A is a plan view of frame 514, FIG. 39B is an end view of frame 514, and FIG. 39C is a side view of frame 514. Frame 514 also may have a curved first end and parallel sides. A second end may include oppositely inclining sides. A hole 514A extends through a second end and receives pivot pin 520 rotationally attaching frame 514 to load plate 506. An arched opening 516 allows lift rod 104 to connect directly to load plate 506 and move laterally with respect to frame 514.

Referring to FIGS. 36A-36D, 37A-37C, 38A-38D, and 39A-39C, walking apparatus 500 provides the unique single interface multiple directional load plate movement described above using only two travel cylinders. Frame 514 is held in a same lateral position relative to support foot 510 by rails 510A. However, frame 514 may move longitudinally relative to support foot 510 by sliding within rails 510A. Load plate 506 can rotate about lift rod 104 and can also pivot about pivot pin 520.

Travel cylinders 512 are extended or retracted to move load bearing frame 101 longitudinally with respect to support foot 510. Travel cylinders 512 slide load plate 506 on top of support foot 510 in-between rails 510A longitudinally moving load bearing frame 101. Instead of using a lateral travel cylinder, travel cylinders 512 are differentially retracted and extended to rotate load plate 506 and laterally displace load bearing from 101.

During a first longitudinal stepping operation, support foot 510 is raised above base surface 134, longitudinal travel cylinders 512 are retracted moving support foot 510 longitudinally forward (to the right) relative to load bearing frame 101. Lift cylinder 102 is then vertically extended to lift load bearing frame 101 off of base surface 134. The load on load bearing frame 101 is now supported by support foot 510.

During a second phase of the step operation, longitudinal travel cylinders 512 are extended by the same amounts moving load plate 506, attached lift cylinder 102, and attached load bearing frame 101 longitudinally forward relative to support foot 510.

Support foot 510 is secured to base surface 134 by the load on load bearing frame 101. Extending cylinders 512 slides load plate 506 forward over support foot 510. Frame 514 is attached to load plate 506 via pivot pin 520 and accordingly moves longitudinally in coordination with load plate 506 in-between rails 510A of support foot 510. Frame 514 may help keep load plate 506 aligned along the center longitudinal axis of support foot 510 while travel cylinders 512 move load bearing frame 101 longitudinally forward.

During a third phase of the step operation, lift cylinder 102 is retracted vertically lowering load bearing frame 101 back onto base surface 134. Lift cylinder 102 continues to retract until load plate 506 and attached support foot 510 are lifted off of base surface 134. Raising lift cylinder 102 causes load plate 506 to lift up underneath frame 514. The lateral sides of frame 514 accordingly lift up underneath rails 510A lifting support foot 510 up off of base surface 134. Travel cylinders 512 are still extended with load plate 506 and frame 514 located at the front longitudinal end of support foot 510.

During a fourth phase of the step operation, longitudinal travel cylinders 512 are retracted moving support foot 510 longitudinally forward relative to load plate 506 and load bearing frame 101. Load plate 506 is secured to load bearing frame 101 via lift cylinder 102. Retracting longitudinal travel cylinders 512 causes support foot to slide longitudinally forward while load plate 506 remains in a same longitudinal position with load bearing frame 101.

Frame 514 is attached to load plate 506 via pivot pin 520 and therefore also remains in a same longitudinal position while support foot 510 slides forward. At the end of this stage, load plate 506 and frame 514 are located at the back-longitudinal end of support foot 510. These phases are repeated until load bearing frame 101 is moved to the desired location.

Figure 40A:
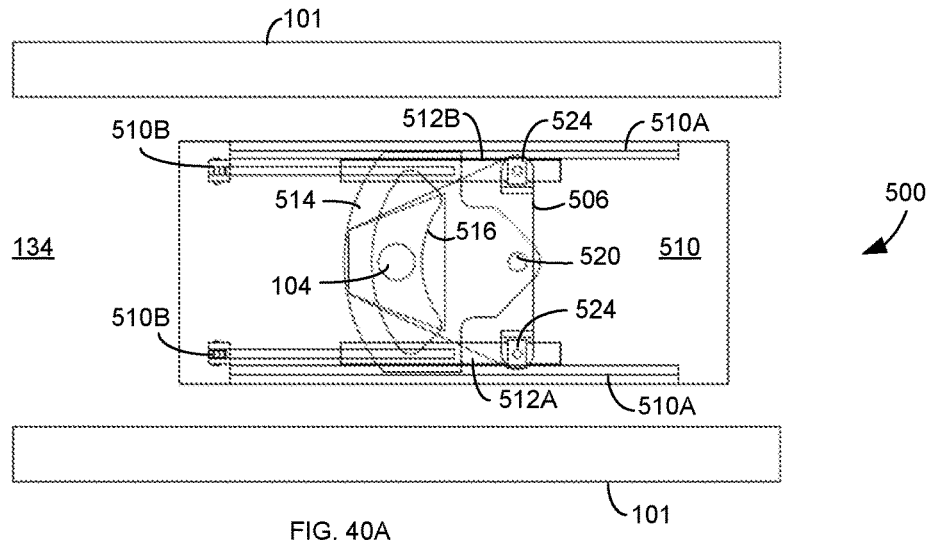
FIGS. 40A-40C show different walking operations for the walking apparatus in FIGS. 36A-36D.
Figure 40B:
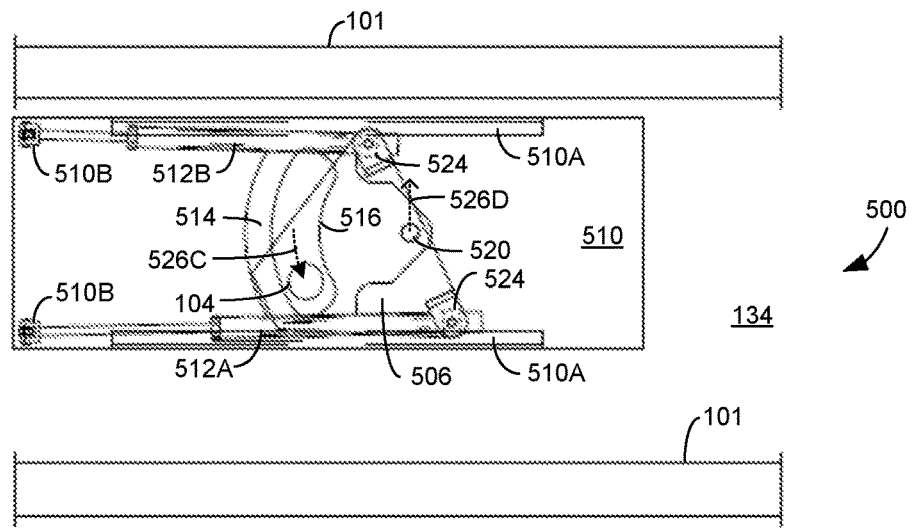
Figure 40C:
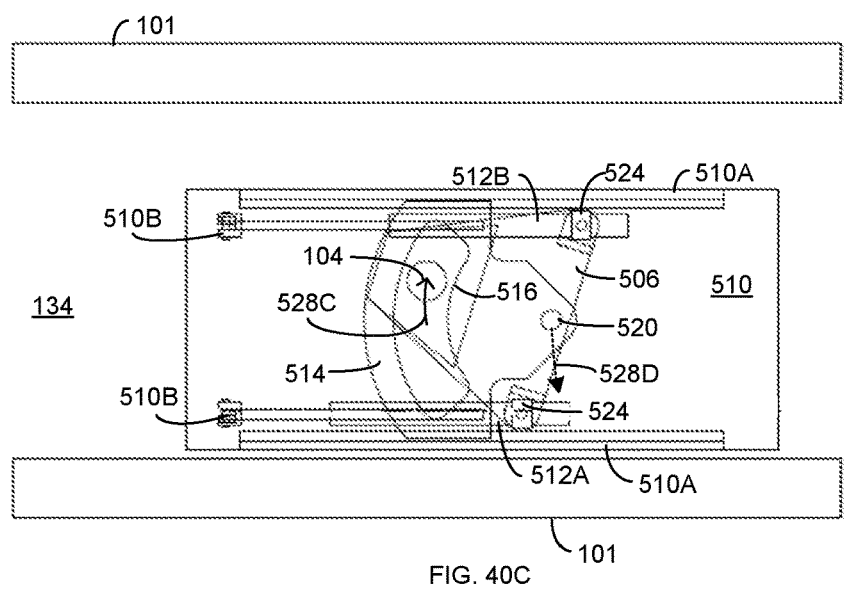

FIGS. 40A-40C show how walking apparatus 500 moves load bearing frame 101 laterally. During a first phase of the walking cycle operation, lift cylinder 102 is vertically extended lifting load bearing frame 101 off of base surface 134. The load on load bearing frame 101 is now supported by support foot 510. Travel cylinders 512A and cylinder 512B may be in a same extended state as shown in FIG. 40A. In other examples, travel cylinders 512 may be initially extended by different amounts as shown in FIG. 40B or 40C.

During a second phase of the step operation as shown in FIG. 40B, cylinder 512A is extended and cylinder 512B retracted. Support foot 510 is planted on the base surface and frame 514 is held in-between rails 510A of support foot 510. Accordingly, pivot pin 520 is held in place by frame 514. Load plate 506 rotates in a counter-clockwise direction about pivot pin 520 moving lift rod 104 and attached load bearing frame 101 laterally to the right as represented by arrow 526C. The narrow end of load plate 506 rotates about lift rod 104 while moving lift rod 104 laterally in direction 526C.

During a third phase of the step operation, lift cylinder 102 is vertically retracted lowering load bearing frame 101 back onto base surface 134. Lift cylinder 102 continues to retract until load plate 506 and attached support foot 510 are lifted off of base surface 134. Load plate 506 lifts up against the bottom side of frame 514. Frame 514 in turn lifts up underneath rails 510A lifting support foot 510 up off of base surface 134. Travel cylinders 512A and 512B still may be in the extended positions shown in FIG. 40B with load plate 506 angled next to the right lateral side of support foot 510.

During a fourth phase of the lateral step operation, travel cylinder 512A is retracted and travel cylinder 512B is extended back into the positions previously shown in FIG. 40C. Load plate 506 is rotationally secured to lift rod 104. Frame 514 and support foot 510 are no longer secured to the base surface 134. Retracting cylinder 512A and extending cylinder 512B rotates load plate 506 clockwise around lift piston 104 moving pivot pin 520 laterally to the right as represented by arrow 528D.

Pivot pin 520 moves frame 514 laterally to the left. The lateral side of frame 514 pushes against rails 510A moving support foot 510 laterally to the left into a leftward position relative to load bearing frame 101 as shown in FIG. 40C. These phases are repeated until load bearing frame 101 is moved to the desired lateral position.

FIG. 40C shows walking apparatus 500 in a leftward position relative to load bearing frame 101. Assume support foot 510 is on base surface 134 and load bearing frame 101 is lifted up off of base surface 134. Also assume travel cylinders 512A and 512B are extended either as shown in FIG. 40A or 40B.

Walking apparatus 500 can also move load bearing frame 101 both longitudinally and laterally at the same time. For example, while support foot 510 is lifted off of base surface 134, both travel cylinders 512A and 512B can be retracted moving support foot 510 longitudinally forward.

Lift rod 104 lowers support foot 510 raising load bearing frame 101 above base surface 134. The load on load bearing frame 101 secures support foot 510 onto base surface 134. Both travel cylinders 512A and 512B then may be extended moving load plate 506 longitudinally over support foot 510. However, one of travel cylinders 512A or 512B is extended at a different rate than the other causing load plate 506 to also rotate moving lift rod 104 and load bearing frame 101 laterally relative to support foot 510 as described above.

In another example, walking apparatus 500 may move load bearing frame 101 in a circular path by extending only one travel cylinder 512. For example, extending travel cylinder 512A some limited amount while not extending or retracting travel cylinder 512B, causes load plate 406 and attached load bearing frame 101 to move in a circular path starting in a forward diagonal direction to the left.

Substantially all vertical force is applied directly onto load plate 506. Substantially all horizontal traveling force is also exerted onto load plate 506 via cylinders 512. Thus, fewer forces are applied to frame 514 and other components of walking apparatus 500.

Frameless Walking Apparatus

FIGS. 41A-41E are plan views showing different walking operations of a frameless walking apparatus 600. FIGS. 42A-42E are side views of the frameless walking apparatus 600 shown in FIGS. 41A-41E, respectively.

Referring first to FIGS. 41A and 42A, walking apparatus 600 includes a travel mechanism 604 that moves load bearing plate 616 in multiple directions over the top of support foot 602. Travel mechanism 604 includes a longitudinal travel cylinder 606 and a lateral travel cylinder 608. Longitudinal travel cylinder 606 is pivotally coupled at a first end to a pivot arm 610 that extends up from a top surface of support foot 602. A second end of travel cylinder 606 is rigidly coupled to the side of a square load plate 616. As mentioned above, load plate 616 is alternatively referred to as a load bearing plate or a load bearing device.

Lateral travel cylinder 608 is pivotally coupled at a first end to pivot arm 612 and pivotally coupled at a second end to longitudinal travel cylinder 606 via a hinge 614. Any type of bearing, swivel, hinge, pin, fitting, bracket, joint, connector, etc. can be used to allow longitudinal travel cylinder 606 to pivot about pivot arm 610 and allow lateral travel cylinder 608 to pivot about pivot arm 612 and longitudinal travel cylinder 606.

Similar to other walking apparatus described above, walking apparatus 600 may retract lift rod 104 to lower load bearing frame 101 onto base surface 134 and raise support foot 602 off of base surface 134. Travel cylinders 606 and 608 may retract moving support foot 602 into a position relative to load bearing plate 616, lift rod 104, and load bearing frame 101 shown in FIGS. 41A and 42A.

Lift cylinder 102 lowers lift rod 104 lowering support foot down onto base surface 134 and raising load bearing frame 101 above base surface 134. During this load lifting operation, load plate 616 transfers the weight of the load on load bearing frame 101 onto support foot 602.

During a load-movement operation shown in FIGS. 41B and 42B, walking apparatus 600 may extend longitudinal cylinder 606. Load plate 616, lift rod 104 and attached load bearing frame 101 move in a lateral direction with respect to support foot 602 and base surface 134.

During a load-movement operation shown in FIGS. 41C and 42C, walking apparatus 600 may extend longitudinal cylinder 606 and, at the same time or at a different time, extend lateral cylinder 608. Load plate 616, lift rod 104 and attached load bearing frame 101 move in a left diagonal direction with respect to support foot 602 and base surface 134.

During a load-movement operation shown in FIGS. 41D and 42D, walking apparatus 600 may extend lateral cylinder 608 without extending longitudinal cylinder 606. Load plate 616, lift rod 104 and attached load bearing frame 101 move in a lateral and slightly non-linear direction with respect to support foot 602 and base surface 134. Longitudinal cylinder 606 may be extended slightly while lateral cylinder 608 is extended so load plate 616, lift rod 104 and attached load bearing frame 101 move in a substantially linear lateral direction with respect to support foot 602 and base surface 134.

During a load-movement operation shown in FIGS. 41E and 42E, walking apparatus 600 may extend longitudinal cylinder 606, and at the same time or a different time, retract lateral cylinder 608. Load plate 616, lift rod 104, and attached load bearing frame 101 move in a right diagonal direction with respect to support foot 602 and base surface 134.

After any of the step operations described above, walking apparatus 600 during a recovery phase may raise lift rod 104 lowering load bearing frame 101 back onto base surface 134 and raising support foot 602 off of base surface 134. Walking apparatus 600 may extend or retract travel cylinders 606 and 608 moving support foot 602 back into the previous position shown in FIGS. 41A and 42A relative to load plate 616, lift rod 104 and load bearing frame 101.

During a next load-movement phase, walking apparatus 600 may again extend lift rod 104 lowering support foot 602 back down onto base surface 134 and lifting load bearing frame 101 off of base surface 134. Walking apparatus 600 then performs any of the step operations described above in FIG. 41B/42B, 41C/42C, 41D/42D, or 41E/42E.

FIGS. 43A-43D are plan views showing different walking operations of another frameless walking apparatus 630. FIGS. 44A-44D are side views of the frameless walking apparatus in FIGS. 43A-43D, respectively.

Referring first to FIGS. 43A and 44A, walking apparatus 630 includes a travel mechanism 634 that moves load bearing plate 646 in multiple selectable directions over the top of a support foot 632. Travel mechanism 634 includes a longitudinal travel cylinder 636 and a lateral travel cylinder 638.

Longitudinal travel cylinder 636 is pivotally coupled at a first end to a pivot arm 640 that extends up from a top surface of support foot 632. A second end of longitudinal travel cylinder 636 is pivotally coupled to an L-shaped arm 647 that extends out from the left corner of load bearing plate 646. As mentioned above, load bearing plate 616 is alternatively referred to as a load bearing device.

Lateral travel cylinder 638 is pivotally coupled at a first end to pivot arm 642 and pivotally coupled at a second end to a first end of a hinge 644. A second end of hinge 644 is pivotally coupled to load plate arm 647. Any type of bearing, swivel, hinge, pin, fitting, bracket, joint, connector, etc. can be used that allows longitudinal travel cylinder 636 to pivot about pivot arm 640 and load plate arm 647 and allows lateral travel cylinder 638 to pivot about pivot arm 642 load plate arm 647.

A biasing device 648 includes a pair of links 654 that are connected at first ends by joints 656 to a torsion bar 650 and connected at second ends by joints 658 to load bearing plate 646. In one example, links 658 are metal bars or tubes, but can be any rigid material or shape. Joints 656 and 658 may include spherical connectors that allow links 654 to angle vertically upwards or angle horizontally from side to side over support foot 632.

Biasing device 648 includes side plates 660 pivotally coupled at first ends to arms 652 that extend up from the end of support foot 632 and pivotally coupled at second ends to the first ends of links 654. A torsion bar or torsion plate 650 extends across side plates 660.

Links 654 prevent load bearing plate 646 from yawing or rotating about a vertical axis, while moving over support foot 632. For example, the extension and retraction of travel cylinders 636 and 638 may create a yaw or rotational force on load bearing plate 646. The yaw forces may cause torsion bar 650 to deflect, bend, twist or otherwise load up. Removal of the yaw force on load bearing plate 616 allows torsion bar 650 to unload causing links 654 to move or untwist load bearing plate 646 back into a parallel alignment with support foot 632.

During a recovery phase, walking apparatus 630 may retract lift rod 104 lowering load bearing frame 101 onto base surface 134 and raising support foot 632 off of base surface 134. Travel cylinders 636 and 638 may partially or fully extend moving support foot 632 into a position relative to load bearing plate 646, lift rod 104, and load bearing frame 101 as shown in FIGS. 43A and 44A.

During a load-movement phase, lift cylinder 102 lowers lift rod 104 lowering support foot 632 down onto base surface 134 and raising load bearing frame 101 above base surface 134. During this load lifting operation, load bearing plate 646 transfers the weight of the load on load bearing frame 101 onto support foot 632.

During a load-movement operation shown in FIGS. 43B and 44B, walking apparatus 630 may retract lateral travel cylinder 638 rotating longitudinal travel cylinder 636 in a clockwise direction. Load plate 646, lift rod 104 and attached load bearing frame 101 move in a substantially lateral direction to the right with respect to support foot 632 and base surface 134. Links 654 pivot laterally to the right.

During a load-movement operation shown in FIGS. 43C and 44C, walking apparatus 630 may retract longitudinal cylinder 636 rotating lateral cylinder 638 in a counter clockwise direction. Load plate 646, lift rod 104 and attached load bearing frame 101 move in a right diagonal direction with respect to support foot 632 and base surface 134. Links 654 and torsion bar 650 in biasing device 648 rotate over the front end of support foot 632.

During a load-movement operation shown in FIGS. 43D and 43D, walking apparatus 600 may retract longitudinal cylinder 636 while also extending lateral cylinder 638. Load plate 646, lift rod 104, and attached load bearing frame 101 move in a substantially forward longitudinal direction with respect to support foot 602 and base surface 134. Links 654 and torsion bar 650 of biasing device 648 again rotate forward over the front end of support foot 632.

Walking apparatus 630 may perform any of the step operations described above in any selectable order. After completion of the step operation, walking apparatus 630 during a next recovery phase may raise lift rod 104 lowering load bearing frame 101 back onto base surface 134 and raising support foot 632 off base surface 134. Walking apparatus 630 may extend and/or retract travel cylinders 636 and 638 moving support foot 632 back into the previous position shown in FIGS. 43A and 44A, or into any other position, relative to load plate 646, lift rod 104 and load bearing frame 101.

During a next load movement phase, walking apparatus 630 may extend lift rod 104 lowering support foot 632 back down onto base surface 134 and lifting load bearing frame 101 off of base surface 134. Walking apparatus 630 then may perform any of the load-movement operations described above in FIGS. 43B/44B, 43C/44C, 43D/44D.

All of the walking apparatus described above are configured to move a load bearing frame carrying a load over a base surface where a support foot provides a first load bearing surface. Load bearing device 616 is attached to lift mechanism 102/104 and provides a second lower load bearing surface configured to transfer weight of the load on load bearing frame 101 onto the upper load bearing surface of support foot 602.

The upper load bearing surface of support foot 632 and the lower load bearing surface of load bearing device 616 form a single load bearing interface where the load bearing device 616 is configured to move in multiple directions over support foot 602. A load bearing interface may refer to a mechanism consisting of a pair of substantially planar surfaces consisting of an upper bearing surface and a lower bearing surface, configured to be substantially parallel, where the weight of the load is transferred from the upper bearing surface to the lower bearing surface, and where relative motion occurs between the upper bearing surface and the lower bearing surface, the motion being substantially parallel to the two surfaces.

The load bearing device provides a single steering plane movable over the support foot in different directions. A steering plane may refer to a substantially planar surface of a load bearing device that allows relative motion in the plane of the surface to occur with respect to the support foot. In other words, a second separately steerable load bearing plate or other load bearing apparatus is not needed to move the load in a second different direction over support foot 602 or base surface 134.

Extending or retracting travel cylinders 606 and 608 can move a single load bearing device 616 in a same steerable plane longitudinally, laterally, diagonally, and non-linearly over the support foot 602. This reduces complexity and the overall height of the walking apparatus 600 since only one steerable load bearing device is used to move a load in any steerable direction.

Load bearing device 646 also allows travel cylinders 606 and 608 to change a load travel path while the weight from the load remains transferred onto support foot 602 and travel cylinders 606 and 608 are currently moving the load relative to the support foot 602.

For example, an operator may use a remote control device to select a path for moving load bearing frame 101 over base surface 134. Walking apparatus 600 may raise load bearing frame 100 off of base surface 134 and start moving load bearing frame 101 along the selected path. The operator can select a new travel path for load bearing frame 100 while walking apparatus 600 is still moving load bearing frame 100 along the currently selected travel path.

For example, walking apparatus 600 may extend and/or retract travel cylinders 606 and 608 to move load bearing device 616 and attached load bearing frame 101 along an initial selected path. The operator may use the remote device to adjust the currently selected path of load bearing frame 101. While support foot 602 is still under load, walking apparatus 600 adjusts the extension and/or retraction of travel cylinders 606 and 608 so load bearing frame 101 starts moving along the new travel path.

Load bearing device 616 can move in multiple directions over support foot 602 while the weight of the load is transferred onto support foot 602. Therefore, walking apparatus 600 does not have to unload support foot 602 in order to change a currently selected travel path of the load bearing frame. This allows an operator to more quickly and accurately steer the walking apparatus while under load in any direction toward a desired target location.

A friction-reducing element may be located between the top load bearing surface of support foot 602 and the bottom load bearing surface of load bearing device 616. For example, the friction reducing element may comprise multiple balls or bearings, an anti-friction pad, or a lubricant or pressurized air.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A load transporting apparatus configured to move a load bearing frame carrying a load over a base surface, comprising:
   a support foot providing a first load bearing surface;
   a lift mechanism during a step operation configured to raise the support foot off of the base surface, and further configured to lower the support foot onto the base surface;
   a load bearing device attached to the lift mechanism providing a second load bearing surface configured to transfer a weight of the load onto the first load bearing surface of the support foot, wherein the first load bearing surface and the second load bearing surface form a single load bearing interface where the second load bearing surface is configured to move in multiple directions over the first load bearing surface; and a travel mechanism configured to selectively adjust a horizontal path of the load while the weight of the load is transferred onto the support foot and the travel mechanism is moving the load relative to the support foot.

2. The load transporting apparatus of claim 1, wherein the travel mechanism is configured to adjust an amount the load moves in perpendicular first and second directions relative to the support foot while the weight of the load is transferred onto the support foot and the travel mechanism is moving the load relative to the support foot.

3. The load transporting apparatus of claim 1, including a friction-reducing element located between the first load bearing surface and the second load bearing surface.

4. The load transporting apparatus of claim 3, wherein where the friction reducing element comprises multiple balls, bearings, or cylindrical rollers.

5. The load transporting apparatus of claim 3, wherein where the friction reducing element comprises an anti-friction pad.

6. The load transporting apparatus of claim 3, wherein the friction reducing element comprises a lubricant or pressurized air.

7. The load transporting apparatus of claim 1, wherein the load bearing device comprises a load plate configured to slide over a top surface of the support foot.

8. The load transporting apparatus of claim 1, wherein the load plate has a pentagon or trapezoid shape.

9. The load transporting apparatus of claim 1, wherein the travel mechanism includes two travel cylinders attached between the support foot and the load bearing device, wherein different combinations of extending and retracting the travel cylinders moves the load bearing device longitudinally, laterally, diagonally, and non-linearly over the support foot.

10. The load transporting apparatus of claim 1, including a frame holding the load bearing device to the support foot, the frame configured to move in a first direction relative to the support foot and the load bearing device configured to move in a second direction relative to the support foot.

11. The load transporting apparatus of claim 10, including:
one or more lateral travel cylinders coupled between the support foot and the frame, and
one or more longitudinal travel cylinders coupled between the frame and the load bearing device.

12. The load transporting apparatus of claim 11, wherein extending and retracting the lateral travel cylinder and longitudinal travel cylinder moves the load bearing device in longitudinal, lateral, diagonal, and non-linear directions over the support foot.

13. The load transporting apparatus of claim 10, including rails extending vertically up from the support foot configured to hold the frame in a fixed longitudinal position relative to the support foot and allow the frame to move laterally relative to the support foot.

14. The load transporting apparatus of claim 10, including a travel assembly slidingly attaching the frame to the load bearing device.

15. The load transporting apparatus of claim 10, including support foot rails extending vertically up from the support foot configured to hold the frame in a fixed lateral position relative to the support foot and allow the frame to move longitudinally relative to the support foot.

16. The load transporting apparatus of claim 15, including frame rails located on opposite ends of the frame that extend laterally over the support foot in between the support foot rails, wherein the load bearing device slides laterally over the support foot in between the frame rails.

17. The load transporting apparatus of claim 15, including:
one or more lateral travel cylinders coupled between the load bearing device and the frame; and
one or more longitudinal travel cylinders coupled between the frame and the support foot.

18. The load transporting apparatus of claim 17, wherein the lateral travel cylinders are inboard of the longitudinal travel cylinders.

19. The load transporting apparatus of claim 15, wherein the load bearing device is pivotally coupled to the support foot.

20. A walking apparatus to move a load bearing frame carrying a load over a surface, comprising:
a support foot;
a lift mechanism coupled between the support foot and the load bearing frame configured to lower the support foot onto the surface during a load-movement phase and raise the support foot off of the surface during a recovery phase;
a load bearing device coupled to the lift mechanism configured to transfer a weight from the load to the support foot during the load movement phase, wherein the load bearing device provides a single steering plane moveable over the support foot in different directions; and
a travel mechanism coupled between the support foot and the load bearing device configured to move the load bearing device over the single steering plane to change a path of the load relative to the support foot while the weight of the load is transferred onto the support foot and the travel mechanism is moving the load relative to the support foot.

21. The walking apparatus of claim 20, including a friction-reducing element located between the support foot and the load bearing device.

22. The walking apparatus of claim 21, wherein the friction reducing element comprises multiple balls, bearings, or cylindrical rollers.

23. The walking apparatus of claim 21, wherein the friction reducing element comprises an anti-friction pad.

24. The walking apparatus of claim 21, wherein where the friction reducing element comprises a lubricant or pressurized air.

25. The walking apparatus of claim 20 including:
a frame attached between rails that extend up from the support foot and pivotally attached to the load bearing device.

26. The walking apparatus of claim 25, wherein the travel mechanism includes a lateral travel cylinder coupled between the frame and the load bearing device configured to rotate the load bearing device about a pin that pivotally couples the load bearing device to the frame.

27. The walking apparatus of claim 26, wherein the pin is located at a first end of the load bearing device and the lateral travel cylinder is located on an opposite second end of the load bearing device.

28. The walking apparatus of claim 25, including one or more longitudinal travel cylinders coupled between the support foot and the frame configured to move the frame and load bearing device longitudinally over the support foot.

29. The walking apparatus of claim 25, wherein:
movement of the frame in a longitudinal direction relative to the support foot moves the load bearing device and the load in a longitudinal direction relative to the support foot; and
rotation of the load bearing device relative to the frame is configured to move the load in a substantially lateral direction relative to the support foot.

30. The walking apparatus of claim 25, wherein:
the frame includes an opening; and
the lift mechanism extends down through the opening in the frame and attaches to a top surface of the load bearing device.

31. The walking apparatus of claim 20, wherein the travel mechanism includes:
two travel cylinders attached between the support foot and the load bearing device,
wherein extending or retracting the travel cylinders moves the load bearing device longitudinally, laterally, diagonally, and non-linearly over the support foot.

* * * * *